United States Patent
Nakamura et al.

(10) Patent No.: US 10,460,195 B2
(45) Date of Patent: Oct. 29, 2019

(54) IMAGING APPARATUS AND METHOD, OPERATION APPARATUS AND METHOD, AND PROGRAM AND RECORDING MEDIUM

(71) Applicant: MITSUBISHI ELECTRIC CORPORATION, Tokyo (JP)

(72) Inventors: Yudai Nakamura, Tokyo (JP);
Tomonori Fukuta, Tokyo (JP);
Masashi Kamiya, Tokyo (JP);
Masahiro Naito, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 23 days.

(21) Appl. No.: 15/552,870

(22) PCT Filed: Mar. 27, 2015

(86) PCT No.: PCT/JP2015/059635
§ 371 (c)(1),
(2) Date: Aug. 23, 2017

(87) PCT Pub. No.: WO2016/157299
PCT Pub. Date: Oct. 6, 2016

(65) Prior Publication Data
US 2018/0039852 A1 Feb. 8, 2018

(51) Int. Cl.
*G06K 9/46* (2006.01)
*G06F 3/03* (2006.01)
(Continued)

(52) U.S. Cl.
CPC .......... *G06K 9/4661* (2013.01); *G06F 3/017* (2013.01); *G06F 3/0304* (2013.01);
(Continued)

(58) Field of Classification Search
CPC .. G06K 9/4661; G06K 9/4604; G06F 3/0304; G06F 3/017; G06T 7/11; G06T 7/194; G06T 2207/10152
See application file for complete search history.

(56) References Cited

U.S. PATENT DOCUMENTS 6,681,037 B1 * 1/2004 Koljonen ........... G01N 21/8806
348/125
7,599,576 B2 * 10/2009 Baldwin .............. G06K 9/2036
382/141

(Continued)

FOREIGN PATENT DOCUMENTS

JP 2001-249084 A 9/2001
JP 2003-259189 A 9/2003
(Continued)

OTHER PUBLICATIONS

Heikkilä et al., "Description of Interest Regions with Local Binary Patterns", Elsevier, Jun. 30, 2008, pp. 1-32.

*Primary Examiner* — Ahmed A Berhan
(74) *Attorney, Agent, or Firm* — Birch, Stewart, Kolasch & Birch, LLP

(57) ABSTRACT

A luminance variation (dI) pertaining to each pixel is calculated (21) using a plurality of captured images obtained by image capturing under different illumination conditions, a texture variation (dF) pertaining to each pixel is calculated (22) using a plurality of captured images obtained by image capturing at different time points, and a subject region is extracted (23) based on the luminance variation (dI) and the texture variation (dF). A variation in the texture feature (F) pertaining to each pixel between the images is calculated as the texture variation (dF). The subject can be extracted with a high accuracy even when there are changes in the ambient light or the background.

17 Claims, 35 Drawing Sheets

(51) Int. Cl.
*G06F 3/01* (2006.01)
*G06T 7/11* (2017.01)
*G06T 7/194* (2017.01)

(52) U.S. Cl.
CPC .............. *G06K 9/4604* (2013.01); *G06T 7/11* (2017.01); *G06T 7/194* (2017.01); *G06T 2207/10016* (2013.01); *G06T 2207/10152* (2013.01); *G06T 2207/30196* (2013.01)

(56) References Cited

U.S. PATENT DOCUMENTS

| | | |
|---|---|---|
| 2003/0214592 A1 | 11/2003 | Ikeyama |
| 2009/0213095 A1 | 8/2009 | Harada et al. |
| 2010/0013938 A1 | 1/2010 | Fukuda et al. |

FOREIGN PATENT DOCUMENTS

| | | |
|---|---|---|
| JP | 2005-130268 A | 5/2005 |
| JP | 2007-201933 A | 8/2007 |
| JP | WO2008/120321 A1 | 10/2008 |
| JP | 2009-205423 A | 9/2009 |
| JP | 4842374 B2 | 12/2011 |
| JP | 4915367 B2 | 4/2012 |
| JP | 2015-043141 A | 3/2015 |

\* cited by examiner

FIG. 5

| n5 | n6 | n7 |
|----|----|----|
| n4 | Pc | n0 |
| n3 | n2 | n1 |

FIG.10

|  | LUMINANCE VARIATION | TEXTURE VARIATION |
|---|---|---|
| ILLUMINATION CONDITION CHANGE | PRESENT | ABSENT |
| BACKGROUND CHANGE | PRESENT | PRESENT |
| SUBJECT MOVEMENT | PRESENT | PRESENT |

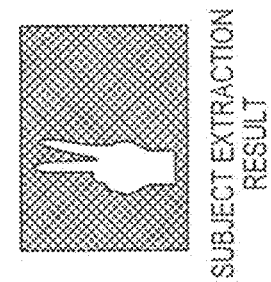
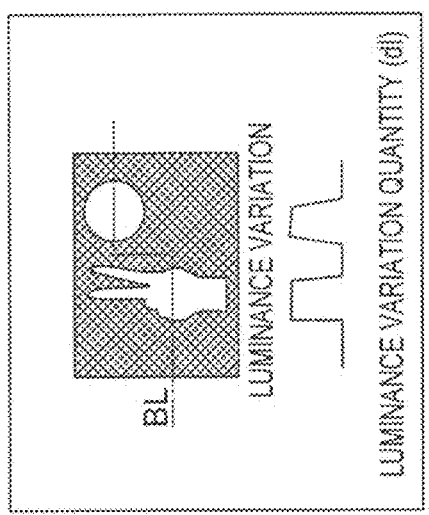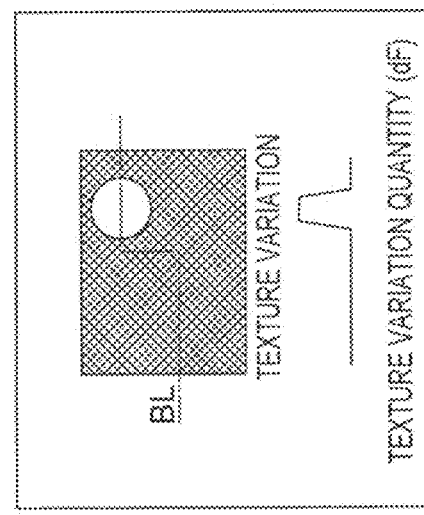
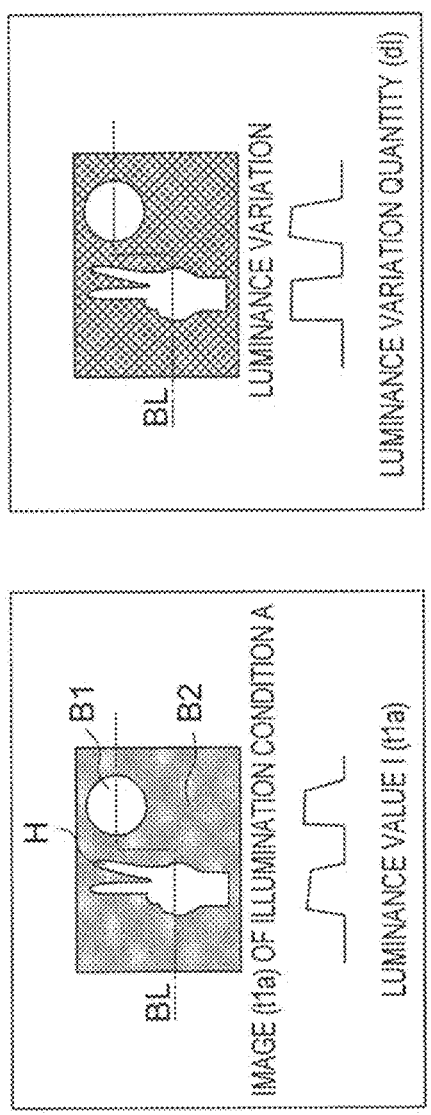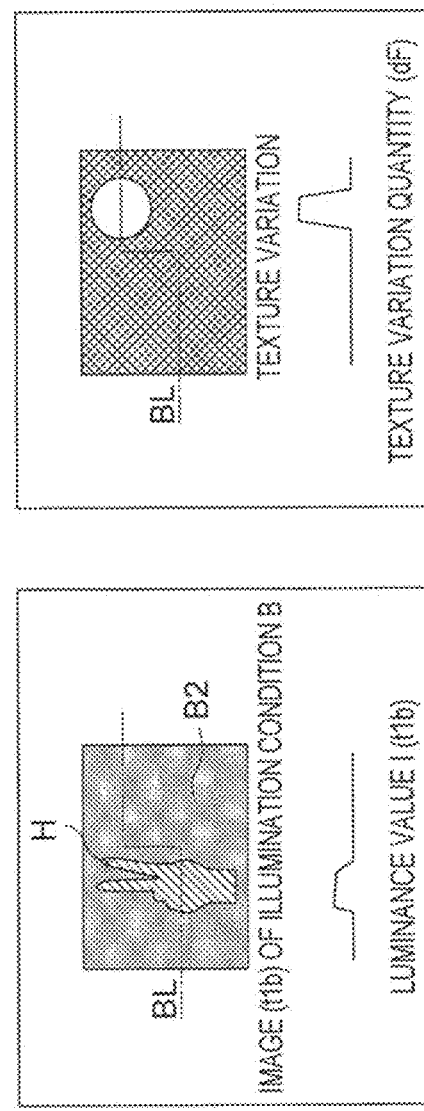

FIG.33

| GESTURE TYPE | ROCK | SCISSORS | PAPER |
|---|---|---|---|
| OPERATION CONTENT | MAP GUIDANCE SCREEN | AUDIO SCREEN | AIR CONDITIONER ADJUSTMENT SCREEN |

IMAGING APPARATUS AND METHOD, OPERATION APPARATUS AND METHOD, AND PROGRAM AND RECORDING MEDIUM

The present invention relates to an imaging apparatus and method for extracting a subject region from a captured image. In particular, the present invention relates to a technique for extracting a subject region using differences between two or more captured images obtained by image capturing under different illumination conditions. The present invention also relates to an operation apparatus and method for performing operation on a device using data obtained by the above-mentioned imaging apparatus. The present invention also relates to a program for causing a computer to execute processes in the above-mentioned imaging apparatus or method, or the above-mentioned operation apparatus or method, and a computer-readable recording medium in which the above-mentioned program is stored.

BACKGROUND ART

When a person in the vicinity of a camera or a part (a hand, for example) of such a person is imaged as a subject, for the purpose of monitoring the state or action of the person, it is effective to remove the background and extract the region which the subject occupies, and analyze the extracted region in detail. Patent reference 1 discloses a display imaging apparatus which periodically turns on and off the illuminating light for irradiating the subject, at a short interval, and obtains the captured image during the on-period, and the captured image during the off-period, and uses the difference between them to extract the region of the subject in the vicinity the camera.

A problem associated with this method is that when the background changes or the subject moves, a region of false signals may appear in the difference image. To cope with this problem, Patent reference 1 discloses generating an interpolated image in which the movement of the subject or the background has been compensated for, and generating a difference image, from which the regions of false signals due to movement of the subject have been removed. Also, Patent reference 2 discloses an image processing apparatus which detects the movement amount of the subject, and uses the detected movement amount for the identification of the subject region.

PRIOR ART REFERENCES

Patent References

Patent reference 1: Japanese Patent No. 4915367
Patent reference 2: Japanese Patent No. 4842374

Non-Patent References

Non-patent reference 1: Marko Heikkila, et al., "Description of Interest Regions with Local Binary Patterns", 30 Jun. 2008
Non-patent reference 1 will be mentioned later.

SUMMARY OF THE INVENTION

Problems to be Solved by the Invention

However, the technique for extracting a subject region using a difference image has a problem in that in a space in which the ambient light or the background changes rapidly, such as a space inside of a moving vehicle, or out of doors, the subject cannot be correctly extracted due to the effects of the false signals. In Patent reference 1, it is necessary that the same subject and the same background objects are present in the plurality of images used for the generation of the interpolated image, for the purpose of compensating for the movement of the subject or the change in the background. However, in a moving vehicle, or out of doors, the change in the ambient light or the change in the background is fast, and the same subject or the same background is not necessarily present in the images, and in such a case, the effects of the false signals cannot be eliminated.

In a case in which the subject region is identified by detecting the movement amount of the subject, the luminance variation calculated by taking the difference: is susceptible to the ambient light, and, it is difficult to determine whether the change in the luminance is due to false signals, inside of a vehicle, or out of doors. Also, similar false signals are generated due to changes in the background, and the region in which the false signals are generated may be erroneously taken as a region of the subject.

The present invention is to solve the problems described above, and its object is to enable extraction of the subject with a high accuracy, even when there is a change in the ambient light or background.

Means for Solving the Problems

An imaging apparatus according to the present invention comprises:

an imaging/irradiating control unit for generating an illumination condition control signal for controlling an illumination condition, and an imaging condition control signal for controlling an imaging condition;

an irradiating unit for illuminating a subject with a plurality of mutually different illumination conditions based on the illumination condition control signal;

an imaging unit for performing image capturing of the subject with an imaging condition controlled by the imaging condition control signal to generate captured images;

a luminance variation calculation unit using a plurality of captured images obtained by the image capturing under the different illumination conditions by said imaging unit for calculating a luminance variation pertaining to each pixel between the plurality of captured images;

a texture variation calculation unit using a plurality of captured images obtained by the image capturing at different time points by said imaging unit for calculating a texture variation pertaining to each pixel between the plurality of captured images; and a subject extraction unit for extracting a subject region based on the luminance variation and the texture variation.

Effects of the Invention

According to the present invention, the subject can be extracted with a high accuracy even when there is a change in the ambient light or the background.

BRIEF DESCRIPTION OF THE DRAWINGS

FIG. 5 is a diagram showing an arrangement of pixels used for the calculation of a CSLBP feature.

FIG. 10 is a diagram showing a relationship between the change in the illumination condition, the change in the background, and the movement of the subject, and the luminance variation and the texture variation.

FIGS. 11(a) to 11(e) are diagrams showing an example of extraction of a subject region by the imaging apparatus of the first embodiment.

FIG. 33 is a diagram showing an exemplary correspondence between the gesture types recognized by the subject recognition unit in FIG. 30, and the contents of the operation generated by the operation determination unit.

MODES FOR CARRYING OUT THE INVENTION

First Embodiment

Figure 1:
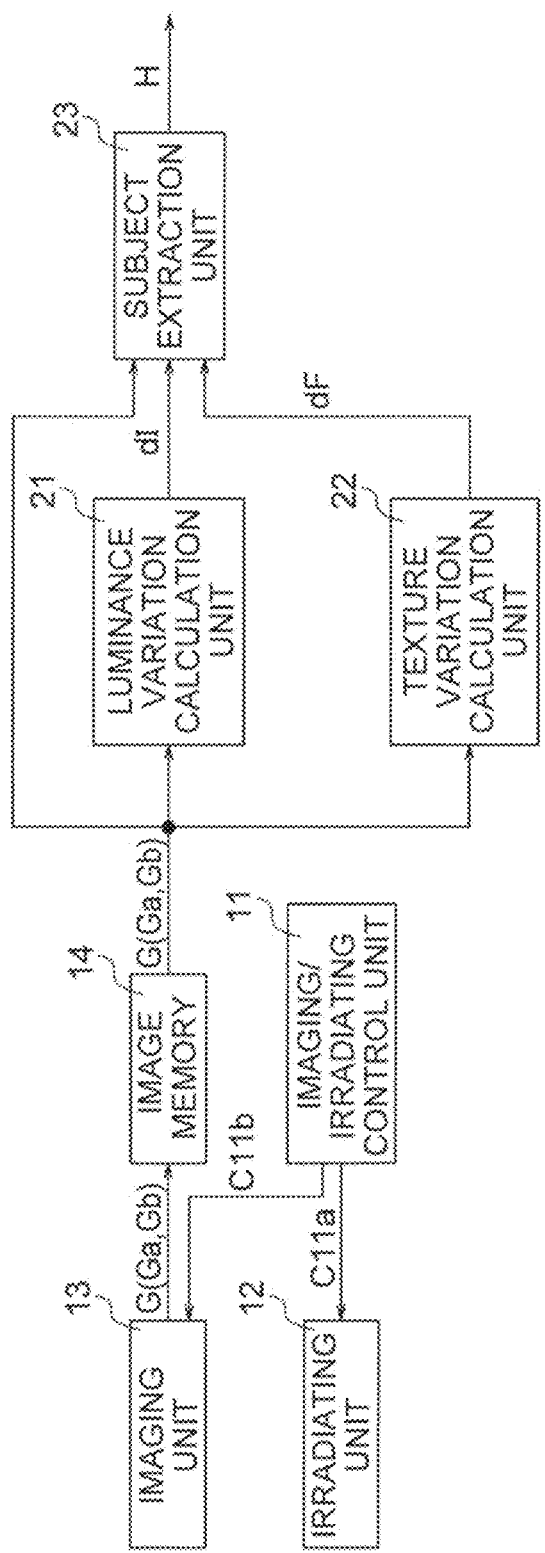
FIG. 1 is a block diagram showing the configuration of an imaging apparatus of a first embodiment of the present invention.

FIG. 1 is a block diagram showing the configuration of an imaging apparatus according to a first embodiment of the present invention. The illustrated imaging apparatus includes an imaging/irradiating control unit 11, an irradiating unit 12, an imaging unit 13, a luminance variation calculation unit 21, a texture variation calculation unit 22, a subject extraction unit 23, and an image memory 14.

The imaging apparatus of the present embodiment takes a picture of, for example, a person, as a subject. Specifically, the entire body of a person, or a part, such as an upper body, a face, or a hand is separated as a subject, from the background.

The imaging/irradiating control unit 11 outputs a control signal (illumination condition control signal) C11a for controlling the illumination condition to the irradiating unit 12, and also generates a control signal (imaging condition control signal) C11b for controlling the imaging condition and outputs it to the imaging unit 13.

The illumination condition controlled by the control signal C11a includes at least one of the irradiation distribution of the illuminating light, the light emitting intensity of the illuminating light, the light emitting timing of the illuminating light, and the light emitting, period of the illuminating light.

The imaging condition controlled by the control signal C11b includes at least one of the exposure timing, the exposure time, the frame rate, the aperture, and the gain.

The imaging unit 13 performs image capturing frame by frame. Switching of the illumination condition by the irradiating unit 12 is performed in synchronism with the imaging by the imaging unit 13.

In the present embodiment, the control signal C11a supplied from the imaging/irradiating control unit 11 alternately designates, frame by frame, a different one of the illumination conditions A and B, and the irradiating unit 12 performs the illumination with an illumination condition A and the illumination with an illumination condition B alternately frame by frame based on the control signal C11a. Performing illumination with a certain condition is also termed as generating such an illumination condition.

Figure 2:
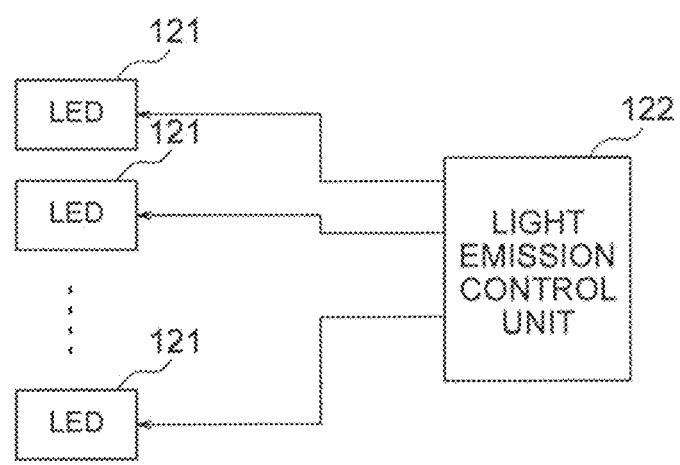
FIG. 2 is a block diagram showing the configuration of the irradiating unit in FIG. 1.

As shown in FIG. 2, the irradiating unit 12 includes a plurality of LEDs 121 and a light emission control unit 122.

As the LEDs 121, near-infrared LEDs, or white-light LEDs are used.

When the subject is the upper body of the person, it is desirable that near-infrared LEDs are used as a light source since human eyes have little sensitivity to the infrared rays.

For changing the light emitting intensity of the illumination by the irradiation unit 12, the number of the LEDs which are turned on to emit light, among the plurality of the LEDs 121, may be changed, or the light emitting intensity of each LED may be changed, or both methods may be used in combination.

For changing the light emitting intensity of each LED, the magnitude of the drive current flowing into the LED may be changed, or the duty ratio in the PWM (Pulse Width Modulation) control may be changed.

For changing the irradiation distribution of the illuminating light by the irradiating unit 12, the LEDs which are turned on to emit light may be altered, or the light emitting intensity of each LED may be changed according to its position (the position within the group of the plurality of LEDs 121).

In this following description, it is assumed that the switching of the illumination condition is made by controlling the duty ratio in the PWM control thereby to switch the light emitting intensity.

The light emitting intensity in the illumination condition A is denoted by $\phi A$, and the light emitting intensity in the illumination condition B is denoted by $\phi B$. It is assumed that the light emitting intensity $\phi A$ and the light emitting intensity $\phi B$ are respectively fixed values, and have the following relationship:

$$\phi A > \phi B$$

The imaging unit 13 performs image capturing of a subject based on the control signal C11b supplied from the imaging/irradiating control unit 11, and under the two illumination conditions generated by the irradiating unit 12, and causes the images G obtained by the image capturing to be stored in the image memory 14.

As the imaging unit 13, an imaging element such as a CMOS sensor, a CCD sensor is used.

The imaging unit 13 performs image capturing based on the control signal C11b, at a rate of, e.g., 30 frames per second. The output images G are, for example, gray-scale images (black-and-white images), or RGB images.

In the following description, it is assumed that the imaging unit 13 outputs images at a rate of 30 frames per second. The output images are, for example, gray-scale images of eight-bit gradation.

The resolution of the output images is, for example, according to the VGA standard, and the width W of the image is 640 pixels, and the height H is 480 pixels.

The irradiating unit 12 and the imaging unit 13 are so disposed that the light (illuminating light) irradiated from the irradiating unit 12 is reflected by the subject and reflected light enters into the imaging unit 13.

The imaging unit 13 performs image capturing alternately under the illumination condition A and the illumination condition B which are generated alternately by the irradiating unit 12, and alternately outputs the image (image of the illumination condition A) Ga obtained by the image capturing under the illumination condition A, and the image (image of the illumination condition B) Gb obtained by the image capturing under the illumination condition B. As a result, the images Ga of the illumination condition A and the images Gb of the illumination condition B are output at a rate of 15 frames per second.

The images G (Ga, Gb) output from the imaging unit 13 are successively stored in the image memory 14.

It is assumed that each of the imaging condition for the image capturing under the illumination condition A, and the imaging condition for the image capturing under the illumination condition B is fixed.

The luminance variation calculation unit 21 reads, from the image memory 14, two images Ga, Gb which the imaging unit 13 obtained by capturing one after the other, under different illumination conditions, compares the luminance values I for each pixel, calculates and outputs a luminance variation dI between the images. The output luminance variation dI is supplied to the subject extraction unit 23.

Figure 3:
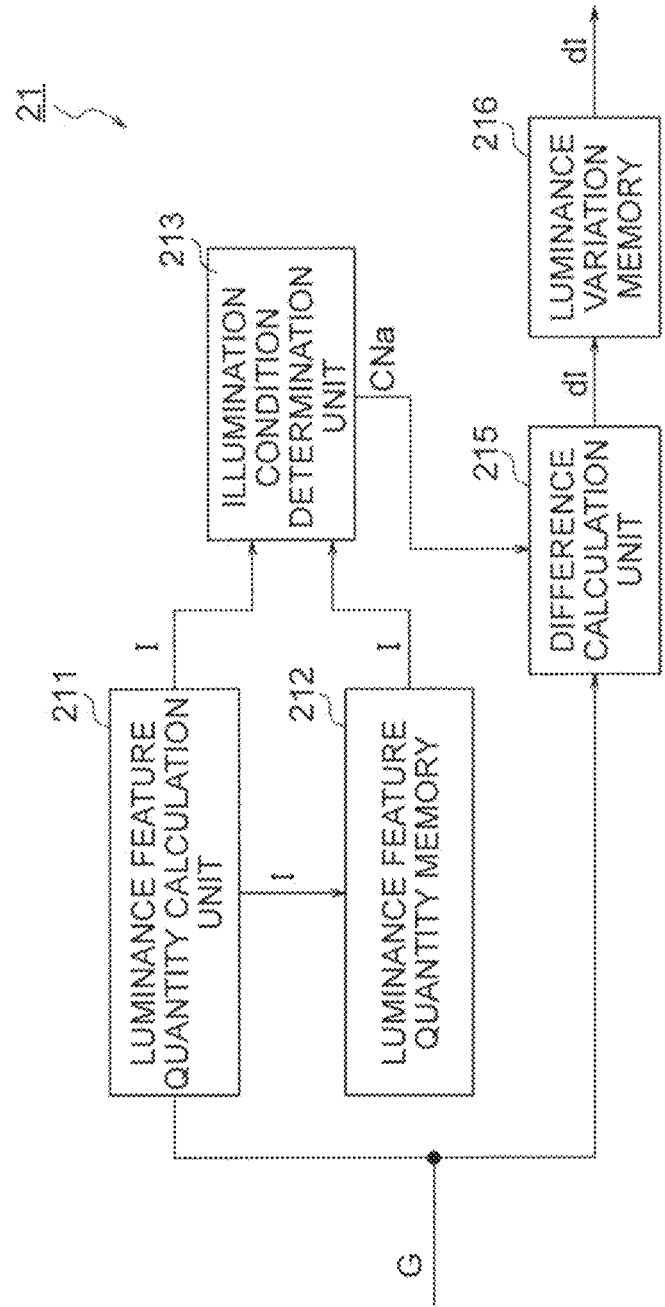
FIG. 3 is a block diagram showing the configuration of the luminance variation calculation unit in FIG. 1.

As shown in FIG. 3, the luminance variation calculation unit 21 includes a luminance feature quantity calculation unit 211, a luminance feature quantity memory 212, an illumination condition determination unit 213, a difference calculation unit 215, and a luminance variation memory 216.

The luminance feature quantity calculation unit 211 calculates the luminance feature quantity Im of the image of each frame read from the image memory 14. The luminance feature quantity Im is, for example, a luminance mean value, a luminance median value, or a luminance mode value. The luminance feature quantity Im calculated by the luminance feature quantity calculation unit 211 is stored in the luminance feature quantity memory 212, and read by the illumination condition determination unit 213, one frame period later, as the luminance feature quantity Im of the image of the preceding frame.

The illumination condition determination unit 213 reads the luminance feature quantity Im pertaining to the latest image (image of the latest frame) calculated by the luminance feature quantity calculation unit 211, and the luminance feature quantity Im pertaining to the image one frame before, from the luminance feature quantity memory 212. These images are two images having image capturing time points adjacent to each other, i.e., images of two frames one after the other. The illumination condition determination unit 213 compares the luminance feature quantities Im pertaining to the images of the two frames, and determines which of them is an image Ga of the illumination condition A, and which is an image Gb of the illumination condition B. The result of this determination, CNa, is supplied to the difference calculation unit 215.

For instance, it is determined that the image with the larger luminance feature quantity Im is an image Ga of the illumination condition A, and the image with the smaller luminance feature quantity Im is an image Gb of the illumination condition B.

The difference calculation unit 215 determines a difference in the luminance I for each pixel, between the image Ga of the illumination condition A and the image Gb of the illumination condition B, and outputs the difference as the luminance variation dI. That is, the difference calculation unit 215 calculates, for instance, the luminance difference dI(x,y) between the two images, from the luminance values I(x,y) for each pixel in the images.

Here, x and y denote coordinates in the images, and are related as follows:

$$x \in (0,1,\ldots,W-1), y \in (0,1,\ldots,H-1)$$

The luminance difference dI(x,y) is calculated by subtracting, from the luminance value of each pixel in the image Ga of the illumination condition A, the luminance value of the pixel at the same position in the image Gb of the illumination condition B. Which of the two images read from the image memory 14 is the image Ga of the illumination condition A is decided based on the determination result CNa output from the illumination condition determination unit 213.

If the result of the subtraction is a negative value, the luminance difference dI(x,y) is treated as being zero.

The luminance difference dI(x,y) calculated in this way is called a luminance variation.

The luminance difference dI(x,y) is stored as the luminance variation in the luminance variation memory 216. The stored luminance difference dI(x,y) is later supplied to the subject extraction unit 23.

A set of the luminance differences dI(x,y) for all the pixels, i.e., the luminance differences dI(x,y) arranged at the same positions as the respective pixels, is generated as a luminance difference image (luminance variation image).

The images output from the imaging unit 13 contain noise due to dark current or charge reading noise in the imaging elements. For example, the luminance variation calculation unit 21 may perform smoothing filtering, using a smoothing filter, not shown, on the images supplied from the imaging unit 13, and may thereafter determine the difference at the difference calculation unit 215. Alternatively, the luminance variation calculation unit 21 may remove the noise by performing smoothing filtering by means of a smoothing filter, not shown, on the luminance difference image calculated by the difference calculation unit 215, and output the result of the filtering as the luminance variation. As the smoothing filter, a Gaussian filter, a median filter or the like may be used.

By performing the above-mentioned smoothing filtering before calculating the luminance differences, noise due to the camera and the like can be removed. When the above-mentioned smoothing filtering is performed after calculating the luminance differences, the regions where the differences are small (that is noise) can be removed. Also, the above-mentioned smoothing filtering may be performed both before and after the luminance difference calculation.

By performing a threshold processing on the luminance difference image, a subject region can be extracted. However, if the subject region extraction is performed based only on the luminance difference image, the part where a change in the background, or movement of the subject has taken place may be erroneously determined to be a subject region. The part which is erroneously determined to be a subject region is called a region of false signals.

As will be described below, according to the present invention, a texture variation is also used to distinguish between the region of false signals and the region of the subject, enabling extraction of the subject region only.

The texture variation calculation unit 22 successively reads a plurality of images stored in the image memory 14, determines a texture feature F for each of the pixels constituting each image, calculates a texture variation dF between two images obtained by image capturing at two different time points, and supplies the calculated texture variation dF to the subject extraction unit 23.

The above-mentioned "two different time points" are, for example, frame periods which occur one after the other. Accordingly, the images captured at two different time points are, in the present embodiment, images Ga, Gb under two different illumination conditions. However, in the calculation of the texture variation dF, it is not essential that the illumination conditions are different, but what is essential is that the time points are different. Accordingly, to emphasize this aspect, the expression "two different time points" are sometimes used.

Figure 4:
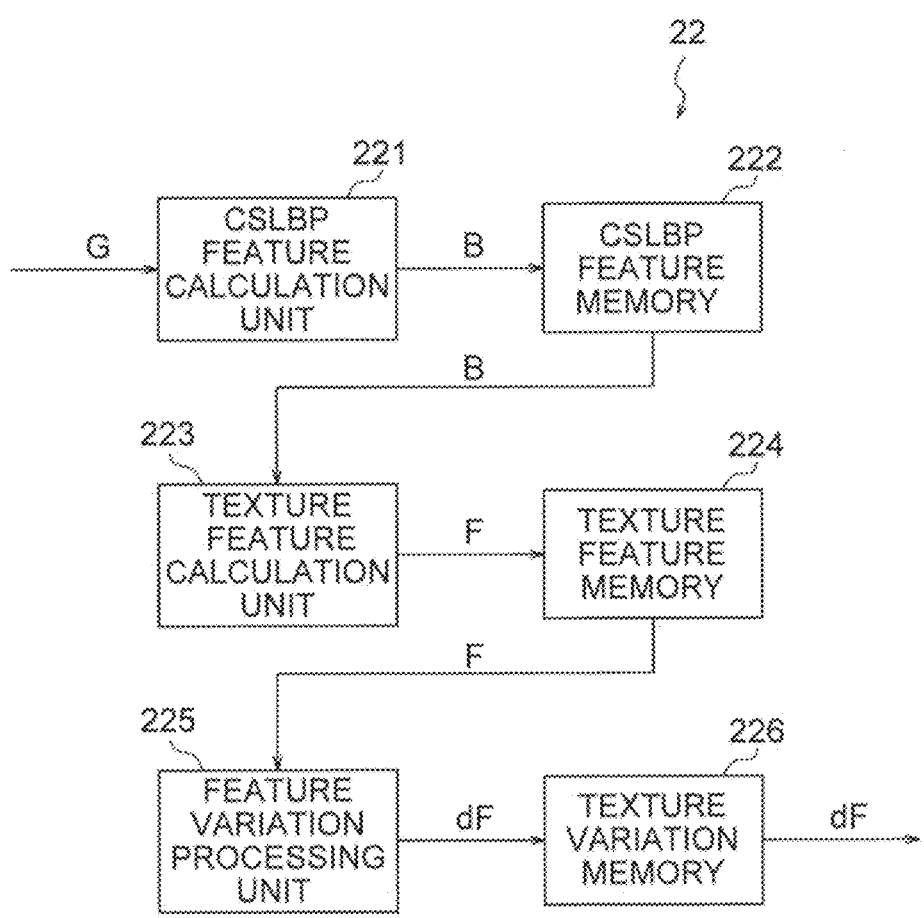
FIG. 4 is a block diagram showing the configuration of the texture variation calculation unit in FIG. 1.
Figure 6A:
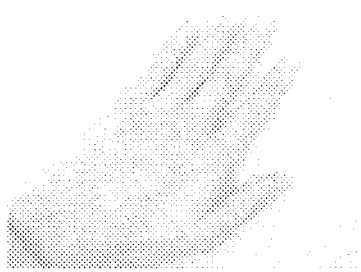
FIGS. 6(a) to 6(h) are diagrams showing the results of calculation of the CSLBP features on images captured under different illumination conditions, and luminance histograms of the images.
Figure 6B:
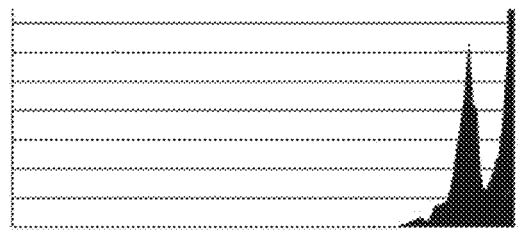
Figure 6C:
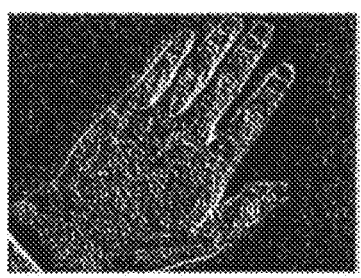
Figure 6D:
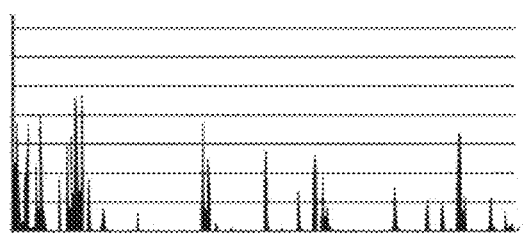
Figure 6E:
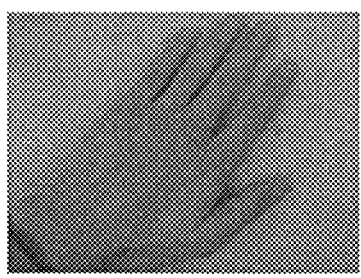
Figure 6F:
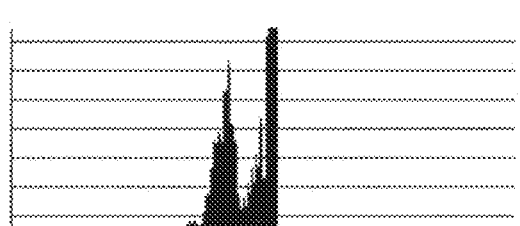
Figure 6G:
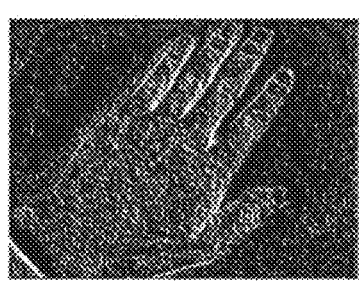
Figure 6H:
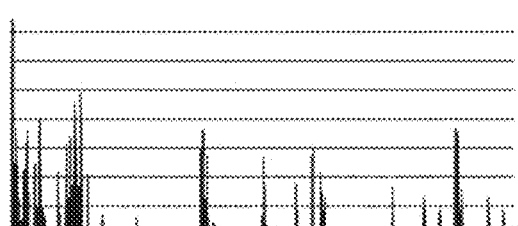

As shown in FIG. 4, the texture variation calculation unit 22 includes a CSLBP feature calculation unit 221, a CSLBP feature memory 222, a texture feature calculation unit 223, a feature variation processing unit 225, a texture feature memory 224, and a texture variation memory 226.

The CSLBP feature calculation unit 221 reads, from the image memory 14, an image captured at each time point (frame period), calculates a CSLBP feature B for each pixel in the image having been read, and causes the calculated CSLBP feature B to be stored in the CSLBP feature memory 222.

The texture feature calculation unit 223 reads the CSLBP feature B pertaining to each pixel in each image stored in the CSLBP feature memory 222, calculates the texture feature F pertaining to each pixel in the image, and causes it to be stored in the texture feature memory 224.

The feature variation processing unit 225 reads the texture features F pertaining to the same pixel (pixels at the same positions) in the two images from the texture feature memory 224, calculates the variation (texture variation) dF in the texture feature F between the images, and causes the calculated texture variation dF to be stored in the texture variation memory 226. The stored texture variation dF is later supplied to the subject extraction unit 23.

The texture feature F calculated by the texture feature calculation unit 223 is a feature which relates to the appearance of the subject or the background, and represents the patterns, the unevenness, or the reflectivity of the surface, which is little dependent on the illumination condition.

The texture feature F is, for example, represented by a feature vector numerically expressing the relationship, with respect to each pixel (pixel of interest) in the image, of the luminance values of the pixels at specific positions in a region (feature extraction region) centered on the pixel of interest.

The feature vector which can be used as one representing the texture feature F is desirably a feature vector which is robust to changes in the illumination (which is little affected by the change in the illumination), and is, for example, a HOG (Histogram of Gradient) feature vector formed of a histogram of the luminance gradients in the feature extraction region, or a feature vector formed of a histogram of LBPs (Local Binary Patterns) obtained by binary-coding the luminance gradients in the feature extraction region.

In the following description, it is assumed that, for each pixel, a histogram of CSLBP (Center Symmetric LBP) features, which are modifications of LBP features, for pixels in a square feature extraction region centered on the above-mentioned each pixel, is determined and used as the texture feature F. A histogram of CSLBPs is calculated according to Non-patent reference 1.

For the calculation of CSLBP feature B for each pixel, luminance values of 3×3 pixels centered on the above-mentioned each pixel are needed.

For the calculation of the texture feature for each pixel, CSLBP features B for all the pixels in the feature extraction region centered on the above-mentioned each pixel are needed.

Accordingly, the texture feature cannot be calculated for a pixel positioned at a peripheral edge part of the image.

In the following description, each of the vertical and horizontal sizes L of the feature extraction region is assumed to be 40 pixels. The size of the image is 640 pixels in the horizontal direction and 480 pixels in the vertical direction, as mentioned above, and the texture feature F is calculated for each of the pixels in a range of 600 pixels in the horizontal direction and 440 pixels in the vertical direction, formed by removing the parts up to 20 pixels from the edges in the horizontal direction, and up to 20 pixels from the edges in the vertical direction. The number of pixels (600) in the horizontal direction of the region in which the texture feature F is calculated is denoted by M, and the number of pixels (440) in the vertical direction is denoted by N.

In the following description, all the pixels in the range of 600 pixels in the horizontal direction and 440 pixels in the vertical direction may be referred simply as "all the pixels in the image".

Next, an exemplary method of calculation of a texture feature F pertaining to each pixel will be described.

First, the calculation of the CSLBP feature B by the CSLBP feature calculation unit 221 is explained with reference to FIG. 5.

The CSLBP feature B is calculated for all of the pixels in the image, except the pixels adjacent to the peripheral edges of the image (the first pixel as counted from the peripheral edge of the image).

Figure 5:
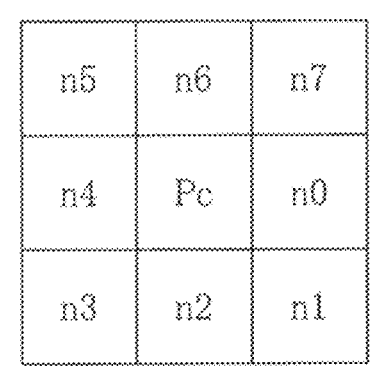

FIG. 5 shows assignment of numbers to pixels which are used for calculation of a CSLBP feature B pertaining to each pixel Pc(x,y) and are positioned in a region of 3×3 pixels centered on the above-mentioned each pixel.

The CSLBP feature B(x,y) pertaining to a pixel Pc(x,y) is calculated according to the equation (1) using luminance values of 3×3 pixels centered on the above-mentioned each pixel.

[Mathematical Expression 1]

$$B(x,y) = s(n0-n4)*2^0 + s(n1-n5) \times 2^1 + s(n2-n6)*2^2 + s(n3-n7) \times 2^3 \quad (1)$$

In the equation (1), n0 to n7 respectively represent luminance values of the pixels n0 to n7 in FIG. 5.

Also, s(a) is a threshold function, and s(a)=1 when a>T1, and s(a)=0 otherwise.

Since s(a) is either 0 or 1, the CSLBP feature B(x,y) is an integer, and the range of the values which can be taken by the CSLBP feature B(x,y) is given by:

$$0 \leq B(x,y) < 16 \ \forall x,y$$

According to Non-patent reference 1, it is desirable that the threshold value T1 is about 1% of the value which can be taken by the luminance value, and if the luminance value takes a value of 0 to 255, the setting is T1=3.

FIGS. 6(*a*) to 6(*h*) show examples of the results of the calculation of the CSLB features on the images captured under different illumination conditions, and the luminance histograms of the images. FIGS. 6(*a*) and 6(*b*) show an example of image Ga captured under illumination condition A, and a luminance histogram of the image, FIGS. 6(*c*) and 6(*d*) show CSLBP features calculated from the image of FIG. 6(*a*), and a histogram of the CSLBP features, FIGS. 6(*e*) and 6(*f*) show an example of image Gb captured under illumination condition B, and a luminance histogram of the image, and FIGS. 6(*g*) and 6(*h*) show CSLBP features calculated from the image of FIG. 6(*e*), and a histogram of the CSLBP features. As shown in FIGS. 6(*c*), 6(*d*), 6(*g*) and 6(*h*), the change in the CSLBP feature is small even when the illumination condition is changed, and the CSLBP feature is robust to changes in the illumination condition. Accordingly, if the CSLBP features are calculated for two images, the CSLBP features have very close values as long as the background and the subject are unchanged, irrespective of the illumination conditions determined by the imaging/irradiating control unit 11.

When the background has changed or the subject has moved between the two images, the values of the CSLBP features for the pixels:

$$Pc(xc, yc),$$

$$xc \in (0,1, \ldots, W-1), yc \in (0,1, \ldots, H-1),$$

which are included in the region where the background has changed, or the region where the subject has moved are changed.

The texture feature calculated using the CSLBP feature in a manner described later has similar characteristics.

By calculating the texture feature F for each pixel in the image, it is possible to grasp the feature of the texture in a local region in the image. By comparing the features of the texture for each local region, it is possible to identify the region where the feature of the texture has changed.

Accordingly, while it is necessary to use two images of different illumination conditions in order for the luminance variation calculation unit 21 to obtain the luminance variation due to the change in the illumination condition, it is not necessary to use two images of different illumination conditions in order for the texture variation calculation unit 22 to obtain the texture variation dF, but two images at different image capturing time points are sufficient. The two images with different image capturing time points may be images of the same illumination condition.

However, in the following description, it is assumed that the texture variation calculation unit 22 calculates the texture variation dF using the same images as the images used by the luminance variation calculation unit 21. That is, it is assumed that the texture variation dF is calculated using the two images Ga, Gb of the illumination condition A and the illumination condition B.

The texture feature calculation unit 223 generates a plurality of histograms of the CSLBP features pertaining to respective pixels included in the feature extraction region centered on each pixel, and generates, as a feature vector, a sequence of numbers obtained by synthesizing the plurality of histograms.

Figure 7:
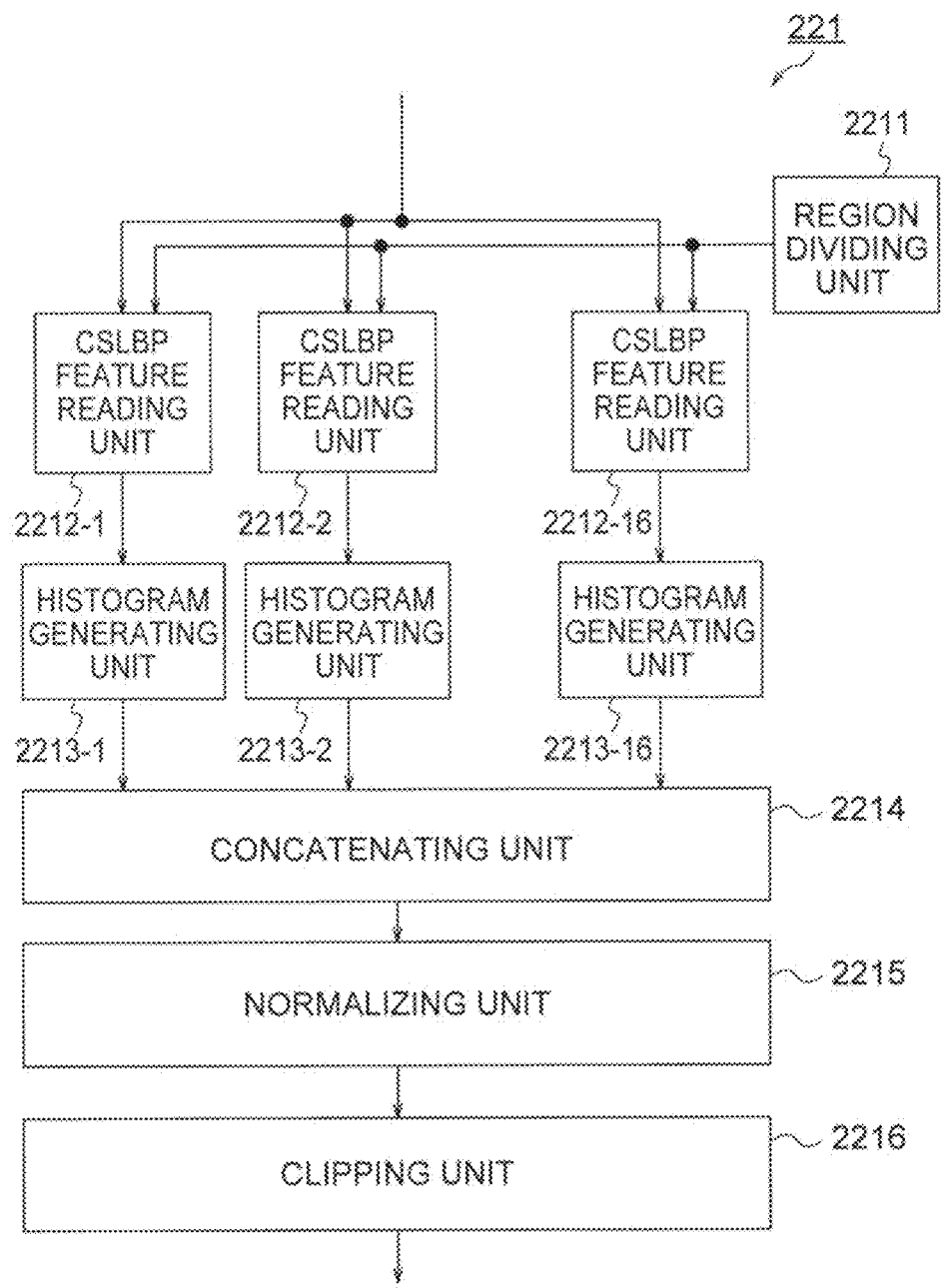
FIG. 7 is a block diagram showing the configuration of the texture feature calculation unit in FIG. 4.

For example, the texture feature calculation unit 223 includes a region dividing unit 2211, 1st to 16th CSLBP feature reading units 2212-1 to 2212-16, 1st to 16th histogram generating units 2213-1 to 2213-16, a concatenating unit 2214, a normalizing unit 2215, and a clipping unit 2216, as shown in FIG. 7.

Figure 8:
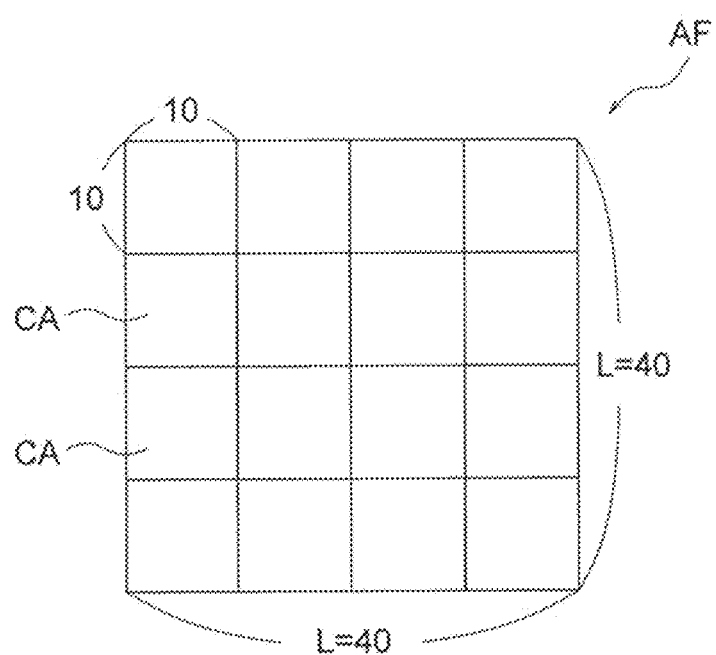
FIG. 8 is a diagram showing a method of dividing the feature extraction region into cells.

The region dividing unit 2211 divides the feature extraction region AF centered on each pixel into four in the vertical and horizontal directions, as shown in FIG. 8, to generate sixteen (16) cells CA. In the example under consideration, the feature extraction region AF includes 40×40 pixels, as described above, so that the size of each cell is 10×10 pixels.

The 16 cells GA are respectively allocated to; the 1st to 16th CSLBP feature reading units 2212-1 to 2212-16.

Each CSLBP feature reading unit 2212-*i* (i=1 to 16) reads, from the CSLBP feature memory 222, the CSLBP feature pertaining to each of the 10×10 pixels positioned in the cell which is allocated to the CSLBP feature reading unit 2212-*i*.

The CSLBP feature pertaining to each of the 10×10 pixels read by each CSLBP feature reading unit 2212-*i* is supplied to the corresponding histogram generating unit 2213-*i*.

The histogram generating unit 2213-*i* generates a histogram by determining the occurrence frequency of each value of the CSLBP feature read by the corresponding CSLBP feature reading unit 2212-*i*. Since the CSLBP feature can take a value of 0 to 15, a histogram of 16 bins is generated.

The concatenating unit 2214 concatenates the histograms generated by the 1st to 16th histogram generating units 2213-1 to 2213-16 to generate a histogram of 16×16=256 bins, and outputs it as a feature vector of 256 dimensions.

The normalizing unit 2215 normalizes the feature vector of 256 dimensions output from the concatenating unit 2214, so as to make the vector length to be one.

If each of the 256 elements constituting the feature vector is denoted by $v_i$ (i=0 to 255), the vector length $V_L$ is given by the following equation (2).

[Mathematical Expression 2]

$$V_L = \sqrt{\sum_{i=1}^{256} v_i^2} \quad (2)$$

The value $v_{ni}$ of each element after the normalization is given by the following equation (3).

[Mathematical Expression 3]

$$v_{ni} = \frac{v_i}{V_L} \quad (3)$$

The clipping unit 2216 performs a threshold processing (clipping) on each element of the normalized vector, so that any element having a value larger than T2 is made to have a value T2. According to Non-patent reference 1, T2 is given for example by:

T2=0.2.

In the example described above, 16 CSLBP reading units are provided. But less than 16 CSLBP reading units may be provided, and each CSLBP reading unit may be made to successively read the CSLBP features pertaining to all the pixels in two or more cells. For instance, a single CSLBP reading unit may be made to successively read the CSLBP features pertaining to all the pixels in the 16 cells. Similarly, instead of providing 16 histogram generating units, less than 16 histogram generating units may be provided and each histogram generating unit may be made to generate histograms for two or more cells. For instance, a single histogram generating unit may be made to successively generate histograms for 16 cells.

The texture feature calculation unit 223 outputs the feature vector after the above-mentioned clipping, as the texture feature F pertaining to the pixel positioned at the center of the feature extraction region.

The texture feature calculation unit 223 performs the above-described processes on each pixel in each image, and causes the calculated texture feature F to be stored in the texture feature memory 224.

The feature variation processing unit 225 reads, from the texture feature memory 224, the texture features F pertaining to the two images (i.e., the image Ga obtained by the image capturing at the time point t1a, and the image Gb obtained by the image capturing at the time point t1b), and calculates a variation (texture variation) dF between the images. The calculated texture variation dF is stored in the texture variation memory 226. The stored texture variation dF is later supplied to the subject extraction unit 23.

As has been described, the texture feature F is calculated for each of the pixels in the image, except the pixels in the peripheral edge part, and a variation in the texture feature between the two images, pertaining to the pixels at the same positions, is calculated as the variation in the texture feature.

The variation in the texture feature F can be obtained by comparing the feature vectors of 256 dimensions for each pixel in the two images. The variation in the feature vector is defined, for example, by a distance between the two feature vectors. As the distance between the vectors, for example, a Euclid distance, or a Manhattan distance is used.

In the following description, it is assumed that a Manhattan distance is used to calculate the variation in the feature vector. The Manhattan distance dF(t1a,t1b) between the feature vector F(t1a) at the time point t1a and the feature vector F(t1b) at the time point t1b can be determined by calculating the sum of the absolute values of the differences between corresponding elements of the two feature vectors. That is, the Manhattan distance dF(t1a,t1b) can be given by the following equation (4).

[Mathematical Expression 4]

$$dF(t1a, t1b) = \sum_{j=1}^{J} |f_{aj} - f_{bj}| \quad (4)$$

In the equation (4),
$f_{aj}$ (j=1 to J) is an element of the feature vector F(t1a), and $f_{bj}$ (j=1 to J) is an element of the feature vector F(t1b).

An element $f_{aj}$ and an element $f_{bj}$ having the same value of j correspond to each other.

J is the total number of the elements $f_{aj}$ of the feature vector F(t1a) or the elements $f_{bj}$ of the feature vector F(t1b). In the present example, J=256.

The feature variation processing unit 225 determines the distance between the feature vectors for each pixel, in the manner described above, and causes the determined distance to be stored as the texture variation dF in the texture variation memory 226. The stored texture variation dF is later supplied to the subject extraction unit 23.

The texture feature F is little affected by the changes in the illumination, but when the background has changed or the subject has moved, the texture variation dF becomes large. For this reason, the texture variation dF calculated between the image of the illumination condition A and the image of the illumination condition B can be recognized as a variation in the texture feature due to a change in the background, or a variation in the texture feature due to movement of a subject.

The subject extraction unit 23 extracts a subject region based on the image G read from the image memory 14, the luminance variation dI supplied from the luminance variation calculation unit 21, and the texture variation dF supplied from the texture variation calculation unit 22.

Figure 9:
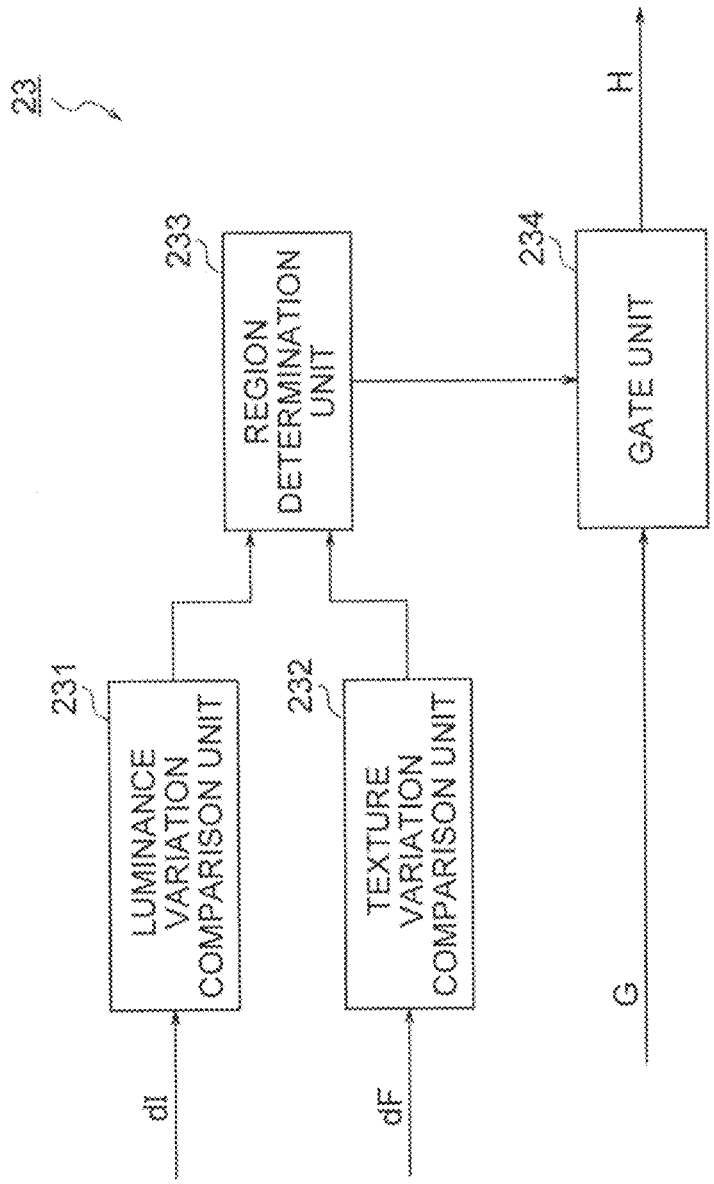
FIG. 9 is a block diagram showing the configuration of the subject extraction unit in FIG. 1.

As shown in FIG. 9, the subject extraction unit 23 includes a luminance variation comparison unit 231, a texture variation comparison unit 232, a region determination unit 233, and a gate unit 234.

The luminance variation comparison unit 231 determines whether the luminance variation dI pertaining to each pixel is larger than a threshold value TI.

The texture variation comparison unit 232 determines whether the texture variation dF pertaining to each pixel is larger than a threshold value TF.

The region determination unit 233 determines whether each pixel belongs to a subject region (is positioned in such a region), or belongs to a background region, or belongs to a region of false signals due to movement of a subject or a change in the background, based on the result of the determination by the luminance variation comparison unit 231 and the result of the determination by the texture variation comparison unit 232 for the above-mentioned each pixel.

If the result of the determination by the luminance variation comparison unit 231 indicates that the luminance variation dI is "not larger than the threshold value TI", the pixel in question is determined to belong to a background region.

If the result of the determination by the luminance variation comparison unit 231 indicates that the luminance variation dI is "larger than the threshold value TI", and the result of the determination by the texture variation comparison unit 232 indicates that the texture variation dF is "not larger than the threshold value TF", the pixel in question is determined to belong to a subject region.

If the result of the determination by the luminance variation comparison unit 231 indicates that the luminance variation dI is "larger than the threshold value TI", and the result of the determination by the texture variation comparison unit 232 indicates the texture variation dF is "larger than the threshold value TF", the pixel in question is determined to belong to a region of the false signals.

The gate unit 234 outputs the luminance values of the pixels which are among the pixels constituting the image G, and which have been found by the region determination unit 233 to belong to a subject region, as the luminance values of the pixels in the subject region.

The set of the pixels output by the gate unit 234, that is, the pixels having been found to belong to the subject region, constitute a subject region.

By such a process, the gate unit 234 outputs part of the image G read from the image memory 14, which coincides with the subject region, as the result of extraction of the subject region H. The result of extraction of the subject region H represents an image of the subject region H.

The reason why it is appropriate to extract a subject region by the above-described processing is explained below.

First, the effects of a change in the illumination condition, a change in the background, and movement of the subject, on the luminance variation and the texture variation are explained. As, shown in FIG. 10, when the illumination condition is changed, a luminance variation occurs in the subject region.

When a change in the background or movement of the subject occurs, a luminance variation occurs in the region where the change or the movement occurs (for example, the part where the position of the edge is changed due to the movement). For this reason, if a part where the luminance variation has occurred were found to be a subject region without regard to any other condition, a region where the background has changed or the subject has moved would be erroneously detected as a subject region. Therefore, according to the present invention, a determination based on the texture variation is also made to distinguish between the subject region and the region where the luminance has changed due to the change in the background or the movement of the subject.

That is, as was explained with reference to FIGS. 6(c), 6(d), 6(g) and 6(h), a change in the illumination condition does not cause any texture variation in a subject region (FIG. 10). On the other hand, when the background changes or the subject moves, a texture variation occurs at the part where the change or the movement occurs (FIG. 10). Based on this difference, it is possible to make a distinction between the subject region and the region where the luminance has changed due to the change in the background or the movement of the subject.

Accordingly, it is possible to determine that the region which is within a region where the luminance variation has occurred, and in which no texture variation has occurred is a region where the luminance variation has occurred due to a change in the illumination, and is a part constituting the subject. On the other hand, the region where the texture variation as well as the luminance variation has occurred can be determined to be a region where the luminance variation has occurred due to the change in the background or the movement of the subject, i.e., the region of false signals.

By using the above-described determination method, the subject extraction unit 23 extracts the subject region based on the luminance variation dI and the texture variation dF.

For instance, a threshold value TI is set for the magnitude of the luminance variation dI, and the luminance variation comparison unit 231 determines that a pixel for which the luminance variation dI is found to be larger than the threshold value TI is a "pixel for which a luminance variation has occurred". Similarly, a threshold value TF is set for the magnitude of the texture variation dF, and the texture variation comparison unit 232 determines that a pixel for which the texture variation dF is found to be larger than the threshold value TF is a "pixel for which a texture variation has occurred".

The region determination unit 233 determines that a pixel for which a luminance variation is found to have occurred by the luminance variation comparison unit 231, and no texture variation is found to have occurred by the texture variation comparison unit 232 is a pixel which belongs to a subject region.

In this case, the determination by the region determination unit 233 is made according to the below-noted criteria.

(a) A pixel for which a luminance variation has occurred and a texture variation has occurred is a pixel which belongs to a region of false signals.

(b) A pixel for which a luminance variation has occurred and no texture variation has occurred is a pixel which belongs to a subject region.

(c) A pixel other than (a) and (b), that is, a pixel for which no luminance variation has occurred is a pixel which belongs to a background region.

However, since the purpose of the process is to extract a subject region, the determination based on (b) only may be performed, and the determinations based on (a) and (c) may be omitted.

The gate unit 234 reads, from the image memory 14, one of the images used for the luminance calculation, and outputs the luminance values of the pixels which are in the image having been read, and which have been determined to belong to a subject region by the region determination unit 233, as the extraction result of the subject region H.

In the above-described example, the result of the determination by the luminance variation comparison unit 231 and the result of the determination by the texture variation comparison unit 232 for each pixel are combined by the region determination unit 233 to make a determination as to whether the pixel in question belongs to a subject region. That is, the determinations by the luminance variation comparison unit 231, the texture variation comparison unit 232 and the region determination unit 233 are made pixel by pixel.

Alternatively, the determinations by the luminance variation comparison unit 231, the texture variation comparison unit 232 and the region determination unit 233 may be made image by image (frame by frame). That is, it may be so arranged that the luminance variation comparison unit 231 extracts a set of the pixels which are within the entire image and for which a luminance variation has occurred, as a luminance variation region, the texture variation comparison unit 232 extracts a set of the pixels which are within the entire image and for which a texture variation has occurred, as a texture variation region, and the region determination unit 233 determines the region consisting of pixels which belong to the luminance variation region, and which do not belong to the texture variation region, as a subject region H.

In this case, the determination by the region determination unit 233 is made according to the below-noted criteria.

(a) A region where a luminance variation has occurred and a texture variation has occurred is a region of false signals.
(b) A region where a luminance variation has occurred, and no texture variation has occurred is a subject region.
(c) A region other than (a) and (b), that is a region where no luminance variation has occurred is a background region.

However, since the purpose of the process is to extract a subject region, the determination based on (b) only may be made, and the determinations based on (a) and (c) may be omitted.

The gate unit 234 reads, from the image memory 14, one of the images used for the luminance calculation, and outputs the luminance values of the pixels which are in the image having been read, and which belong to a region which has been found to be a subject region H by the region determination unit 233, as the luminance values of the image of the subject region H.

The threshold value TI used in the luminance variation comparison unit 231 and the threshold value TF used in the texture variation comparison unit 232 may not be fixed values and may be adaptively modified by a known technique. For example, the threshold values may be set by applying a percentile method, a mode method, a discriminant analysis method or the like to a set of the luminance variations dI or a set of the texture variations dF.

As was described before, the images output from the imaging unit 13 contain a substantial amount of noise due to dark current or charge reading noise in the imaging element, so that the luminance variation supplied from the luminance variation calculation unit 21 and the texture variation supplied from the texture variation calculation unit 22 may contain noise.

For this reason, the subject extraction unit 23 may perform smoothing filtering on the luminance variation dI, for example, by means of a smoothing filter, not shown, before performing the threshold processing at the luminance variation comparison unit 231. Also, when the luminance variation comparison unit 231 performs processes on an image-by-image basis, smoothing filtering may be performed after the threshold processing at the luminance variation comparison unit 231.

Similarly, smoothing filtering may be performed on the texture variation dF using a smoothing filter, not shown, before the threshold processing at the texture variation comparison unit 232 is performed. Also, when the texture variation comparison unit 232 performs processes on an image-by-image basis, smoothing filtering may be performed after the threshold processing at this texture variation comparison unit 232.

In addition, if the region determination unit 233 performs processes on an image-by-image basis, smoothing filtering may be performed on the results of the determination by the region determination unit 233.

As the smoothing filter, a Gaussian filter, or a median filter, for example, may be used.

Next, examples of the operation of extracting a subject region by the subject extraction unit 23 are explained with reference to FIGS. 11(a) to 11(e) and FIGS. 12(a) to 12(e). Here, the subject is assumed to be a human hand.

First, the operation of extracting a subject region in a case in which the subject has not moved, but the background has changed due to disappearance of a background element is explained with reference to FIGS. 11(a) to 11(e). FIGS. 11(a) to 11(e) show the captured images, the luminance variation quantity, the texture variation quantity, and the extracted subject region in a case in which, between the time point t1a and the time point t1b, the background changed because of a disappearance of an element B1 constituting part of the background.

FIGS. 11(a) and 11(b) show the captured images at the time points t1a and t1b, respectively, and also show the luminance at parts along the line BL, in the form of a graph (with the horizontal axis extending in the x axis direction of the image coordinate system, and the vertical axis representing the luminance). FIG. 11(c) indicates, by white, a region where the luminance changed between the time point t1a and the time point t1b, and also show the luminance variation quantity at parts along the line BL, in the form of a graph (with the horizontal axis extending in the x-axis direction of the image coordinate system, and the vertical axis representing the luminance variation quantity). FIG. 11(d) indicates, by white, a region where the texture changed between the time point t1a and the time point t1b, and also show the texture variation quantity at parts along the line BL, in the form of a graph (with the horizontal axis extending in the x-axis direction of the image coordinate system, and the vertical axis representing the texture variation quantity). FIG. 11(e) indicates, by white, an extracted subject region.

The image of the time point t1a shown in FIG. 11(a) is an image Ga captured under the illumination condition A, and the image of the time point t1b shown in FIG. 11(b) is an image Gb captured under the illumination condition B.

The subject H did not move between the time point t1a and the time point t1b. A background element B1 in the background was present at the time point t1a, but was not present at the time point t1b. For instance, the background element B1 is the sun, which was seen at the time point t1a, but was hidden by a building at the time point t1b.

The background element B1 is very bright, so that it is not affected by the light emitted by the irradiating unit 12. The part (background part) B2 of the background other than the background element B1 is sufficiently far from the irradiating unit 12 and the imaging unit 13, so that it is not affected by the light emitted by the irradiating unit 12.

Referring to the captured images in FIGS. 11(a) and 11(b), the luminance variation in FIG. 11(c), and the texture variation in FIG. 11(d), the luminance variation and the texture variation of the subject H, the background element B1, and the part B2 other than the background element B1 are described.

The intensity of the light emitted by the irradiating unit 12 is stronger in the illumination condition A than in the illumination condition B, so that the luminance of the subject H at the time point t1a is higher than the luminance of the subject H at the time point t1b. The subject H is therefore extracted as a region where the luminance variation has occurred, as shown in FIG. 11(c). On the other hand, the change in the illumination condition does not cause any veriation in the texture feature on the subject H. Accordingly, the subject is not extracted as a region where the texture variation has occurred (FIG. 11(d)).

The background element B1 differs in the brightness and the texture feature from the background part B2, the region where the background element B1 disappeared between the time point t1a and the time point t1b is extracted as a region where the luminance variation has occurred (FIG. 11(c)), and also as a region where the texture variation has occurred (FIG. 11(d)).

No change occurred in the luminance and the texture between the time point t1a and the time point t1b in the background part B2 (to be accurate, the region of the background at the time point t1b, which is other than the region where the background element B1 existed at the time point t1a), so that the background part B2 is not extracted as a luminance variation region, nor as a texture variation region (FIG. 11(c) and FIG. 11(d)).

By recognizing a region where a luminance variation has occurred, and no texture variation has occurred as a subject region, and recognizing a region where a luminance variation has occurred and, also, a texture variation has occurred as a region of false signals, it is possible to distinguish the subject region from the region where the background element B1 has disappeared, and to extract the subject region H only, as shown in FIG. 11(e).

Next, the operation of extracting a subject region in a case in which the subject has moved is explained with reference to FIGS. 12(a) to 12(e). FIGS. 12(a) to 12(e) show the captured images, the luminance variation quantity, the texture variation quantity, and the extracted subject region in a case in which, between the time point t1a and the time point t1b, the subject H moved and, also, the background changed because of movement of an element B1 constituting part of the background.

Figure 12E:
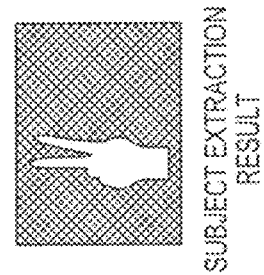
FIGS. 12(a) to 12(e) are diagrams showing an example of extraction of a subject region by the imaging apparatus of the first embodiment.
Figure 12C:
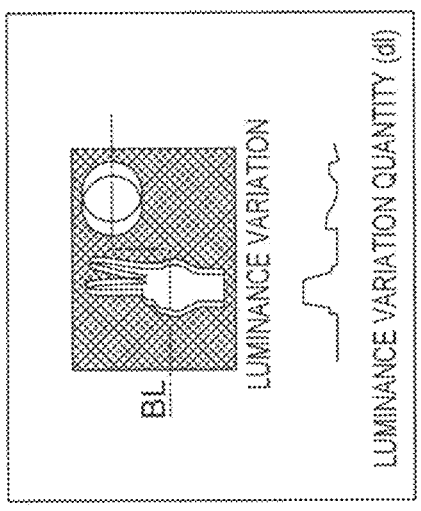
Figure 12D:
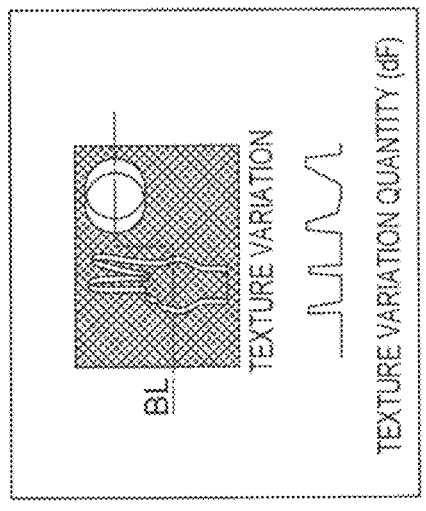
Figure 12A:
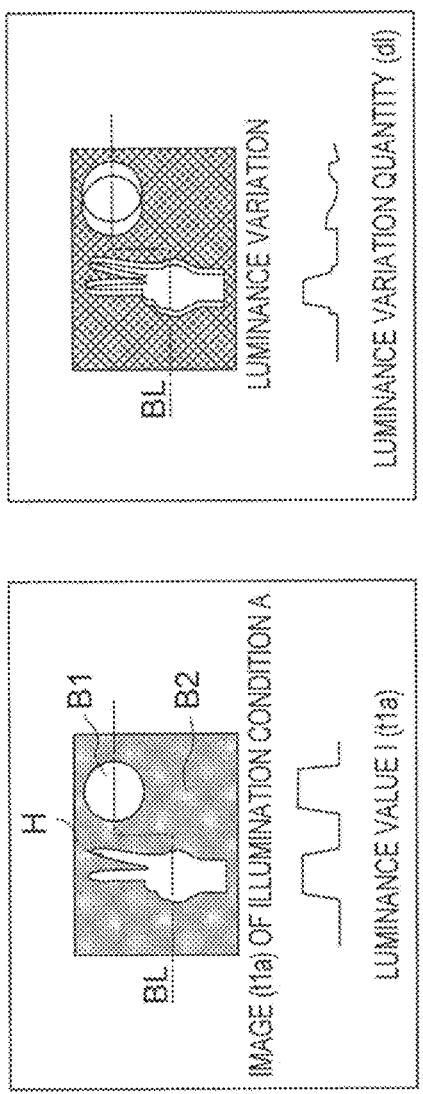
Figure 12B:
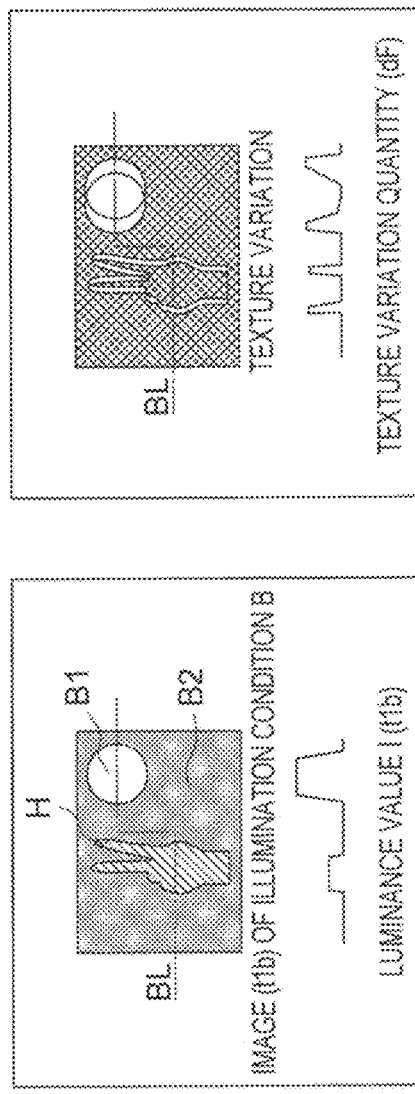

FIGS. 12(a) and 12(b) show the captured images at the time points t1a and t1b, respectively, and also show the luminance at parts along the line BL, in the form of a graph (with the horizontal axis extending in the x axis direction of the image coordinate system, and the vertical axis representing the luminance). FIG. 12(c) indicates, by white, a region where the luminance changed between the time point t1a and the time point t1b, and also show the luminance variation quantity at parts along the line BL, in the form of a graph (with the horizontal axis extending in the x-axis direction of the image coordinate system, and the vertical axis representing the luminance variation quantity). FIG. 12(d) indicates, by white, a region where the texture changed between the time point t1a and the time point t1b, and also show the texture variation quantity at parts along the line BL, in the form of a graph (with the horizontal axis extending in the x-axis direction of the image coordinate system, and the vertical axis representing the texture variation quantity). FIG. 12(e) indicates, by white, an extracted subject region.

The image of the time point t1a shown in FIG. 12(a) is an image Ga captured under the illumination condition A, and the image of the time point t1b shown in FIG. 12(b) is an image Gb captured under the illumination condition B.

The subject H moved to the right between the time point t1a and the time point t1b.

Like the subject H, a background element B1 in the background moved to the right between the time point t1a and the time point t1b.

The background element B1 is very bright, so that it is not affected by the light emitted by the irradiating unit 12. The part B2 of the background other than the background element B1 is sufficiently far from the irradiating unit 12 and the imaging unit 13, so that it is not affected by the illuminating light from the irradiating unit 12.

Referring to the captured images in FIGS. 12(a) and 12(b), the luminance variation in FIG. 12(c), and the texture variation in FIG. 12(d), the luminance variation and the texture variation of the subject H, the background element B1, and the part B2 other than the background element B1 are described.

The intensity of the light emitted by the irradiating unit 12 is stronger in the illumination condition A than in the illumination condition B, so that the luminance of the subject H at the time point t1a is higher than the luminance of the subject H at the time point t1b. The subject H is therefore extracted as a region where the luminance variation has occurred in the luminance variation calculation result shown in FIG. 12(c). Also, because the subject H moved, the boundary parts on the left and right sides of the subject (the part which changed from the subject to the background, and the part which changed from the background to the subject) are extracted as regions where the luminance variation has occurred (FIG. 12(c)). That is, in the boundary part on the left side of the subject region (the part which changed from the background to the subject), a luminance variation is detected because of the difference between the brightness of the subject under the illumination condition B and the brightness of the background part B2, while in the boundary part on the right side of the subject region (the part which changed from the subject to the background), a luminance variation is detected because of the difference between the brightness of the subject under the illumination condition A and the brightness of the background part B2.

Also, because the subject H moved, the boundary parts on the left and right sides of the subject H (the part which changed from the background to the subject, and the part which changed from the subject to the background) are extracted as texture variation regions, because of the difference in the texture feature between the background part B2 and the subject H (FIG. 12(d)).

The background element B1 differs in the brightness and the texture feature from the background part B2, and since the background element B1 moved between the time point t1a and the time point t1b, the boundary parts on the left and right sides of the background element B1 are extracted as luminance Variation regions (FIG. 12(c)), and also as texture variation regions (FIG. 12(d)).

No change occurred in the luminance and the texture between the time point t1a and the time point t1b in the background part B2 (to be accurate, the part which was not part of the background element B1 at the time point t1a, nor at the time point t1b), so that the background part B2 is not extracted as a luminance variation region, nor as a texture variation region (FIG. 12(c), FIG. 12(d)).

By recognizing a region where a luminance variation has occurred and no texture variation has occurred as a subject region, and recognizing a region where a luminance variation has occurred and, also, a texture variation has occurred as a region of false signals, it is possible to distinguish the subject region from the boundary parts of the subject H (the parts where the luminance has changed), and the boundary parts of the background element B1 (the parts where the luminance has changed), and to extract the subject region H only, as shown in FIG. 12(e).

As has been described, according to the present invention, it is possible to distinguish the subject region from the background region and also from the region of false signals, based on the luminance variation and the texture variation, thereby extracting the subject region with a high accuracy.

If there are differences in the patterns, the unevenness, or the reflectivity of the surface of the subject or the background element, (objects or the like constituting the background) so that the luminance is not uniform, movement of the subject or the background element causes changes in the texture feature not only in the vicinity of the region boundary, but also in the interior of the subject region or the background region. However, according to the present embodiment, a texture feature is calculated for a feature extraction region defined for each pixel. Instead of just each pixel and its adjacent pixels, pixels in a greater range are used for the determination, so that the effects of the movement of the subject or the background element on the texture feature variation in the subject region or the background region is reduced. The variation in the texture feature at the region boundary is relatively large compared with the variation within the region, unless the texture of the subject and the texture of the background element are similar to each other. For this reason, by performing a threshold processing on the texture variation, only the texture variation at the region boundary can be extracted, by distinguishing it from the texture variation within the region.

Next, a processing procedure in the imaging apparatus of the first embodiment will be described with reference to FIG. 13.

Figure 13:
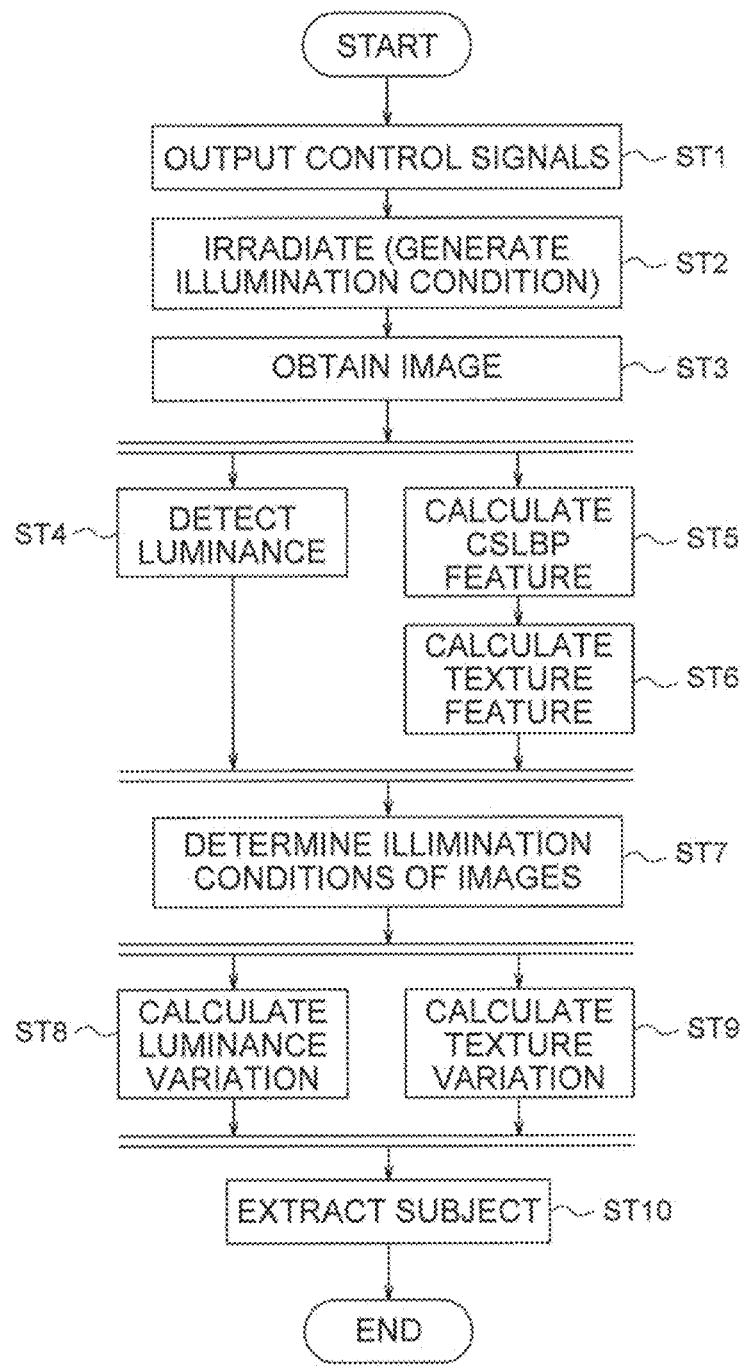
FIG. 13 is a flowchart showing an exemplary processing procedure in the imaging apparatus of the first embodiment.

The process shown in FIG. 13 is performed frame by frame, i.e., once a frame, period.

First, in a step ST1, prior to the image capturing in each frame period, the imaging/irradiating control unit 11 generates the control signals C11a and C11b, and outputs them to the irradiating unit 12 and the imaging unit 13.

The imaging/irradiating control unit 11 controls the irradiating unit 12, causing it to perform the irradiation with the illumination condition A and the irradiation with the illumination condition B alternately frame by frame. For instance, the control is so made that the irradiation with the illumination condition A is performed for the odd-numbered frames, and the irradiation with the illumination condition B is performed for the even-numbered frames. Such control over the illumination condition can be regarded as one taking two frame periods as one cycle, and causing the illumination with the illumination condition A to be performed in the first frame in each cycle, and causing the illumination with the illumination condition B to be performed in the second frame.

Next, in a step ST2, the irradiating unit 12 performs irradiation based on the control signal C11a from the imaging/irradiating control unit 11. By this irradiation, an illumination condition corresponding to the control signal C11a is generated.

Next, in a step ST3, image capturing is performed under the illumination condition generated by the step ST2, to obtain a captured image, and the captured image is stored in the image memory 14.

Next, in a step ST4, the luminance feature quantity calculation unit 211 in the luminance variation calculation unit 21 reads the latest image from the image memory 14, and determines the luminance feature quantity Im of the image having been read. The calculated luminance feature quantity Im is stored in the luminance feature quantity memory 212.

In a step ST5 performed in parallel with the step ST4, the CSLBP feature calculation unit 221 in the texture variation calculation unit 22 reads the latest image from the image memory 14, and calculates the CSLBP feature B of each pixel in the image having been read. The calculated CSLBP feature B is stored in the CSLBP feature memory 22.

Next, in a step ST6, the texture feature calculation unit 223 in the texture variation calculation unit 22 reads the CSLBP features pertaining to respective pixels in the latest image from the CSLBP feature memory 222, and calculates the texture feature F pertaining to each pixel in the same image based on the CSLBP features B having been read. The calculated texture feature F is stored in the texture feature memory 224.

Next, in a step ST7, the illumination condition determination unit 213 in the luminance variation calculation unit 21 reads the luminance feature quantity Im of the latest image and the luminance feature quantity Im of the image one frame before, from the luminance feature quantity memory 212, compares them, decides which of the images has the larger luminance feature quantity Im, and determines, based on the result of the decision, which of the images is an image Ga of the illumination condition A, and which is an image Gb of the illumination condition B. The result of this determination, CNa, is supplied to the difference calculation unit 215.

After the step ST7, the process proceeds to steps ST8 and ST9.

In the step ST8, the difference calculation unit 215 in the luminance variation calculation unit 21 reads, from the image memory 14, the latest image (image of the current frame), and the image one frame before, and calculates the luminance difference of each pixel. The calculated luminance difference is stored as the luminance variation dI in the luminance variation memory 216, and is later supplied to the subject extraction unit 23.

In the calculation of the difference, based on the result of the identification in the step ST7, the luminance value of each pixel in the image Gb of the illumination condition B (the image which was found to have the smaller luminance feature quantity Im in the step ST7) is subtracted from the luminance value of the pixel at the same position in the image Ga of the illumination condition A (the image which was found to have the larger luminance feature quantity Im in the step ST7). If the result of the subtraction is a negative value, the luminance difference is treated as being zero.

The calculated luminance variation dI of each pixel is stored in the luminance variation memory 216.

In the step ST9, the feature variation processing unit 225 in the texture variation calculation unit 22 calculates the texture variation dF of each pixel between the latest image and the image one frame before. The calculated texture variation dF of each pixel is stored in the texture variation memory 226.

After the steps ST8 and ST9, the process proceeds to a step ST10.

In the step ST10, the subject extraction unit 23 extracts a subject region based on the luminance variation dI and the texture variation dF.

In the extraction of the subject region, the determination as to whether each pixel belongs to the subject region or not may be made pixel by pixel, or frame by frame. Below, a procedure in which the determination is made on a pixel-by-pixel basis is first described with reference to FIG. 14, after which a procedure in which the determination is made on a frame-by-frame basis is described with reference to FIG. 15.

Figure 14:
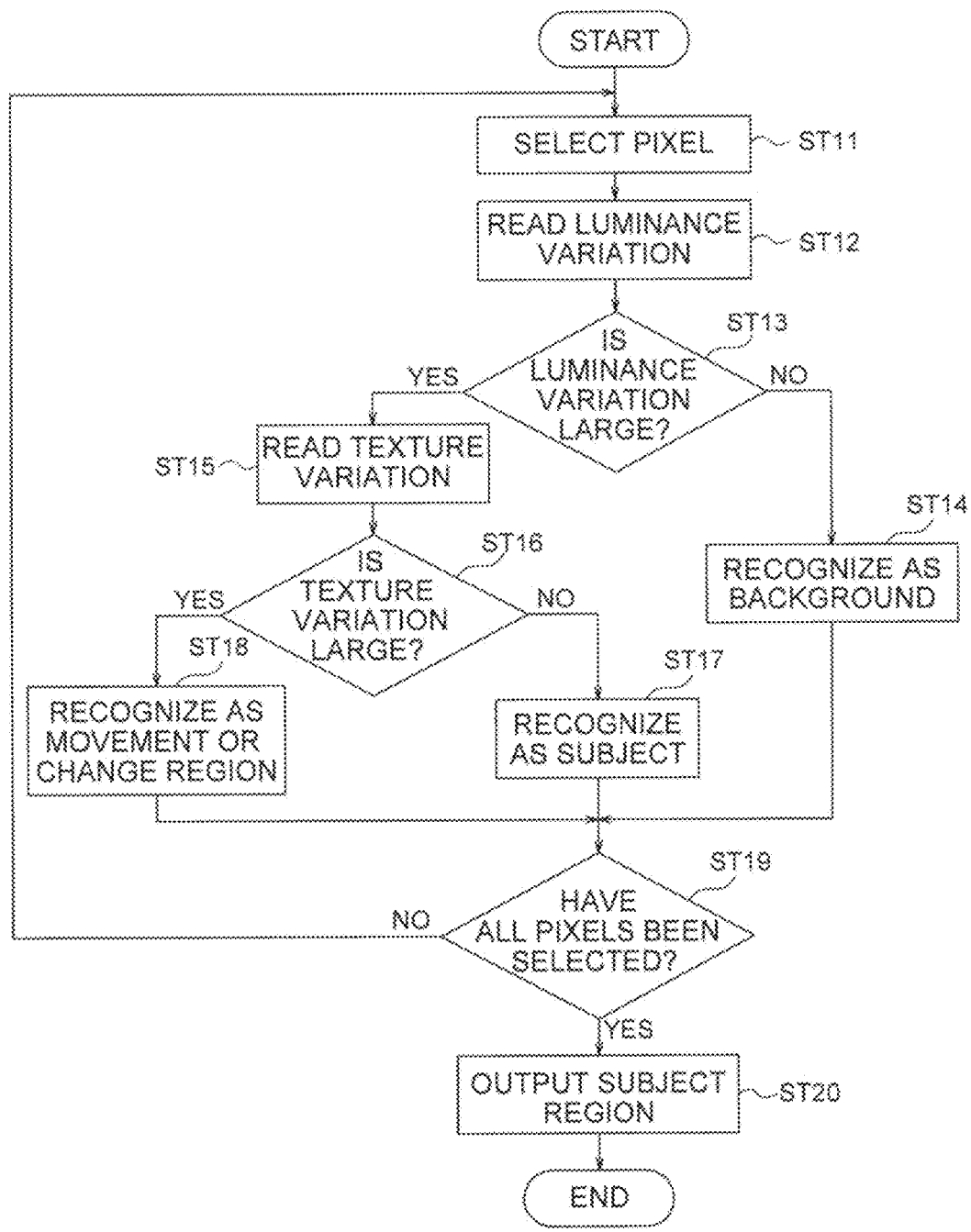
FIG. 14 is a flowchart showing an exemplary procedure of the subject extraction step in FIG. 13.

In the procedure shown in FIG. 14, first, in a step ST11, one of the pixels in the image to be processed is selected. Here, the pixels in the image to be processed means pixels in the part other than the peripheral edge part of the image. This also applies to the following description. Moreover, all the pixels positioned in the part other than the peripheral edge part may be referred to simply as "all the pixels in the image".

The selection may be in the order from the upper left to the lower right of the image.

Next, in a step ST12, the luminance variation dI pertaining to the selected pixel (pixel of interest) is read from the luminance variation memory 216. Next, in a step ST13, whether the read luminance variation dI is larger than the threshold value TI (that is, whether the luminance variation is "present" or "absent" is determined.

If the luminance variation dI is not larger than the threshold value TI (if the luminance variation is "absent"), the pixel of interest is determined to belong the background region (ST14).

If the luminance variation dI is larger than the threshold value TI, the process proceeds to a step ST15. In the step ST15, the texture variation dF pertaining to the pixel of interest is read from the texture variation memory 226.

Next, in a step ST16, whether the read texture variation dF is larger than the threshold value TF (whether the texture variation is "present" or "absent") is determined.

If it is found that the texture variation dF is not larger than the threshold value TF (it is found that the texture variation is "absent"), the pixel of interest is determined to belong to the subject region (ST17).

If it is found that the threshold value TF is exceeded (it is found that the "texture variation" is present), the pixel of interest is determined to be in a part where the subject has moved, or the background has changed, that is a region of false signals (ST18). Here, the part where the subject has moved means a part which was a part of the subject one frame before, and was a part of the background in the latest frame, or a part which was a part of the background one frame before, and was a part of the subject in the latest frame. According to the present invention, these parts are not recognized as parts of the subject.

Next, in a step ST19, whether all the pixels in the image to be processed have been selected, that is whether the processes of the steps ST12 to ST18 have been performed for all the pixels in the image to be processed is determined. If there is any pixel yet to be selected, the process returns to the step ST11.

If all the pixels have been selected, the process proceeds to a step ST20.

In the step ST20, a set of the pixels which were determined to belong the subject region in the step ST17 is output as the extraction result of the subject region H.

Since the purpose of the process is to extract the subject region, the processes of the steps ST14 and ST18 may be omitted. In this case, if the result of the determination in the step ST13 is NO, or if the result of the determination in the step ST16 is YES, the process proceeds directly to the step ST19.

Figure 15:
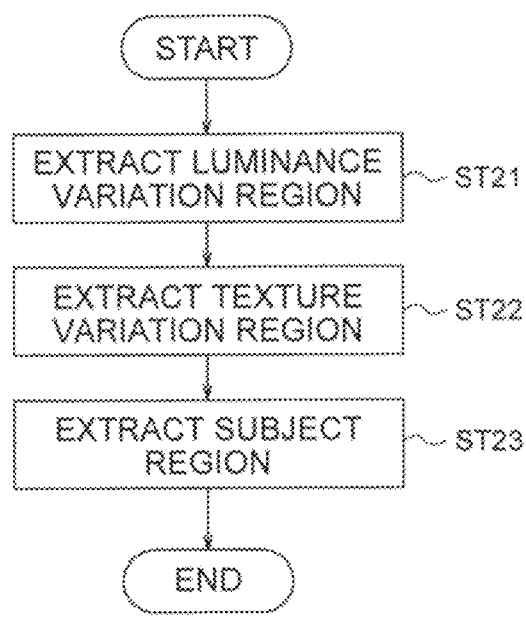
FIG. 15 is a flowchart showing another exemplary procedure of the subject extraction step in FIG. 13.

In the procedure shown in FIG. 15, first, in a step ST21, the pixels in the image are successively selected, the luminance variation dI of the selected pixel is read from the luminance variation memory 216, and whether the read luminance variation dI is larger than the threshold value TI (that is, whether the luminance variation is "present" or "absent") is determined. A set of the pixels for which the luminance variation is found to be "present" is extracted as a luminance variation region.

In a next step ST22, the pixels in the image are successively selected, the texture variation dF of the selected pixel is read from the texture variation memory 226, and whether the read texture variation dF is larger than the threshold value TF (that is whether the texture variation is "present" or "absent") is determined. A set of the pixels for which the texture variation is found to be "present" is extracted as the texture variation region.

In a next step ST23, a set of the pixels which belong to the "luminance variation region" and which do not belong to the "texture variation region" is extracted as the "subject region".

In the next step ST20, a set of the pixels which were determined to belong to the subject region extracted in the step ST23 is output as the extraction result of the subject region H.

In the above example, the texture feature F is calculated for all the pixels in the image, and is stored in the texture feature memory 224, and, thereafter, the texture features F for the same pixel in the two images are read and the texture variation dF is calculated. Alternatively, it may be so arranged that when the texture feature F is calculated for each pixel in each image, the texture variation dF is calculated from the texture feature F that has just been calculated, and the texture feature F (stored for instance in the texture feature memory 224) calculated previously for the pixel at the same position in the image one frame before. With such an arrangement, the time from the image capturing to the calculation of the texture variation dF can be shortened.

Figure 16:
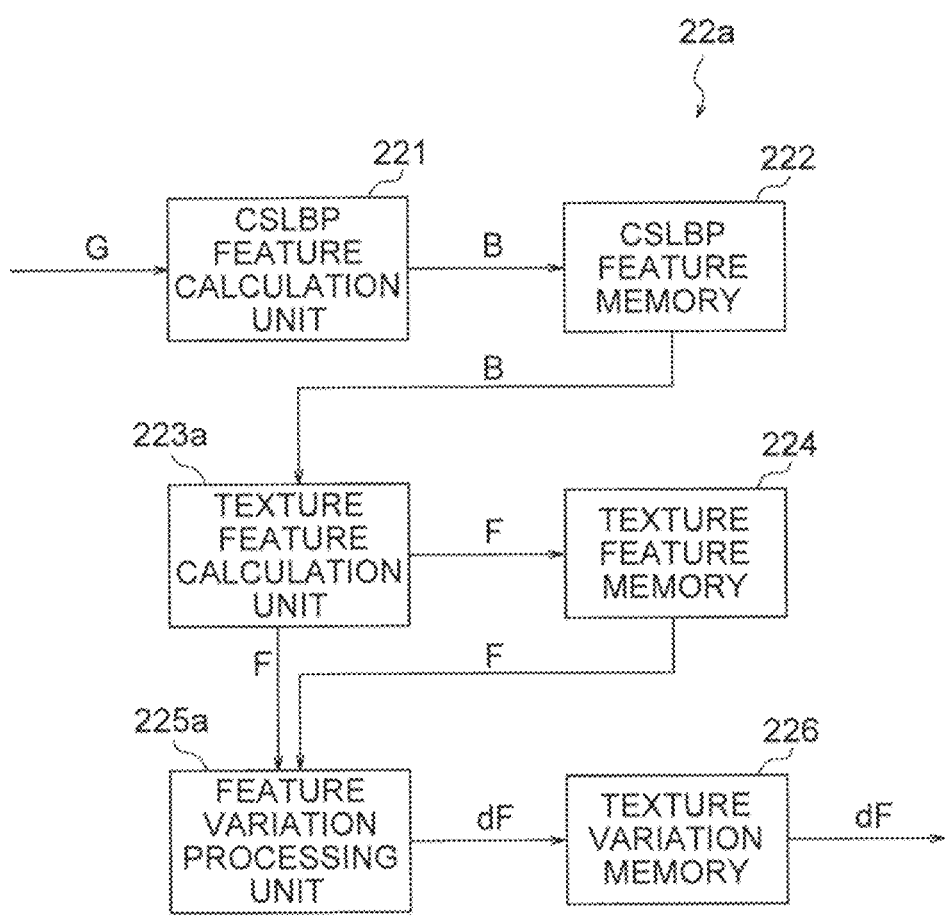
FIG. 16 is a block diagram showing the configuration of a variation of the texture variation calculation unit of the first embodiment.

When the process is performed in such a procedure, a texture variation calculation unit 22a shown in FIG. 16 is used in place of the texture variation calculation unit 22 shown in FIG. 4. The texture variation calculation unit 22a shown in FIG. 16 includes a CSLBP feature calculation unit 221, a CSLBP feature memory 222, a texture feature calculation unit 223a, a texture feature memory 224, a feature variation processing unit 225a, and a texture variation memory 226.

Among the components shown in FIG. 16, the CSLBP feature calculation unit 221, the CSLBP feature memory 222, the texture feature memory 224, and the texture variation memory 226 are similar to those shown in FIG. 4.

The texture feature calculation unit 223a successively calculates the texture feature F pertaining to each pixel in each image read from the image memory 14, and causes it to be stored in the texture feature memory 224, and supplies it to the feature variation processing unit 225a.

The feature variation processing unit 225a receives the texture feature F calculated by the texture feature calculation unit 223a for the pixel being selected (pixel of interest) in the latest image, receives the texture feature F pertaining to the pixel at the same position in the image one frame before, stored in the texture feature memory 224, and calculates a variation between the two texture features, and causes the result of the calculation as the texture variation dF in the texture variation memory 226. The stored texture variation dF is later supplied to the subject extraction unit 23.

Figure 17:
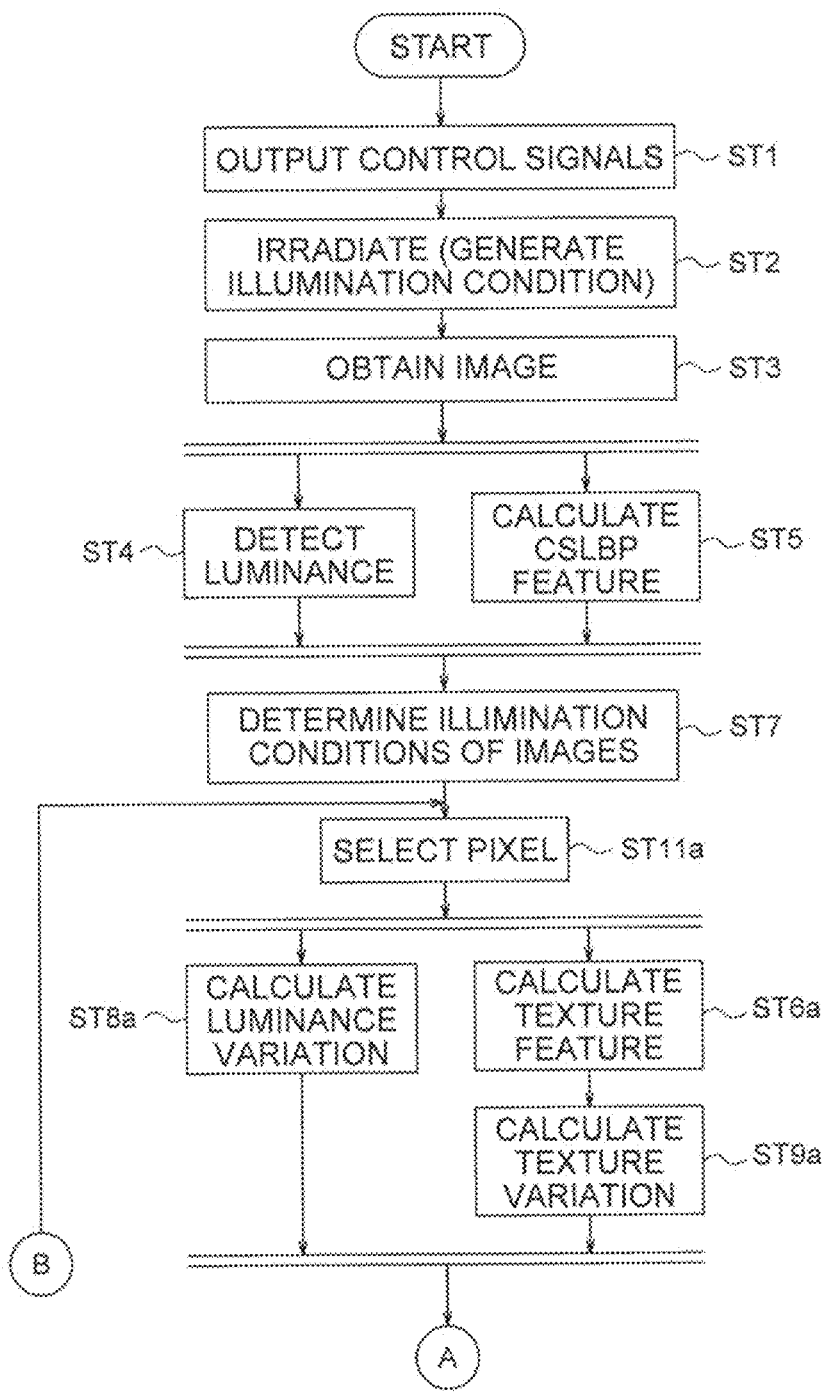
FIG. 17 is a flowchart showing a processing step in a variation of the imaging apparatus of the first embodiment.
Figure 18:
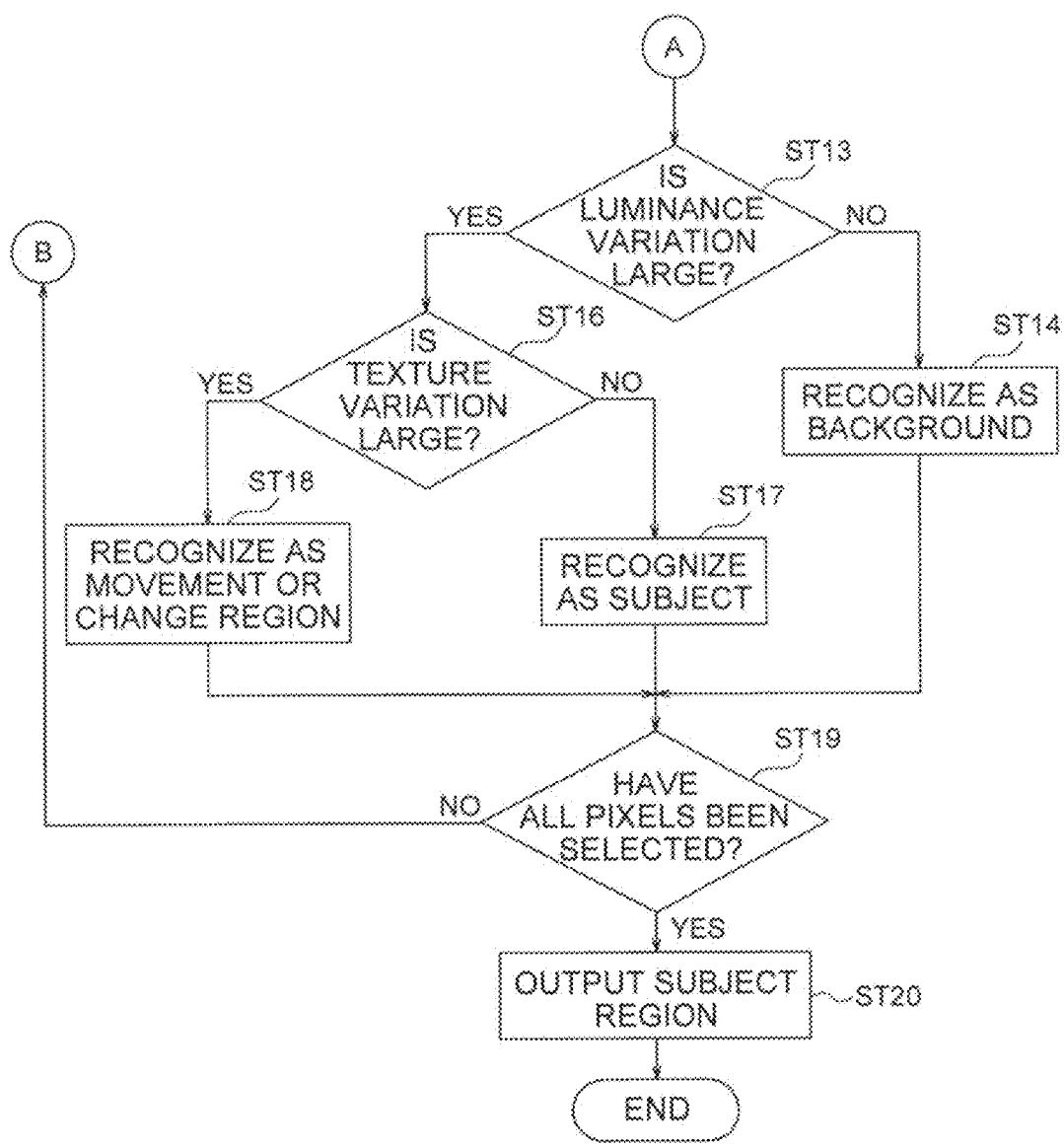
FIG. 18 is a flowchart showing a processing step in a variation of the imaging apparatus of the first embodiment.

A processing procedure to be followed in this case is shown in FIG. 17 and FIG. 18.

In FIG. 17 and FIG. 18, the same reference characters as in FIG. 13 denote identical or similar processes.

That is, the processes in the steps ST1 to ST4, ST5, and ST7 in FIG. 17 are identical to those in FIG. 13.

After the step ST7, the process proceeds to a step ST11a.

In the step ST11a, one of the pixels in the image to be processed is selected.

After the step ST11a, the process proceeds to a step ST8a and a step ST6a.

In the step ST8a, the difference calculation unit 215 in the luminance variation calculation unit 21 reads luminance values of the selected pixel (pixel of interest) in the latest image and the pixel at the same position as the pixel of interest in the image one frame before, stored in the image memory 14, calculates the luminance difference, and causes the calculated difference to be stored as a luminance variation dI in the luminance variation memory 216. The stored luminance variation dI is later supplied to the subject extraction unit 23.

In the step ST6a, the texture feature calculation unit 223a calculates the texture feature F for the selected pixel (pixel of interest), causes the calculated texture feature F to be stored in the texture feature memory 224, and supplies it to the feature variation processing unit 225a.

In a step ST9a, the feature variation processing unit 225a calculates the texture variation dF pertaining to the pixel of interest, from the texture feature pertaining F to the pixel of interest, supplied from the texture feature calculation unit 223a (calculated in the step ST6a), and the texture feature F pertaining to the pixel at the same position in the image one frame before, stored in the texture feature memory 224, and causes the calculated texture variation dF to be stored in the texture variation memory 226. The stored texture variation is later supplied to the subject extraction unit 23.

The steps ST6a, ST8a, and ST9a in FIG. 17 differ from the steps ST6, ST8, and ST9 in FIG. 13 in that the processes in the steps ST6a, ST8a, and ST9a are for the selected pixels whereas the processes in the step ST6, ST8, and ST9 are for all the pixels constituting the image.

After the steps ST8a and ST9a, the process proceeds to the step ST13.

In the step ST13, whether the luminance variation dI calculated in the step ST8a is larger than the threshold value TI (that is whether the luminance variation is "present" or "absent") is determined.

If the threshold value TI is not exceeded (if the luminance variation is "absent"), the pixel of interest is determined to belong to the background region (ST14).

If the threshold value TI is exceeded, the process proceeds to the step ST16. In the step ST16, whether the texture variation dF calculated in the step ST9a is larger than the threshold value TF (whether the texture variation is "present" or "absent") is determined.

If it is found that the threshold value TF is not exceeded (if the texture variation is found to be "absent"), the pixel of interest is determined to belong to a subject region (ST17).

If it is found that the threshold value TF is exceeded (if the texture variation is found to be "present"), the pixel of interest is determined to belong to a region of false signals (ST18).

Next, in the step ST19, whether all the pixels in the image to be processed have been selected, that is whether the processes of the steps ST6a, ST8a, ST9a, ST13, ST14, and ST16 to ST18 have been performed for all the pixels is determined. If there is any pixel yet to be selected, the process returns to the step ST11a.

If all the pixels have been selected, the process proceeds to the step ST20.

In the step ST20, a set of the pixels which were determined to belong to the subject region in the step ST17 is output as the extraction result of the subject region.

As was also described with reference to FIG. 13, the processes of the steps ST14 and ST18 may be omitted. In this case, in the case of "NO" in the step ST13, or in the case of "YES" in the step ST16, the process proceeds directly to the step ST19.

In the procedure shown in FIG. 17 and FIG. 18, the processes of the step ST6a and ST9a are performed before the step ST13. Alternatively, it may be so arranged that if the result of the determination in the step ST13 is "YES", then the processes of the step ST6a and the step ST9a are performed, and thereafter the process proceeds to the step ST16.

As has been described, according to the imaging apparatus of the present embodiment, the imaging/irradiating control unit 11 outputs the control signal C11a for controlling the illumination condition and the control signal C11b for controlling the imaging condition, the irradiating unit 12 generates two different illumination conditions based on the control signal C11a, the imaging unit 13 captures the image of the subject under the two different illumination conditions, the luminance variation calculation unit 21 calculates the luminance variation dI between the two images captured under the different illumination conditions, the texture variation calculation unit 22 calculates the texture variation dF between the two images captured at the different time points, and the subject extraction unit 23 distinguishes the luminance variation which has occurred in the subject due to the illumination change, from the luminance variation due to the background change or the subject movement, based on the luminance variation dI and the texture variation dF.

Accordingly, the extraction of the subject region can be achieved with a high accuracy.

According to the imaging apparatus of the present embodiment, paying attention to a characteristic in which a luminance variation and a texture variation occur in a region where the background change or the subject movement occurs, whereas only a luminance variation due to the illumination change occurs in a situation in which no background change nor subject movement occurs, the region where the luminance variation is large and the texture variation is small is recognized as a subject region, making it possible to remove the effects of the background change and the subject movement, and to extract the subject region with a high accuracy.

Also, two illumination conditions, namely, a first illumination condition in which the light is emitted with a first light emitting intensity, and a second illumination condition in which the light is emitted with a second light emitting intensity which is smaller than the first light emitting intensity are used. Accordingly, the subject region can be extracted using the luminance variation and the texture variation, by a simple configuration and processes.

Furthermore, by making the illumination conditions for capturing the images used for the calculation of the luminance variation by the luminance variation calculation unit 21, and the illumination conditions for capturing the images used for the calculation of the texture variation by the texture variation calculation unit 22 to be identical with each other, it is possible to determine whether the cause of the luminance variation is the illumination change, or either of the background change and the subject movement, making it possible to extract the subject region with a high accuracy.

In the imaging apparatus of the present embodiment, the irradiation distribution with which the illuminating light is appropriately irradiated on the subject which is desired to be extracted can be used as one of the illumination conditions, and by doing so, it is possible to obtain the images which are suitable for the calculation of the luminance variation and the texture variation regardless of the position and the size of the subject.

Moreover, the intensity with which the illuminating light of such a light quantity suitable for the reflectivity of the subject which is desired to be extracted is irradiated can be used as one of the illumination conditions, and by doing so, it is possible to obtain images which are suitable for the calculation of the luminance variation and the texture variation.

Furthermore, both of the above-mentioned two conditions mentioned above can be used as the illumination conditions, and by doing so, it is possible to obtain images suitable for the calculation of the luminance variation and the texture variation, depending on the position, the size and the reflectivity of the subject.

In the present embodiment, two illumination conditions (illumination condition A and illumination condition B) which are related to the intensity of the emitted light are used to extract the subject region. However, two illumination conditions related to the irradiation distribution of the illuminating light on the subject may be used. For instance, if the position of the subject in the captured image is fixed to a certain degree, the illumination condition may be so set that the illuminating light is properly distributed on to the position of the subject. Also, the irradiation distribution may be set depending on the change in the local ambient light. The irradiation distribution may be adjusted by changing the irradiation angles of the LEDs, or by selecting the LEDs to be turned on to emit light, among the plurality of LEDs.

In the above-described embodiment, the calculations of the luminance variation and the texture variation are performed between two images. However, the present invention is not limited to this scheme, and the calculations of the luminance variation and the texture variation may be performed between three or more images. In summary, it is satisfactory if the calculations of the luminance variation and the texture variation are performed between a plurality of images. When the calculation of the luminance variation is performed between three or more images, images captured under mutually different illumination conditions are used. When the calculation of the texture variation is performed between three or more images, images captured at mutually different time points are used. The images captured at mutually different time points may be images captured under mutually different illumination conditions. Accordingly, they may be the same as the images which are used for the calculation of the luminance variation.

Increase of the number of images used for the calculation of the luminance variation and the texture variation leads to increase in the memory amount or the processing load, i.e., increase in the required hardware resources and the processing time. These points must be taken into account in determining the number of the images used for the calculation of the luminance variation and the texture variation.

In the present embodiment, the luminance value of the image Gb of the illumination condition B is subtracted from the luminance value of the image Ga of the illumination condition A for generating the difference image. The present invention is not limited to this. For instance an absolute value of the luminance difference may be used.

In the present embodiment, the texture variation is calculated using the images which are also used for the calculation of the luminance variation. The present invention is not limited to this. If two images captured at different time points are used, it is possible to detect the background change or the subject movement by calculating the texture variation, without regard to the illumination condition.

However, it is necessary to use images captured at timings, close enough to the images used for the calculation of the luminance variation.

In the present embodiment, the texture variation dF is calculated for all the pixels in the image. However, based on the calculated luminance variation dI, the texture variation dF may be calculated only for the pixels, which are in a region where the luminance variation has occurred (the luminance variation dI is larger than the threshold value TI). In this case, the amount of processing of the texture variation dF is reduced.

In the above-described embodiment, a square feature extraction region centered on the pixel of interest is used for the calculation of the texture feature. The shape of the feature extraction region is not limited to square. That is, the shape of the feature extraction region may be of a circle, or any polygon, not being limited to a rectangle. However, in any case, it is desirable that the feature extraction region is centered on the pixel of interest. Also, the size of the feature extraction region is not limited to the above example.

In the above-described embodiment, the texture feature and the texture variation are calculated for each of all the pixels in the image, other than the peripheral edge part.

However, the present invention is not limited to this scheme. For instance, the texture feature and the texture variation may be calculated only for the pixels which are at positions at a predetermined interval in the image, other than the peripheral edge part. For instance, a lattice pattern may be drawn on the image as shown in FIG. 19, and the texture feature and the texture variation may be calculated only for such pixels which are positioned at the lattice points.

Figure 19:
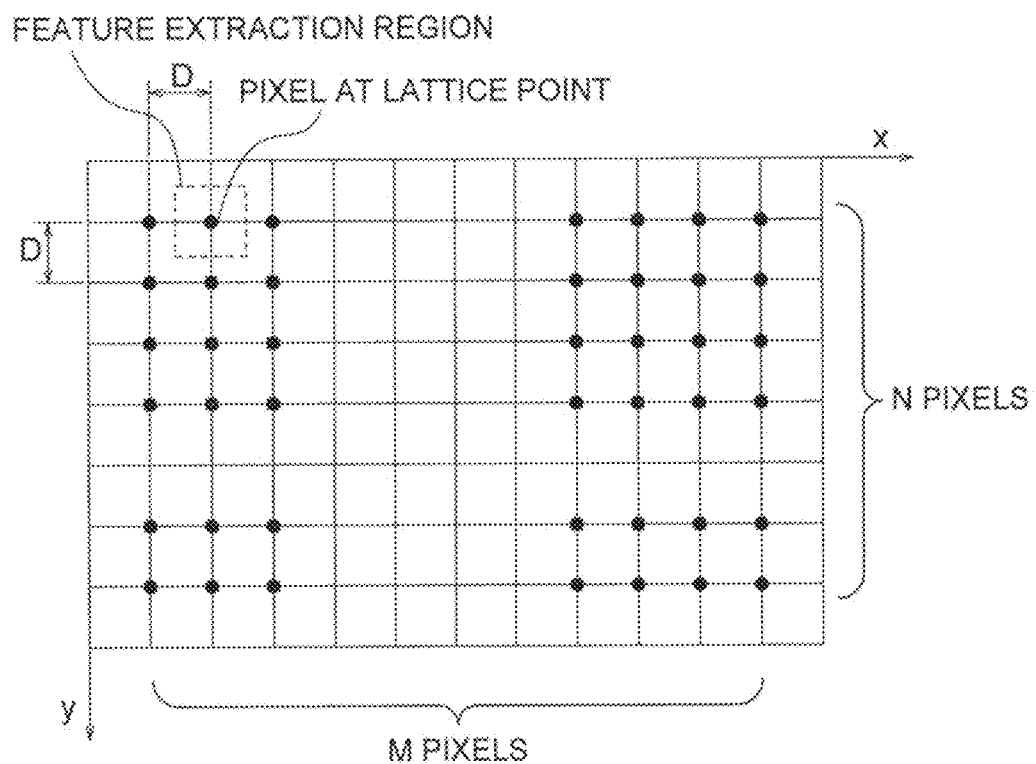
FIG. 19 is a diagram showing an arrangement of pixels used for the calculation of a texture feature in a variation of the first embodiment.

In the example shown in FIG. 19, the lattice is a square lattice, and the intervals in the vertical direction and in the horizontal direction between the lattice points are denoted by a reference character D.

When the texture feature and the texture variation are calculated only for the pixels which are positioned at the lattice points as shown in FIG. 19, with regard to the pixels at positions other than the lattice points, the texture feature and the texture variation calculated for the pixel at the closest lattice point may be used as the texture feature and the texture variation of the pixels at the positions other than the lattice points.

The example in which the texture feature and the texture variation are calculated for all the pixels, described in the above embodiment, corresponds to a case in which D is one pixel in FIG. 19.

The pixels for which the texture feature and the texture variation are calculated are not limited to those positioned at the lattice points in the image.

The intervals between the pixels, and hence the density of the pixels for which the texture feature and the texture variation are calculated need not be uniform throughout the image. For instance, when the position at which the subject is present in the image is known in advance, the density of the pixels for which the texture feature and the texture variation are calculated may be made high in the region near such a position, and may be made low in other regions.

In the above-described embodiment, the feature extraction region is divided into 4×4 cells for the calculation of the texture feature. However, the number of cells is not limited to this. For instance, by reducing the size of each cell, and increasing the number of cells in the feature extraction region, more detailed texture feature can be obtained. But the processing load is increased because of the increase in the number of dimensions of the feature vector. The number of cells and the size of each cell should be determined taking account of these points and the characteristics of the apparatus to which the present invention is applied.

In the above-described embodiment, the illumination conditions of the images read from the image memory 14 are identified from the luminance feature quantities (e.g., the luminance mean values) of the images. The present invention is not limited to this scheme.

For instance, it may be so arranged that, like the control signal C11a supplied to the irradiating unit 12, a signal indicating the illumination condition (e.g., the light emitting intensity) is supplied to the imaging unit 13, the imaging unit 13 identifies the illumination condition based on the above-mentioned signal, adds information (appendix information) indicating the illumination condition when causing the captured image to be stored in the image memory 14, and the luminance variation calculation unit 21 identifies the illumination conditions of the images based on the appendix information, when reading the images from the image memory 14.

In the above-described embodiment, one of the images used for the luminance calculation is read from the image memory 14, and the part of the read image which coincides with the subject region extracted by the subject extraction unit 23 is taken as the extraction result (subject image). However, the present invention is not limited to this.

For instance, such part of the image consisting of the luminance variations calculated by the luminance variation calculation unit 21 (the image in which the luminance variations for all the pixels are arranged in the same manner as the corresponding pixels), i.e., the luminance difference image, which coincides with the subject region extracted by the subject extraction unit 23 may be taken as the extraction result (subject image). The use of part of the luminance difference image as the subject image is advantageous because the luminance difference image is free from the effects of the ambient light.

Furthermore, in the above-described embodiment, the luminance variation calculation unit 21 reads, from the image memory 14, the latest image and the image one frame before, and calculates the luminance variation of each pixel between the two images. As a result, the luminance variation is calculated between the image Ga of the illumination condition A and the subsequent image Gb of the illumination condition B, and the luminance variation is also calculated between the image Gb of the illumination condition B and the subsequent image Ga of the illumination condition A. This is also true for the texture variation.

Alternatively, the luminance variation calculation unit 21 may be so configured that the luminance variation is calculated between the image Ga of the illumination condition A, and the image Gb of the illumination condition B, of the immediately succeeding frame, and the luminance variation is not calculated between the image Ga of the illumination condition A, and the image Gb of the illumination condition B, of the immediately preceding frame. In other words, the arrangement may be such that the luminance variation is calculated only when the latest image is an image Gb of the illumination condition B, and the immediately preceding image is an image Ga of the illumination condition A. Similarly, the texture variation calculation unit 22 may be so configured to calculate the texture variation only when the latest image is an image Gb of the illumination condition B, and the immediately preceding image is an image Ga of the illumination condition A.

Figure 20:
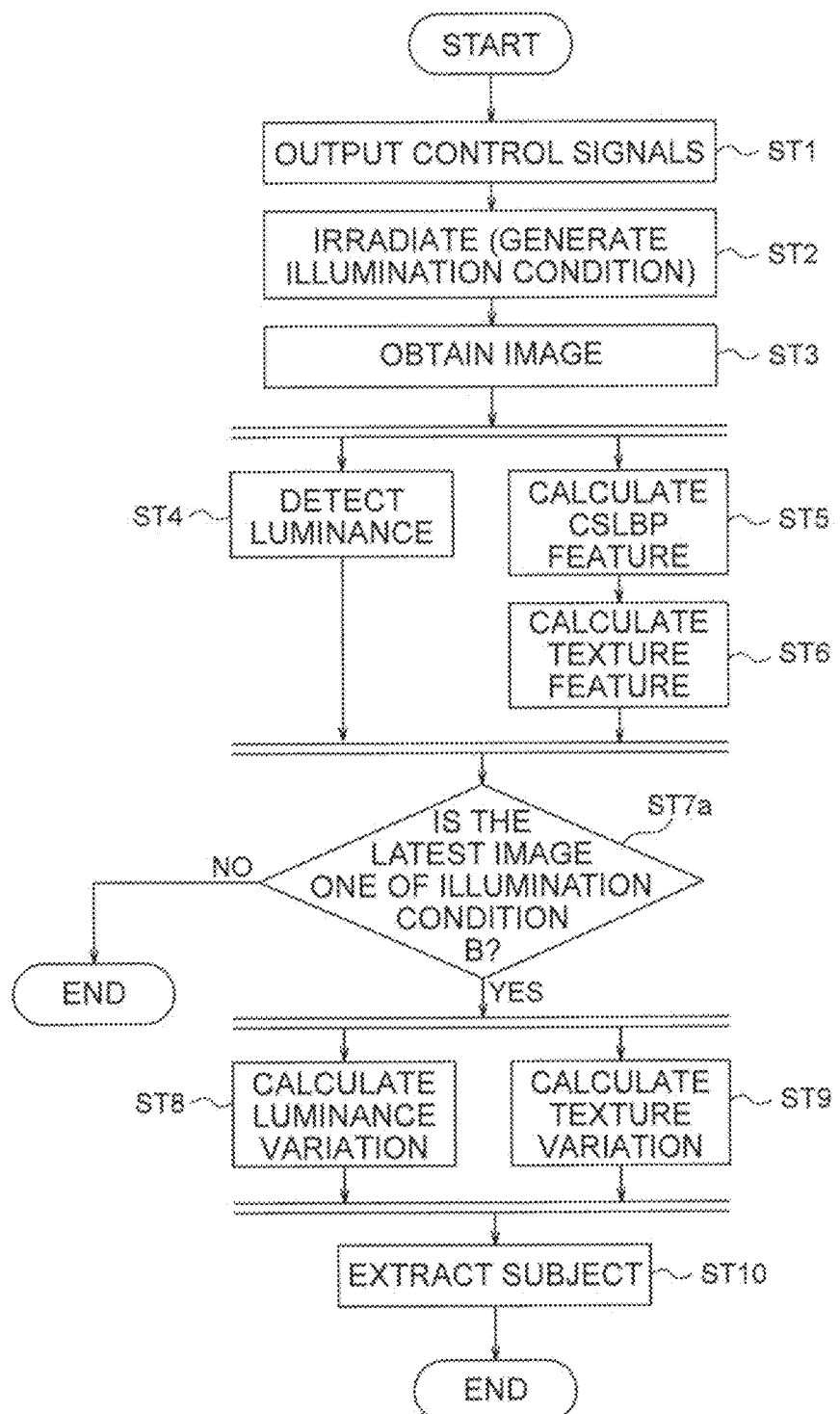
FIG. 20 is a flowchart showing another exemplary processing procedure in a variation of the imaging apparatus of the first embodiment.

In such a case, in place of the procedure shown in FIG. 13, a procedure shown in FIG. 20 is used. In FIG. 20, a step ST7a is performed in place of the step ST7 in FIG. 13. In the step ST7a, whether the latest image is an image Gb of the illumination condition B is determined, and if the result of the determination is "NO", the process in the particular frame ends. If the result of the determination is "YES", the processes of the steps ST8 and ST9 and the subsequent steps are performed.

Alternatively, the luminance variation and the texture variation may be calculated only when the latest image is an image Ga of the illumination condition A and the immediately preceding image is an image Gb of the illumination condition B.

Second Embodiment

Figure 21:
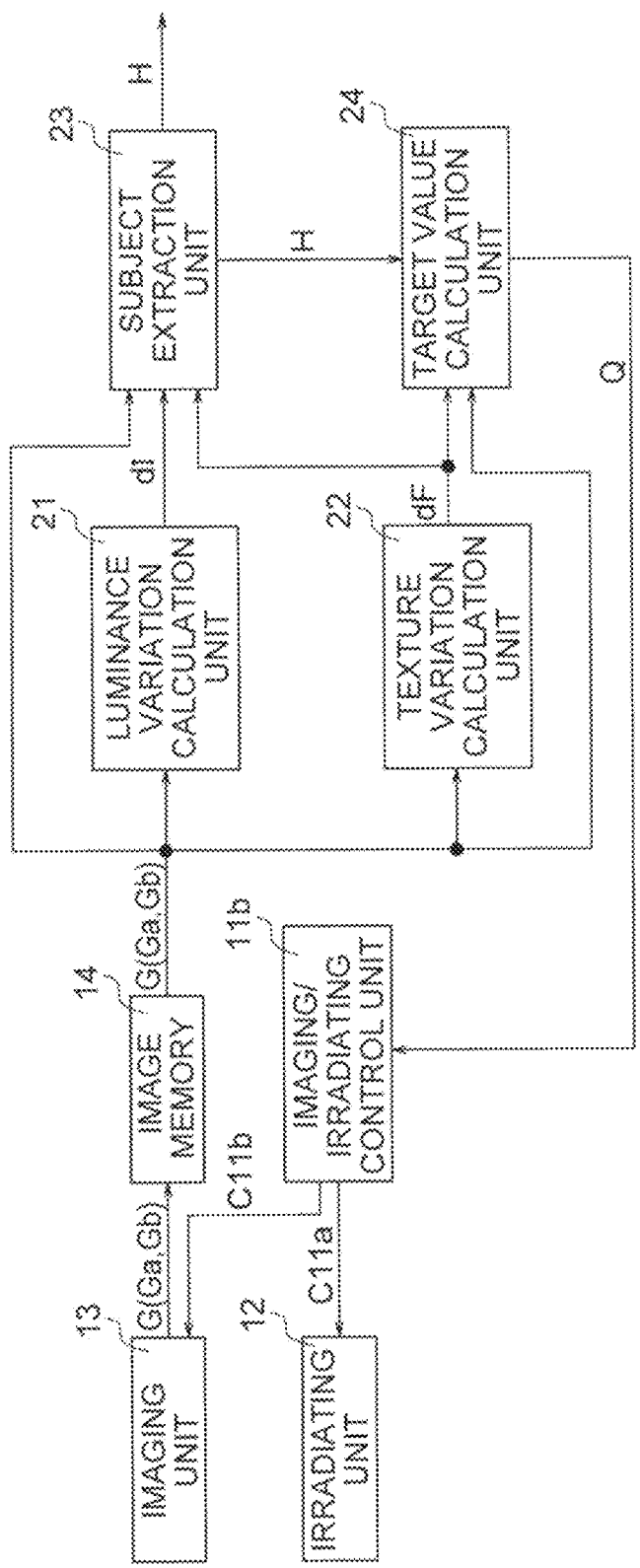
FIG. 21 is a block diagram showing the configuration of an imaging apparatus of a second embodiment of the present invention.

FIG. 21 is a block diagram showing the configuration of an imaging apparatus according to a second embodiment of the present invention. The imaging apparatus shown in FIG. 21 is generally identical to the imaging apparatus shown in FIG. 1, but is different in that a target value calculation unit 24 is added, and an imaging/irradiating control unit 11b is provided in place of the imaging/irradiating control unit 11. Reference characters identical to those in FIG. 1 denote identical or corresponding components, so that their description is omitted.

In the imaging apparatus shown in FIG. 1, the illumination condition and the imaging conditions are fixed. In the imaging apparatus according to the present embodiment, the target value calculation unit 24 adjusts at least one of the illumination condition and the imaging condition based on the texture variation, the extraction result of the subject region, and the luminance feature quantities of the captured images, to improve the accuracy of the extraction of the subject region despite changes in the ambient light and the background.

The adjustment in the illumination condition or the imaging condition is performed by adjusting a target value related to the illumination condition or the imaging condition, and performing control such that the actual value related to the illumination condition or the imaging condition are made to be equal to the target value.

The imaging/irradiating control unit 11b receives a target value signal Q related to the illumination condition and the imaging condition from the target value calculation unit 24. Based on the target value signal Q, the imaging/irradiating control unit 11b generates the control signal C11a, and outputs the control signal C11a to the irradiating unit 12, and generates the control signal C11b, and outputs the control signal C11b to the imaging unit 13.

The target value calculation unit 24 reads the images captured under the two illumination conditions, receives the texture variation dF from the texture variation calculation unit 22, also receives the extraction result of the subject region from the subject extraction unit 23, calculates, based on these inputs, a target value of at least one of the illumination condition and the imaging condition, and outputs the target value signal Q representing the calculated target value to the imaging/irradiating control unit 11b.

The target value signal Q output from the target value calculation unit 24 to the imaging/irradiating control unit 11b is used for the generation of the control signals C11a and C11b in the imaging/irradiating control unit 11b. The target value signal Q represents the target value of, for example, at least one of the shape of the irradiation distribution of the illuminating light, the light emitting intensity of the illuminating light, the light emitting time of the illuminating light, the exposure time of the imaging unit, the aperture of the imaging unit and the gain of the imaging unit. However, the target value signal Q may not necessarily represent a target value of a numerical value (an absolute value) which directly represents the shape of the irradiation distribution of the illuminating light, the light intensity of the illuminating light, the light, emitting time of the illuminating light, the exposure time: of the imaging unit, the aperture of the imaging unit or the gain of the imaging unit, but may represent a target value of a relative value, or may be a code of the absolute value or the relative value. In the following description, the target value signal is assumed to represent a target value of the light emitting intensity of the illuminating light.

The target value calculation unit 24 calculates the above-mentioned target value such that images suitable for the calculation of the luminance variation dI in the luminance variation calculation unit 21 and the calculation of the texture variation dF in the texture variation calculation unit 22 are obtained by the imaging unit 13.

The target value calculated by the target value calculation unit 24 is stored in an internal target value memory 244 (to be described later).

When the imaging/irradiating control unit 11b controls the illumination condition or the imaging condition, the target value calculation unit 24 reads the target value stored in the target value memory 244, and supplies the target value signal Q representing the read target value, to the imaging/irradiating control unit 11b.

Figure 22:
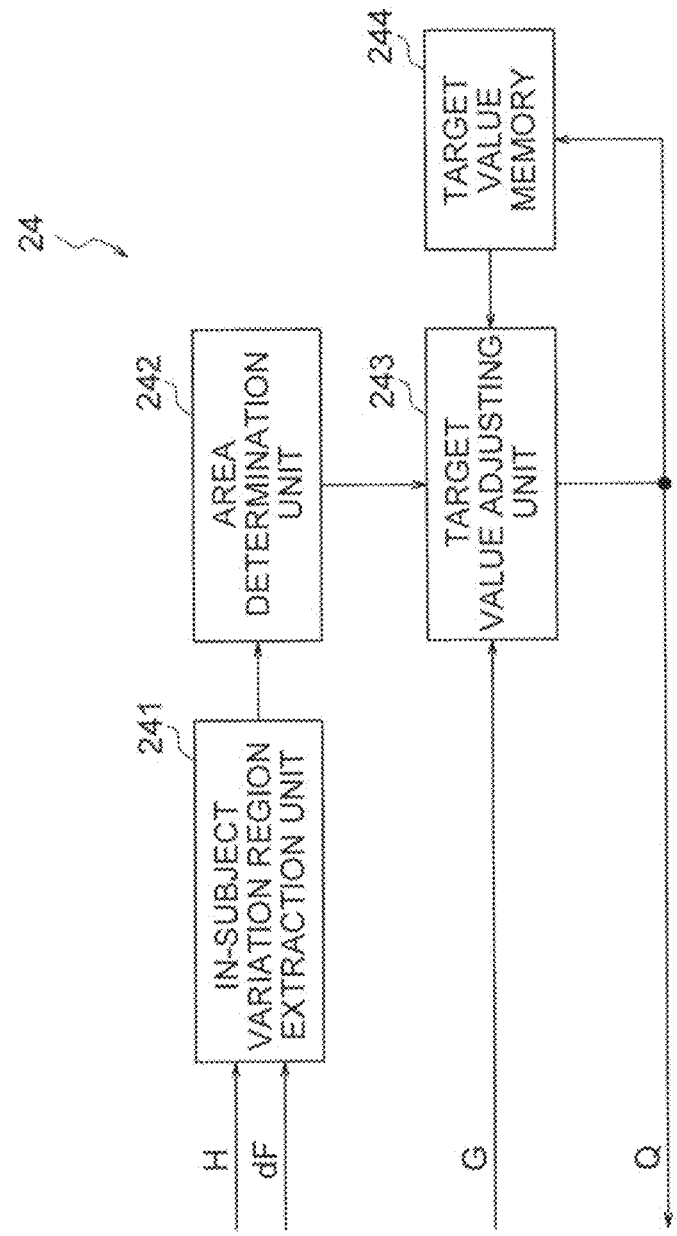
FIG. 22 is a block diagram showing the configuration of the target value calculation unit in FIG. 21.

As shown in FIG. 22, the target value calculation unit 24 includes an in-subject variation region extraction unit 241, an area determination unit 242, a target value adjusting unit 243, and the target value memory 244.

The in-subject variation region extraction unit 241 extracts a region RLH which is positioned within the subject region H output from the subject extraction unit 23, and in which the texture variation dF is relatively large.

Whether the texture variation is relatively large is determined based on the texture variation dF output from the texture variation calculation unit 22.

For instance, the region in which the above-mentioned texture variation dF is larger than a threshold value TFa is determined to be a texture variation region RLH, and the region other than the texture variation region is determined to be a no-variation region RLL.

For the purpose of distinction from the region (texture variation region) in which the texture variation dF is determined to be larger than the threshold value TF by the subject extraction unit 23, the region in which the texture variation dF is determined to be larger than the threshold value TFa by the in-subject variation region extraction unit 241 is called an in-subject variation region.

For example, the threshold value TFa is so set as to satisfy TFa<TF. By setting the threshold value TFa in this manner, it is possible to extract, from the subject region (in which the luminance variation dI is not smaller than the threshold value TI and the texture variation dF is not larger than the threshold value TF) extracted using the threshold value TF by the subject extraction unit 23, a region (an in-subject variation region) RLH in which the texture variation dF is larger than another threshold value TFa.

The area determination unit 242 determines whether the area of the in-subject variation region RLH, for example, the number of pixels included in the region RLH, extracted by the in-subject variation region extraction unit 241 is not smaller than the threshold value TAa, and outputs the result of the determination.

The texture variation dF in the subject region represents a texture variation between images of different illumination conditions, and the in-subject variation region RLH can be recognized a region where the texture feature has varied due to the change in the illumination condition.

Generally, variations in the texture feature due to changes in the illumination conditions are small. If, despite such a nature, the texture feature varies to a certain degree or more due to the change in the illumination condition, that is, the area of the in-subject variation region RLH is not smaller than the threshold value TAa, it is determined that adjustment (alteration) of the illumination condition or the imaging condition is necessary.

When the area determination unit 242 determines that the area of the in-subject variation region RLH is not smaller than the threshold value TAa, the target value adjusting unit 243 calculates a new target value responsive to the result of the determination.

The new target value is so determined that the difference in the light emitting intensity between the two illumination conditions A and B is reduced. For instance, if the texture variation dF was calculated using the image captured at the time point $t1a$ under the illumination condition A (light emitting intensity $\phi A(t1a)$), and the image captured at the time point $t1b$ under the illumination condition B (light emitting intensity $\phi B(t1b)$), then the target value $\phi A(t2a)$ of the light emitting intensity at the time point $t2a$ for the next image capturing under the illumination condition A, and the target value $\phi B(t2b)$ of the light emitting intensity at the time point $t2b$ for the next image capturing under the illumination condition B are respectively adjusted according to the equations (5) and (6). By adjusting the target values in this way, the difference between the target values of the light emitting intensities for the two illumination conditions A and B is reduced.

$$\phi A(t2a)=\phi A(t1a)-\Delta\Phi a \tag{5}$$

$$\phi B(t2b)=\phi B(t1b)-\Delta\Phi b \tag{6}$$

In the equations (5) and (6), $\Delta\phi a$ denotes an amount of adjustment.

The target values of the light emitting intensities are thus adjusted and the adjusted target values are supplied to the irradiating unit 12, then the irradiating unit 12 performs control such that the actual values of the light emitting intensities are made to be equal to the target values.

In addition to the above adjustment, if the luminance feature quantity Ih of the region which is within the image Gb captured under the condition B with the smaller light emitting intensity, among the images Ga, Gb used for the calculation of the luminance variation dI, and which coincides with the in-subject variation region RLH is not larger than a threshold value TLa, then the target value is so adjusted that the light emitting intensity for the above-mentioned illumination condition B (the illumination condition B with the smaller light emitting intensity) is enlarged. That is, the target value $\phi B$ of the light emitting intensity for the above-mentioned illumination condition B is enlarged.

The luminance feature amount Ih mentioned here is, for example, a maximum value, a mean value or a median value of the luminance value. In the following description, it is assumed that the mean value of the luminance value is used as the luminance feature quantity.

If, for example, the luminance variation dI was calculated using the image Ga captured at the time point $t1a$ under an illumination condition A (light emitting intensity $\phi A(t1a)$, and the image Gb captured at the time point $t1b$ under an illumination condition B (light emitting intensity $\phi B(t1b)$, then the target value $\phi B(t2b)$ of the light emitting intensity at the time point t2b for the next image capturing under the illumination condition B is adjusted according the equation (7) so as to be enlarged.

$$\phi B(t2b) = \phi B(t1b) + \Delta \phi b \qquad (7)$$

If the process of the equation (6) and the process of the equation (7) are performed simultaneously, the target value φB(t2b) of the light emitting intensity after the adjustment is as given by the following equation (8).

$$\phi B(t2b) = \phi B(t1b) + \Delta \phi a + \Delta \phi b \qquad (8)$$

Also, if the luminance feature quantity Ih of the region which is within the image Ga captured under the condition (A) with the larger light emitting intensity, among the images Ga, Gb used for the calculation of the luminance variation dI, and which coincides with the in-subject variation region RLH is larger than a threshold value TLb, then the target value φA is so adjusted that the light emitting intensity for the above-mentioned illumination condition A (the condition A with the larger light emitting intensity) is reduced. That is, the target value φA of the light emitting intensity for the above-mentioned illumination condition A is reduced.

If, for example, the luminance variation dI was calculated using the image Ga captured at the time point t1a under an illumination condition A (light emitting intensity φA(t1a)), and the image Gb captured at the time point t1b under an illumination condition B (light emitting intensity φB(t1b)), then the target value φA(t2a) of the light emitting intensity at the time point t2a for the next image capturing under the illumination condition A is adjusted according to the equation (9) so as to be reduced.

$$\phi A(t2a) = \phi A(t1a) - \Delta \phi c \qquad (9)$$

If the process of the equation (5) and the process of the equation (9) are performed simultaneously, the target value φA(t2a) of the light emitting intensity after the adjustment is as given by the following equation (10).

$$\phi A(t2a) = \phi A(t1a) - \Delta \phi a - \Delta \phi c \qquad (10)$$

If there was no in-subject variation region RLH, the target value φA(t2a) of the light emitting intensity at the time point t2a for the next image capturing under the illumination condition A, and the target value φB(t2b) of the light emitting intensity at the time point t2b for the next image capturing under the illumination condition B are respectively adjusted according to the equations (11) and (12). By such adjustment, the difference in the light emitting intensity between the two illumination conditions A and B is enlarged, so that a greater luminance variation dI is made to occur in the subject.

$$\phi A(t2a) = \phi A(t1a) + \Delta \phi d \qquad (11)$$

$$\phi B(t2b) = \phi B(t1b) - \Delta \phi d \qquad (12)$$

By changing the light emitting intensity in the manner described above, a sufficiently large luminance variation can be made to occur in the subject region.

In adjusting the target values according to the updating rules indicated by the equations (5) to (12), the amounts of adjustment Δφa to Δφd are set to be sufficiently small compared with the light emitting intensities φA and φB. If the amounts of adjustment Δφa to Δφd are too large, the light emitting intensities φA and φB oscillate, which is undesirable. Also, in order to stabilize the light emitting intensities φA and φB, the time delay until the updating is important. The amounts of adjustment Δφa to Δφd are set taking account of these points.

The target value adjusting unit 243 writes the target values having been updated in the manner described above, in the target value memory 244, and also supplies the target value signal Q representing the target values to the imaging/irradiating control unit 11b.

Figure 23:
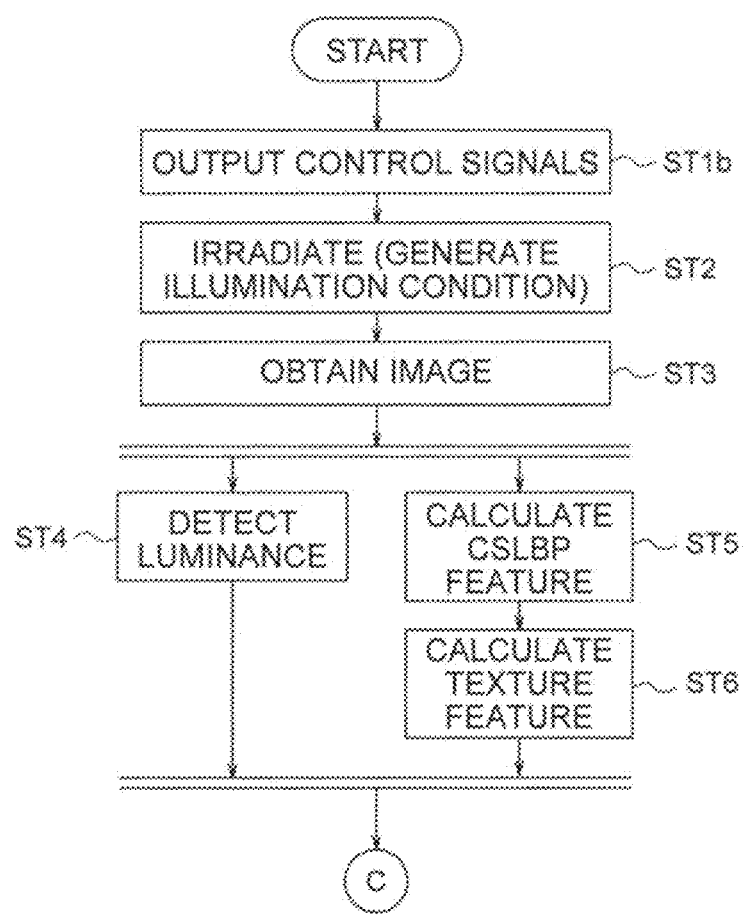
FIG. 23 is a flowchart showing a processing procedure in the imaging apparatus of the second embodiment.
Figure 24:
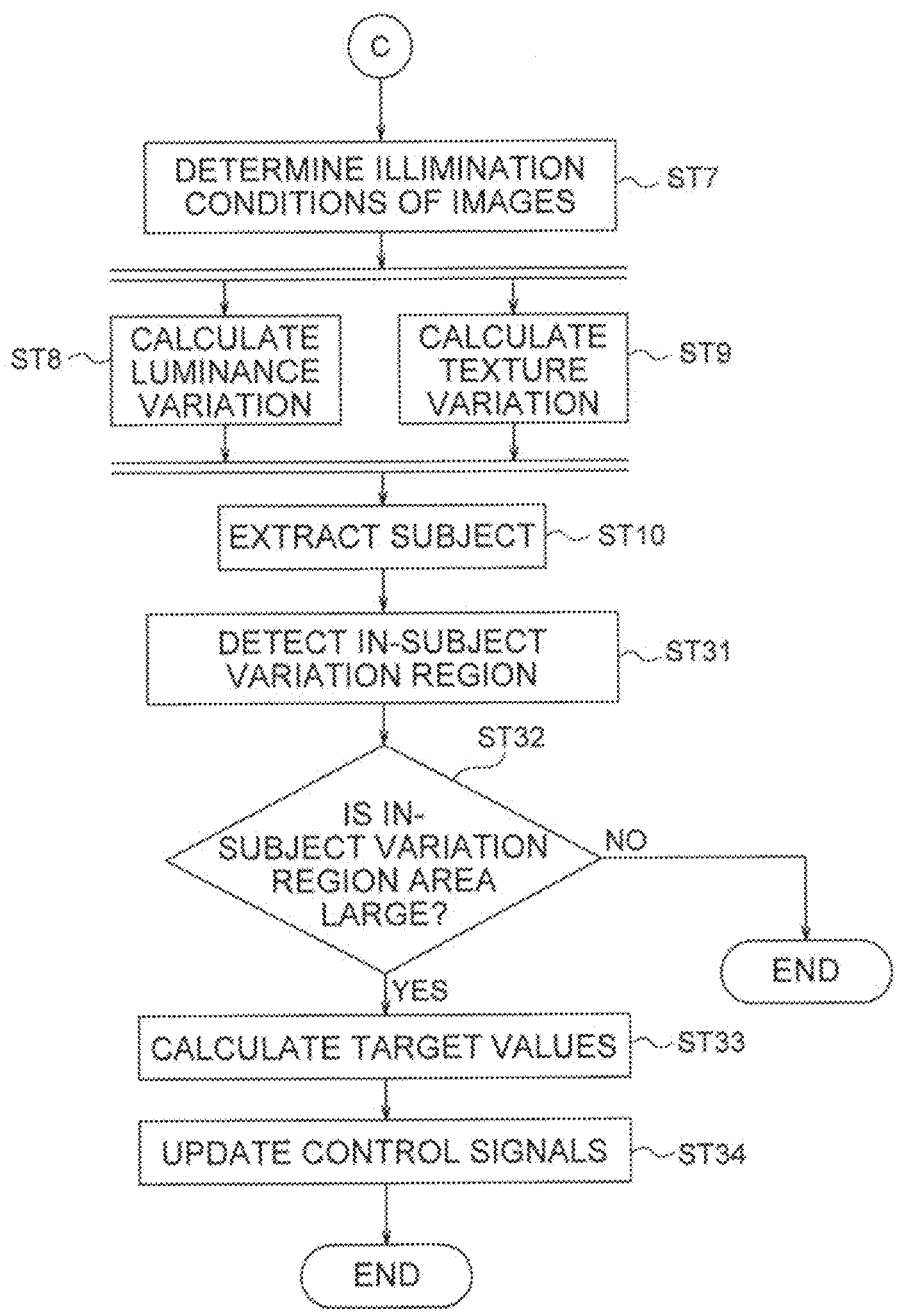
FIG. 24 is a flowchart showing a processing procedure in the imaging apparatus of the second embodiment.

A processing procedure in the imaging apparatus according the second embodiment will now be described with reference to the flowcharts of FIG. 23 and FIG. 24. The processing procedure shown in FIG. 23 and FIG. 24 is generally identical to that of the method shown in FIG. 13, but is different in that the step ST1 is replaced with a step ST1b, and steps ST31 to ST34 are added. In FIG. 23 and FIG. 24, reference characters identical to those in FIG. 13 denote identical or corresponding steps.

In the step ST1b, the imaging/irradiating control unit 11b receives the target value signal Q representing the target values of the illumination condition and the imaging condition from the target value calculation unit 24, and outputs the control signal C11a and the control signal C11b according to the target value signal Q.

The illumination condition is controlled so as to be changed, taking two frame periods as one cycle, as in the step ST1 in FIG. 13.

In the step ST31, the in-subject variation region extraction unit 241 extracts an in-subject variation region RLH based on the subject region H detected in the step ST10 and the texture variation dF calculated in the step ST9.

Next, in the step ST32, the area determination unit 242 determines whether the area of the in-subject variation region RLH extracted in the step ST31 is not smaller than the threshold value TAa.

If the area of the in-subject variation region RLH is smaller than the threshold value TAa, the process in the particular frame ends.

If the area of the in-subject variation region RLH is not smaller than the threshold value TAa, the process proceeds to the step ST33.

In the step ST33, the target value adjusting unit 243 reads the target values stored in the target value memory 244, calculates new target values based on the in-subject variation region RLH extracted in the step ST31, the texture variation dF calculated in the step ST9, and the image data (the latest image data) stored in the image memory 14, writes the newly calculated target values in the target memory 244 (e.g. by overwriting the old target values), and also supplies the target value signal Q representing the new target values to the imaging/irradiating control unit 11b.

The calculation of the new target values can be performed in the manner described with reference to the equations (5) to (12).

Next, in the step ST34, the imaging/irradiating control unit 11b performs the generation of the control signals C11a, C11b (updating of their contents) based on the target value signal Q supplied from the target value calculation unit 24.

Based on the control signals C11a, C11b, the illumination condition for the frame of each order (first frame, or second frame) in each cycle consisting of two frame periods is updated. After the updating, image capturing for each frame is performed using the updated illumination condition for the frame of the same order.

In the embodiment described above, the target value calculation unit 24 calculates the target value of the light emitting intensity of the illuminating light, as the target value of the illumination condition. Alternatively, the target value of the irradiation distribution of the illuminating light may be calculated. Still alternatively, both of the target value of the light emitting intensity of the illuminating light and the target value of the illumination distribution of the illuminating light may be calculated.

In the embodiment described above, the adjustment of the illumination condition (determination of the new target value) is performed based on the luminance feature quantity of the region which is within the images Ga, Gb used for the calculation of the luminance variation dI and which coincides with the in-subject variation region RLH. However, the present invention is not limited to this. For instance, the adjustment of the illumination condition (determination of the new target value) may be performed based on the luminance feature quantity of the entirety of the subject region in the images Ga, Gb used for the calculation of the luminance variation dI.

As has been described, according to the imaging apparatus of the present embodiment, the target value of at least one of the illumination condition and the imaging condition is calculated based on at least one of the luminance feature quantity Ih and the texture variation dF in the region extracted as the subject region, and the imaging/irradiating control unit $11b$ outputs the control signals C$11a$, C$11b$ based on the target value signal Q representing the calculated target value, so that it is possible to obtain the images suitable for the extraction of the subject region regardless of the change in the ambient light, thereby improving the accuracy in the extraction of the subject region.

In particular, if the target value of at least one of the irradiation distribution of the illuminating light and the light emitting intensity of the illuminating light is calculated as the target value of the illumination condition, it is possible to obtain images which are suitable for the extraction of the subject region regardless of the local change of the ambient light, thereby improving the accuracy in the extraction of the subject region.

Also, in the imaging apparatus according to the present embodiment, when the area of the region (the in-subject variation region RLH) where the texture variation dF calculated using the images of different illumination conditions is larger than the threshold value TFa is not smaller than the threshold value (TAa), the target value of at least one of the illumination condition and the imaging condition is calculated such that the texture variation dF between the images of different illumination conditions is reduced. Also, when the extracted subject region does not include any region (in-subject variation region RLH) in which the texture variation dF calculated using images of different illumination conditions is larger than the threshold value TFa, the target value of at least one of the illumination condition and the imaging condition is calculated such that the texture variation dF between the images of the different illumination conditions is enlarged. Accordingly, it is possible to obtain images which are suitable for the extraction of the subject region regardless of the change of the ambient light, thereby improving the accuracy in the extraction of the subject region.

Furthermore, in the imaging apparatus according to the present embodiment, when the area of the region (in-subject variation region RLH) which is within extracted subject region and in which the texture variation dF calculated using the images of the different illumination conditions is larger than the threshold value TFa is not smaller than the threshold value TAa, and the luminance feature quantity of the above-mentioned subject region, e.g., the luminance feature quantity Ih of the in-subject variation region RLH, in the image of the illumination condition with the smaller light emitting intensity, among the images used for the calculation of the luminance variation dI, is not larger than the threshold value, then the target value related to the illumination condition is calculated such that the light emitting intensity of the above-mentioned illumination condition (illumination condition with the smaller light emitting intensity) is enlarged (that is, the target value of the light emitting intensity is enlarged). Also, when the area of the region (in-subject variation region RLH) which is within the extracted subject region and in which the texture variation dF calculated using the images of the different illumination conditions is larger than the threshold value TFa is not smaller than the threshold value TFa, and the luminance feature quantity of the above-mentioned subject region, e.g., the luminance feature quantity Ih of the in-subject variation region RLH, in the image of the illumination condition with the larger light emitting intensity, among the images used for the calculation of the luminance variation dI, is larger than the threshold value, then the target value related to the illumination condition is calculated such that the light emitting intensity of the above-mentioned illumination condition (illumination condition with the larger light emitting intensity) is reduced (that is, the target value of the light emitting intensity is reduced). Accordingly, it is passable to obtain images suitable for the extraction of the subject region regardless of the change in the ambient light, thereby improving the accuracy in the extraction of the subject region.

Third Embodiment

Figure 25:
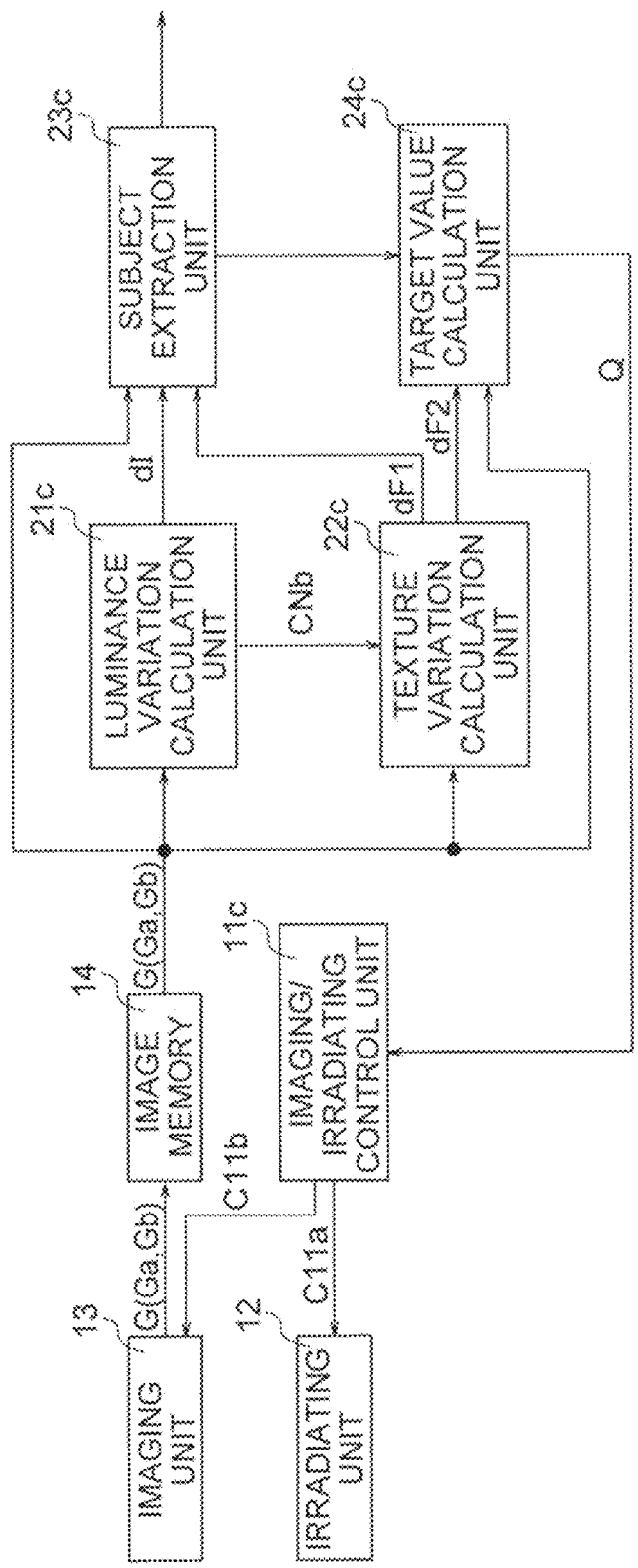
FIG. 25 is a block diagram showing the configuration of an imaging apparatus of a third embodiment of the present invention.

FIG. 25 is a block diagram showing the configuration of an imaging apparatus according to a third embodiment of the present invention. The imaging apparatus shown in FIG. 25 is generally identical to the imaging apparatus shown in FIG. 21. However, it differs in that it is provided with an imaging/irradiating control unit $11c$, a luminance variation calculation unit $21c$, a texture variation calculation unit $22c$, a subject extraction unit $23c$, and a target value calculation unit $24c$ in place of the imaging/irradiating control unit $11b$, the luminance variation calculation unit 21, the texture variation calculation unit 22, the subject extraction unit 23, and the target value calculation unit 24 in FIG. 21. The reference characters identical to those in FIG. 21 denote identical or corresponding components, and their description is omitted.

In the second embodiment, the texture variation calculation unit 22 calculates a single texture variation dF from two images captured under different illumination conditions at different time points. In contrast, in the third embodiment, the texture variation calculation unit $22c$ calculates a first texture variation dF1 from two images captured under the same illumination condition at different time points, and also calculates a second texture variation dF2 from two images captured under different illumination conditions at different time points.

To enable the calculation of the two texture variations dF1, dF2 as mentioned above, the imaging/irradiating control unit $11c$ in FIG. 25 alters the illumination condition taking three frame periods as one operation period (one cycle), and in each operation period, generates an illumination condition for one frame period, and another illumination condition B for two frame periods consecutively. That is, in the first frame in each cycle, image capturing is performed under the first illumination condition A, and in the second and third frames, image capturing is performed under the second illumination condition B. As a result, the illumination condition differs between the first frame and the second frame, and the illumination condition is the same between the second frame and the third frame.

The luminance variation dI and the second texture variation dF2 are calculated from the image Ga of the first frame and the image Gb1 of the second frame, and the first texture variation dF1 is calculated from the image Gb1 of the second frame and the image Gb2 of the third frame.

Then, the subject region is extracted based on the luminance variation dI and the first texture variation dF1 calculated in the manner described above. Furthermore, the in-subject variation region RLH is extracted based on the subject region extracted in this way and the second texture variation dF2.

Figure 26:
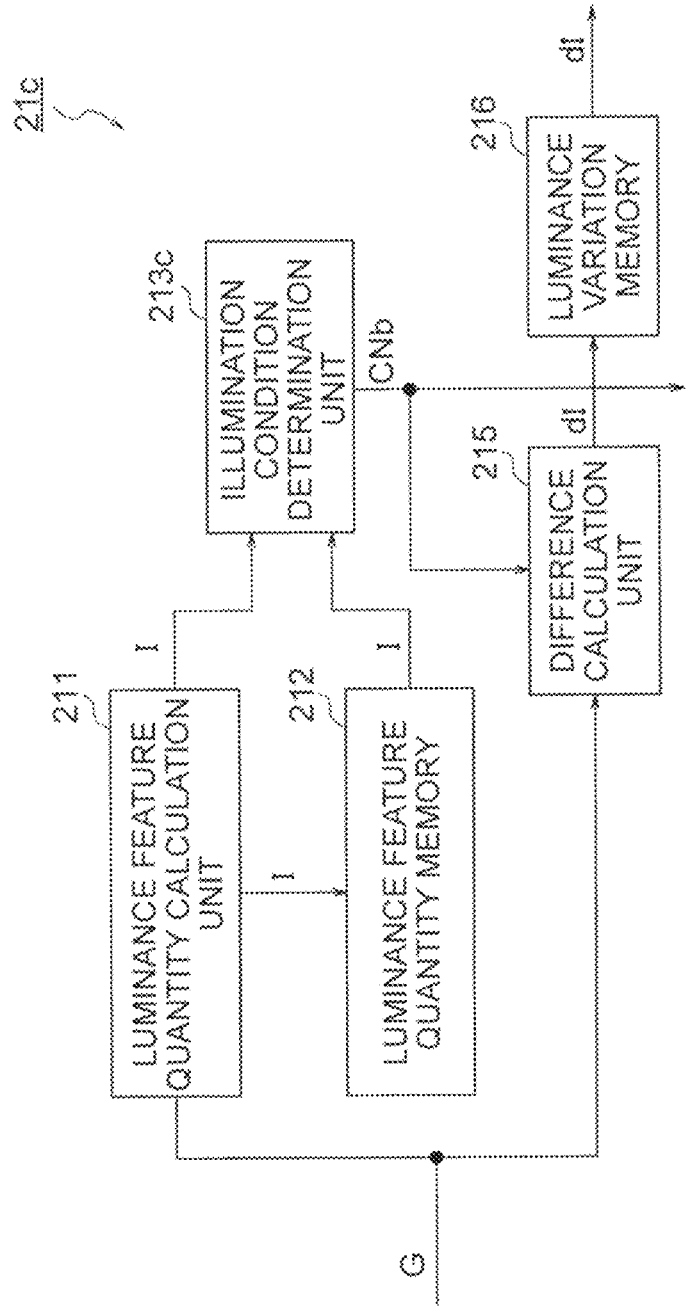
FIG. 26 is a block diagram showing the configuration of the luminance variation calculation unit in FIG. 25.

As shown in FIG. 26, the luminance variation calculation unit 21c includes a luminance feature quantity calculation unit 211, a luminance feature quantity memory 212, an illumination condition determination unit 213c, a difference calculation unit 215, and a luminance variation memory 216.

The luminance feature quantity calculation unit 211 calculates the luminance feature quantity Im of the image of each frame read from the image memory 14, and stores the calculated luminance feature quantity Im in the luminance feature quantity memory 212.

The illumination condition determination unit 213c compares the luminance feature quantity Im of the latest image (image of the latest frame) calculated by the luminance feature quantity calculation unit 211, and the luminance feature quantity Im of the image one frame before and the luminance feature quantity Im of the image two frames before, stored in the luminance feature quantity memory 212. These images are images of three frames consecutive to each other. The illumination condition determination unit 213c compares the luminance feature quantities Im of the images of the three frames, and determines, based on the results of the comparison, which of the images is the image Ga of the illumination condition A, and which of the images are the images Gb1, Gb2 of the illumination condition B. It also determines the order of each image in each cycle of the change of the illumination condition. The result GNb of this determination is supplied to the difference calculation unit 215 and the texture variation calculation unit 22c.

The difference calculation unit 215 receives the above mentioned result CNb of the determination from the illumination condition determination unit 213c, and recognizes the order of the latest image in each cycle of the illumination condition change. The difference calculation unit 215 subtracts, from the luminance value of each pixel in the first image Ga in each cycle of the illumination condition change (image of the illumination condition A), the luminance value of the pixel at the same position in the second image Gb1 in each cycle of the illumination condition change (image of the illumination condition B), to determine the luminance difference, and outputs it as the luminance variation dI.

As was also described in connection with the first embodiment, if the result of the subtraction is negative, the luminance difference is treated as being zero.

The texture variation calculation unit 22c outputs the first texture variation dF1 to the subject extraction unit 23c, and the second texture variation dF2 to the target value calculation unit 24c.

Figure 27:
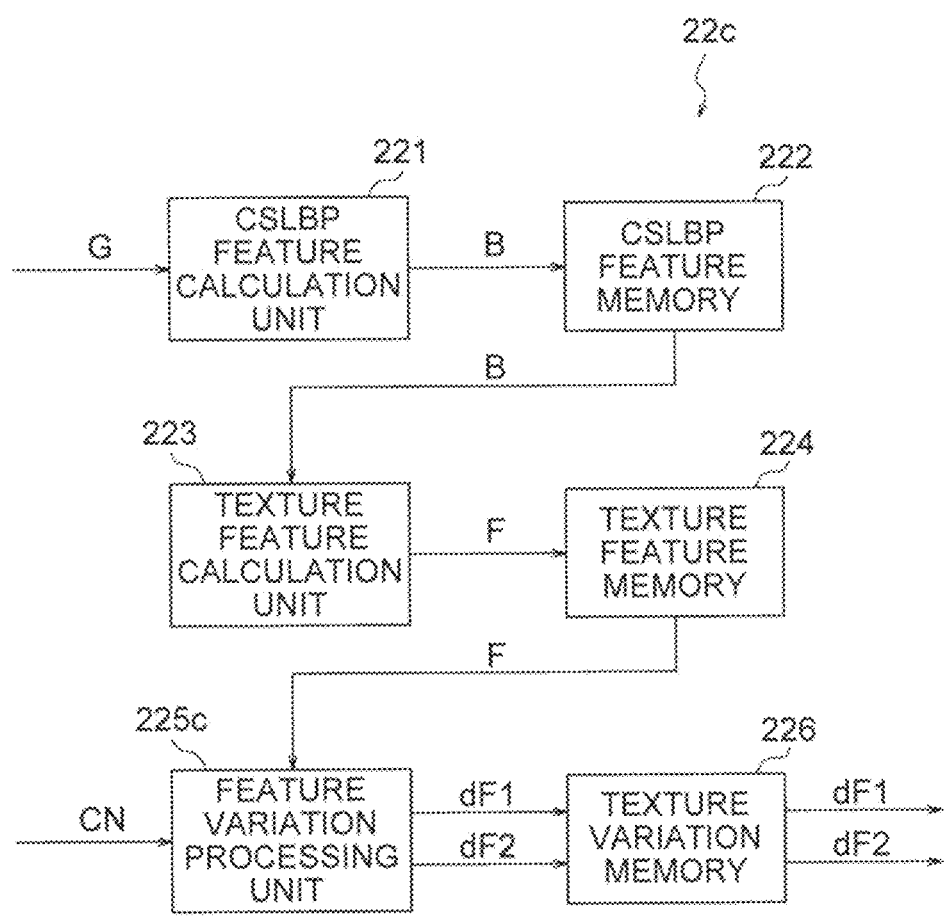
FIG. 27 is a block diagram showing the configuration of the texture variation calculation unit in FIG. 25.

As shown in FIG. 27, the texture variation calculation unit 22c includes a CSLBP feature calculation unit 221, a CSLBP feature memory 222, a texture feature calculation unit 223, a texture feature memory 224, a feature variation processing unit 225c, and a texture variation memory 226.

The CSLBP feature calculation unit 221, the CSLBP feature memory 222, and the texture feature calculation unit 223 in FIG. 27 are identical to those shown in FIG. 4.

The feature variation processing unit 225c receives the above-mentioned determination result CNb from the illumination condition determination unit 213c in the luminance variation calculation unit 21c, to recognize the order of the latest image in each cycle of the illumination condition change. The feature variation processing unit 225c calculates the texture variation between the first image Ga and the second image Gb1 in each cycle as the second texture variation dF2. It also calculates the texture variation between the second image Gb1 and the third image Gb2 in each cycle as the first texture variation dF1.

The first texture variation dF1 and the second texture variation dF2 having been calculated are stored in the texture variation memory 226. The first texture variation dF1 having been stored is later supplied to the subject extraction unit 23c. The second texture variation dF2 having been stored is later supplied to the target value calculation unit 24c.

The subject extraction unit 23c is similar to the subject extraction unit 23c explained in the first embodiment.
However, it uses the first texture variation dF1, as the texture variation.

That is, the subject extraction unit 23c extracts the subject region based on the luminance variation dI calculated by the luminance variation calculation unit 21c and the first texture variation dF1 calculated by the texture variation calculation unit 22c, and outputs the extraction result H to the target value calculation unit 24c.

The process performed by the subject extraction unit 23c to extract the subject region based on the luminance variation dI and the texture variation dF1 is identical to the process performed by the subject extraction unit 23 to extract the subject region based on the luminance variation dI and the texture variation dF in the first embodiment.

The target value calculation unit 24c reads the images captured under the two illumination conditions from the image memory 14, receives the second texture variation dF2 from the texture variation calculation unit 22c, receives the extraction result of the subject region H from the subject extraction unit 23c, calculates, based on these inputs, the target value related to at least one of the illumination condition and the imaging condition, and outputs the target value signal Q representing the calculated target value to the imaging/irradiating control unit 11c.

The target value calculation unit 24c is similar to the target value calculation unit 24 in the second embodiment, and the target value signal Q supplied from the target value calculation unit 24c to the imaging/irradiating control unit 11c is similar to that explained in the second embodiment. However, as the texture variation, the second texture variation dF2 is supplied.

The method of adjusting the target value will now be explained in detail.

The in-subject variation region extraction unit 241 in the target value calculation unit 24c extracts a region RLH which is positioned within the subject region H output from the subject extraction unit 23c, and in which the texture variation is relatively large.

Whether the texture variation is relatively large is determined based on the texture variation dF2 output from the texture variation calculation unit 22c.

For instance, the region in which the above-mentioned texture variation dF2 is larger than the threshold value TFa is determined to be an in-subject variation region RLH, and the region other than the in-subject variation region RLH is determined to be a no-variation region RLL.

In the second embodiment, TFa<TF was said to be desirable. In the third embodiment, there is no such restriction.

By performing such processes, it is possible to extract the region (in-subject variation region) RLH which is within the subject region in which the first texture variation dF1 is found to be not larger than the threshold value TF by the subject extraction unit 23c, and in which the second texture variation dF2 is larger than the threshold value TFa (different from the threshold value TF).

The area determination unit 242 determines whether the area of the in-subject variation region RLH, for example, the number of pixels included in the region RLH extracted by the in-subject variation region extraction unit 241 is not smaller than the threshold value TAa, and outputs the result of the determination.

When the area determination unit 242 determines that the area of the in-subject variation region RLH is not smaller than the threshold value TAa, the target value adjusting unit 243 calculates a new target value responsive to the result of the determination.

The new target value is so determined that the difference in the light emitting intensity between the two illumination conditions A and B is reduced. For instance, if the second texture variation dF2 was calculated using the image captured at the time point t1a under the illumination condition A (light emitting intensity $\phi A(t1a)$), and the image captured at the time point t1b under the illumination condition B (light emitting intensity $\phi B(t1b)$), then the target value $\phi A(t2a)$ of the light emitting intensity at the time point t2a for the next image capturing under the illumination condition A, and the target value $\phi B(t2b)$ of the light emitting intensity at the time point t2b for the next image capturing under the illumination condition B are respectively adjusted according to the equations (13) and (14). By adjusting the target values in this way, the difference between the target values of the light emitting intensities for the two illumination conditions A and B is reduced.

$$\phi A(t2a)=\phi A(t1a)-\Delta\phi a \quad (13)$$

$$\phi B(t2b)=\phi B(t1b)+\Delta\phi a \quad (14)$$

In the equations (13) and (14), $\Delta\phi a$ denotes an amount of adjustment.

The target values of the light emitting intensities are thus adjusted and the adjusted target values are supplied to the irradiating unit 12, then the irradiating unit 12 performs control such that the actual values of the light emitting intensities are made to be equal to the target values.

In addition to the above-mentioned adjustment, if the luminance feature quantity Ih of the region which is within the image Gb1 captured under the condition B with the smaller light emitting intensity, among the images Ga, Gb1 used for the calculation of the luminance variation dI, and which coincides with the in-subject variation region RLH, is not larger than the threshold value TLa, then the target value is adjusted so that the light emitting intensity of the above-mentioned illumination condition B (the illumination condition B with the smaller light emitting intensity) is enlarged. That is, the target value $\phi B$ of the light emitting intensity of the illumination condition B is enlarged.

The luminance feature amount Ih mentioned here is, for example, a maximum value, a mean value or a median value of the luminance value. In the following description, it is assumed that the mean value of the luminance value is used as the luminance feature quantity.

If, for example, the luminance variation dI was calculated using the image Ga captured at the time point t1a under an illumination condition A (light emitting intensity $\phi A(t1a)$), and the image Gb captured at the time point t1b under an illumination condition B (light emitting intensity $\phi B(t1b)$), then the target value $\phi B(t2b)$ of the light emitting intensity at the time point t2b for the next image capturing under the illumination condition B is adjusted according the equation (15) so as to be enlarged.

$$\phi B(t2b)=\phi B(t1b)+\Delta\phi b \quad (15)$$

If the process of the equation (14) and the process of the equation (15) are performed simultaneously, the target value $\phi B(t2b)$ of the light emitting intensity after the adjustment is as given by the following equation (16).

$$\phi B(t2b)=\phi B(t1b)+\Delta\phi a+\Delta\phi b \quad (16)$$

Also, if the luminance feature quantity Ih of the region which is within the image Ga captured under the condition (A) with the larger light emitting intensity, among the images Ga, Gb1 used for the calculation of the luminance variation dI, and which coincides with the in-subject variation region RLH is larger than the threshold value TLb, then the target value $\phi A$ is so adjusted that the light emitting intensity for the above-mentioned illumination condition A (the condition A with the larger light emitting intensity) is reduced. That is, the target value $\phi A$ of the light emitting intensity for the above-mentioned illumination condition A is reduced.

If, for example, the luminance variation dI was calculated using the image Ga captured at the time point t1a under an illumination condition A (light emitting intensity $\varphi A(t1a)$), and the image Gb1 captured at the time point t1b under an illumination condition B (light emitting intensity $\varphi B(t1b)$), then the target value $\varphi A(t2a)$ of the light emitting intensity at the time point t2a for the next image capturing under the illumination condition A is adjusted according to the equation (17) so as to be reduced.

$$\varphi A(t2a)=\varphi A(t1a)-\Delta\varphi c \quad (17)$$

If the process of the equation (13) and the process of the equation (17) are performed simultaneously, the target value $\phi A(t2a)$ of the light emitting intensity after the adjustment is as given by the following equation (18).

$$\phi A(t2a)=\phi A(t1a)+\Delta\phi a-\Delta\phi c \quad (18)$$

If there was no in-subject variation region RLH, the target value $\phi A(t2a)$ of the light emitting intensity at the time point t2a for the next image capturing under the illumination condition A, and the target value $\phi B(t2b)$ of the light emitting intensity at the time point t2b for the next image capturing under the illumination condition B are respectively adjusted according to the equations (19) and (20). By such adjustment, the difference in the light emitting intensity between the two illumination conditions A and B is enlarged, so that a greater luminance variation dI is made to occur in the subject.

$$\phi A(t2a)=\phi A(t1a)+A\phi d \quad (19)$$

$$\phi B(t2b)=\phi B(t1b)-\Delta\phi d \quad (20)$$

By changing the light emitting intensity in the manner described above, a sufficiently large luminance variation can be made to occur in the subject region.

In adjusting the target values according to the updating rules indicated by the equations (13) to (20), the amounts of adjustment $\Delta\phi a$ to $\Delta\phi b$ are set to be sufficiently small compared with the light emitting intensities $\phi A$ and $\phi B$. If the amounts of adjustment Δϕa to Δϕd are too large, the light emitting intensities ϕA and ϕB oscillate, which is undesirable. Also, in order to stabilize the light emitting intensities ϕA and ϕB, the time delay until the updating is important. The amounts of adjustment Δϕa to Δϕd are set taking account of these points.

The target value adjusting unit 243 writes the target values having been updated in the manner described above, in the target value memory 244, and also supplies the target value signal Q representing the target values to the imaging/irradiating control unit 11c.

Figure 28:
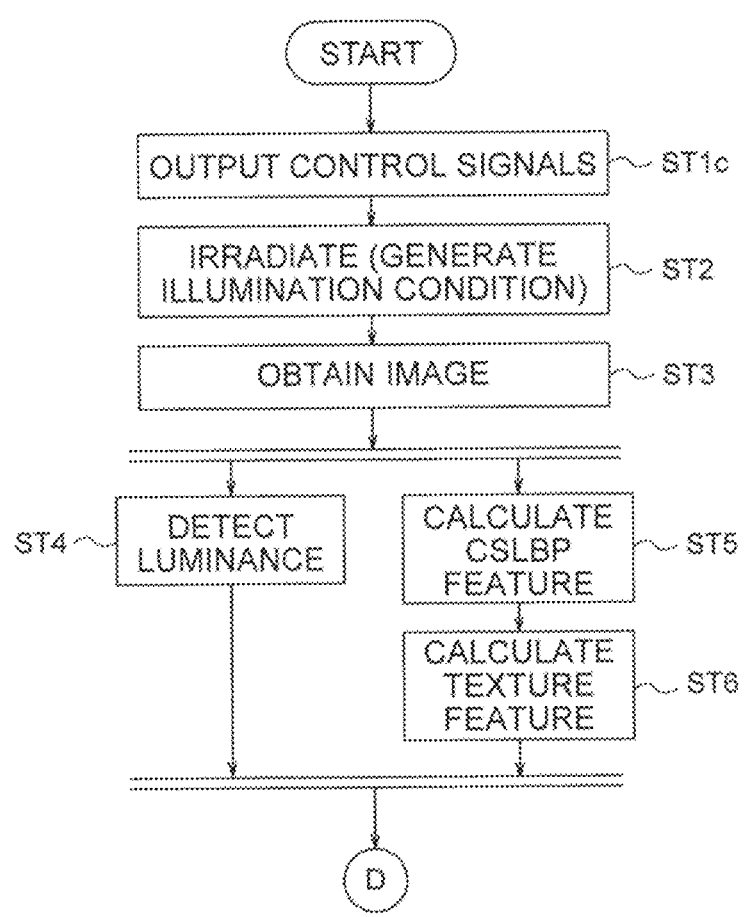
FIG. 28 is a flowchart showing a processing procedure in the imaging apparatus of the third embodiment.
Figure 29:
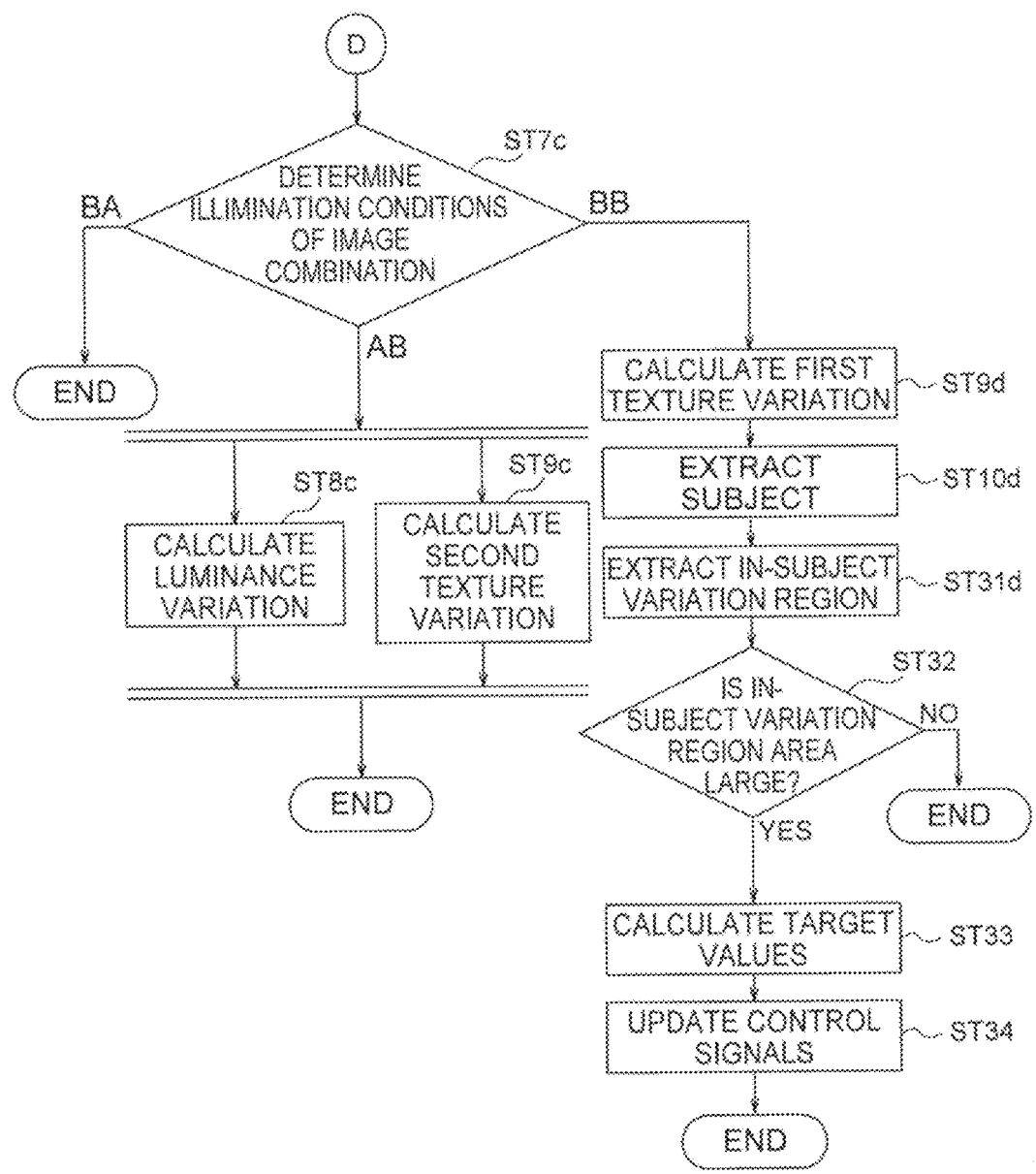
FIG. 29 is a flowchart showing a processing procedure in the imaging apparatus of the third embodiment.

A processing procedure in the imaging apparatus according the third embodiment will now be described with reference to the flowcharts of FIG. 28 and FIG. 29. The processing procedure shown in FIG. 28 and FIG. 29 is generally identical to that shown in FIG. 23 and FIG. 24, but is different in that the steps ST1b, ST7, ST8, ST9, ST10, and ST31 are replaced with steps ST1c, ST7c, ST8c, ST9c, ST10d, and ST31d. In FIG. 28 and FIG. 29, reference characters identical to those in FIG. 23 and FIG. 24 denote identical or corresponding steps.

In the step ST1c, the imaging/irradiating control unit 11c receives the target value signal Q representing the target values of the illumination condition and the imaging condition from the target value calculation unit 24c, and outputs the control signal C11a and the control signal C11b according to the target value signal Q.

The step ST1c is similar to the step ST1b in FIG. 23, but differs in that, in the step ST1c in FIG. 28, the illumination condition is changed taking three frame periods as one cycle.

In the step ST7c, a determination is made on the illumination conditions of the images, for the combination of the latest image and the image one frame before. In this determination, whether the combination of the latest image and the image one frame before is a combination (AB) of an image of a first frame and a second frame in a three-frame operation periods, or a combination (BB) of an image of a second frame and a third frame, or a combination (BA) of an image of a third frame, and a first frame (in the next three-frame operation period). This determination is performed by storing and comparing the variations in the brightness values of the images of the frames supplied one after the other, as was explained in connection with the first embodiment.

Alternatively, the control signals C11a, C11b may be obtained from the imaging/irradiating control unit 11c, and the determination may be made based on the control signals C11a, C11b.

If, in the step ST7c, the combination is found to be one (AB) of the first frame image and the second frame image, the process proceeds to the step ST8c and the step ST9c.

The processes in the step ST8c and the step ST9c are similar the processes in the step ST8 and the step ST9 in the first embodiment.

That is, in the step ST8c, the difference calculation unit 215 in the luminance variation calculation unit 21c calculates the luminance variation dI of each pixel between the image of the latest frame (second frame image) and the image one frame before (first frame image). The luminance variation dI of each pixel that has been calculated is stored in the luminance variation memory 216.

In the step ST9c, the texture variation calculation unit 22c calculates the texture variation of each pixel between the image of the latest frame (second frame image) and the image one frame before (first frame image), and outputs the calculated texture variation as the second texture variation dF2, and causes it to be stored in the texture variation memory 226.

After the steps ST8c and ST9c, the process in this frame period ends.

The luminance variation dI stored in the luminance variation memory 216 in the step ST8c, and the second texture variation dF2 stored in the texture variation memory 226 in the step ST9c are used in the next frame period.

If, in the step ST7c, the combination is one (BB) of the second frame image and the third frame image, the process proceeds to a step ST9d.

In the step ST9d, the texture variation calculation unit 22c calculates the texture variation of each pixel between the image of the latest frame (third frame image) and the image one frame before (second frame image), and outputs the calculated texture variation as the first texture variation dF1, and causes it to be stored in the texture variation memory 226.

In the step ST10d, following the step ST9d, the subject region is extracted. This process is identical to the step ST10 in FIG. 13. However, while the texture variation dF is used in the step ST10 in FIG. 13, the first texture variation dF1 calculated in the step ST9d is used in the step ST10d in FIG. 29. Also, the luminance variation dI that was calculated in the step ST8c one frame period before is used.

After the step ST10d, the process proceeds to the step ST31d.

The process in the step ST31d is similar to the process in the step ST31 in FIG. 24, but the second texture variation dF2 calculated in the step ST9c is used for the detection of the in-subject variation region RLH.

That is, in the step ST31d, the in-subject variation region extraction unit 241 extracts the in-subject variation region RLH based on the subject region H detected in the step ST10d, and the second texture variation dF2 calculated in the step ST9c.

After the step ST31d, the processes of the steps ST32, ST33, and ST33 are performed. These processes are similar to the steps ST32, ST33, and ST33 in FIG. 24.

That is, in the step ST32, the area determination unit 242 determines whether the area of the in-subject variation region RLH extracted in the step ST31d is not smaller than the threshold value TAa.

If the area of the in-subject variation region RLH is smaller than the threshold value TAa, the process in the particular frame ends.

If the area of the in-subject variation region RLH is not smaller than the threshold value TAa, the process proceeds to the step ST33.

In the step ST33, the target value adjusting unit 243 reads the target values stored in the target value memory 244, calculates new target values based on the in-subject variation region RLH extracted in the step ST31d, the second texture variation dF2 calculated in the step ST9c (in the preceding frame period), and the image data (image data of the latest frame) stored in the image memory 14, writes the newly calculated target values in the target value memory 244 (e.g. by overwriting the old target values), and also supplies the target value signal Q representing the new target values to the imaging/irradiating control unit 11c.

The calculation of the new target values can be performed in the manner described with reference to the equations (13) to (20).

Next, in the step ST34, the imaging/irradiating control unit 11c performs the generation of the control signals C11a, C11b (updating of their contents) based on the target value signal Q supplied from the target value calculation unit 24c.

Based on the control signals C11a, C11b, the illumination condition for the frame of each order (first frame, second frame, or third frame) in each cycle consisting of three frame periods is updated. After the updating, image capturing for a frame of each order is performed using the illumination condition updated for the frame of the same order.

In the third embodiment, the process of updating the target values, which, in the second embodiment, is performed using the texture variation dF, is performed using the second texture variation dF2.

The second texture variation dF2 is a texture variation between the images obtained by image capturing at different time points and under different illumination conditions, so that it is identical to the "texture variation" in the second embodiment. Accordingly, effects similar to those of the second embodiment can be obtained by the third embodiment.

In the second and third embodiments, the target value adjusted by the target value calculation unit 24 or 24c is the target value of the light emitting intensity of the illuminating light. However, the present invention is not limited to this. The above-mentioned target value may be a target value of at least one of the shape of the irradiation distribution of the illuminating light, the light emitting time of the illuminating light, the exposure time of the imaging unit 13, the aperture of the imaging unit 13 and the gain of the imaging unit 13. For instance, when the in-subject variation region RLH or the no-variation region RLL is positioned locally in an image, the irradiation distribution may be adjusted to locally adjust the light emitting intensity. Also, when the luminance feature quantity Ih in the in-subject variation region RLH is not larger than a threshold value TLa', or larger than a threshold value TLb', the exposure time may be adjusted to adjust the luminance feature quantity Ih. The threshold values TLa' and TLb' used in this case may be identical to or different from the threshold values TLa and TLb used for the above-mentioned decision for the adjustment of the light emitting intensity.

Also, in the second and third embodiments, the calculations of the luminance variation and the texture variation are performed between two images. However, it may be so arranged that the calculations of the luminance variation and the texture variation are performed between three or more images. In summary, it is satisfactory if the calculations of the luminance variation and the texture variation are performed between a plurality of images. When the calculation of the luminance variation is performed between three or more images, images captured under mutually different illumination conditions are used. When the calculation of the texture variation is performed between three or more images, images captured at mutually different time points are used. The images captured at mutually different time points may be images captured under mutually different illumination conditions. Accordingly, they may be the same as the images which are used for the calculation of the luminance variation.

When the target value of the illumination condition or the imaging condition is, adjusted from the luminance variation and the texture variation calculated using three or more images, as the process using the "image of the illumination condition with the smaller light emitting intensity" in the above description, a process using the "image of the illumination condition with the smallest light emitting intensity" may be performed; as the process using the "image of the illumination condition with, the larger light emitting intensity" in the above description, a process using the "image of the illumination condition with the largest light emitting intensity" may be performed; as the process on (adjustment of the target value of) the "smaller light emitting intensity" in the above description, a process on the smallest light emitting intensity" may be performed; and, as the process on (adjustment of the target value of) the "larger light emitting intensity" in the above description, a process on the largest light emitting intensity" may be performed.

In the second and third embodiments, the magnitude of threshold value TAa was a fixed value regardless of the area of the in-subject variation region RLH. However, the threshold value may be adaptively changed. For instance, the magnitude of the threshold value TAa may be modified depending on the area of the extracted subject region. In this case, if the area of the extracted subject region is large, the threshold value TAa may be adjusted to be enlarged, and if the area of the extracted subject region is small, the threshold value TAa may be adjusted to be reduced.

Also, in the second and third embodiments, the magnitudes of the amounts of adjustment $\Delta\phi a$ to $\Delta\phi d$ are fixed values.

They may however be changed adaptively. For instance, the magnitudes of the amounts of adjustment $\Delta\phi a$ to $\Delta\phi d$ may bemodified according to the proportion between the areas of the in-subject variation region RLH and the no-variation region RLL in the subject region.

Also, the amounts of adjustment $\Delta\phi a$ to $\Delta\phi d$ for all the illumination conditions need not be of the same magnitude, as shown in the equations (5) to (20), but the amounts of adjustment $\Delta\phi a$ to $\Delta\phi d$ of different magnitudes may be used.

Furthermore, in the above example, the luminance variation calculation unit 21c notifies the texture variation calculation unit 22c of the order of each of the three images read from the image memory 14. However, the texture variation calculation unit 22c may make the determination for itself. In this case, the determination may be made from the luminance feature quantity Im of the images, as in the luminance variation calculation unit 21c.

Fourth Embodiment

Figure 30:
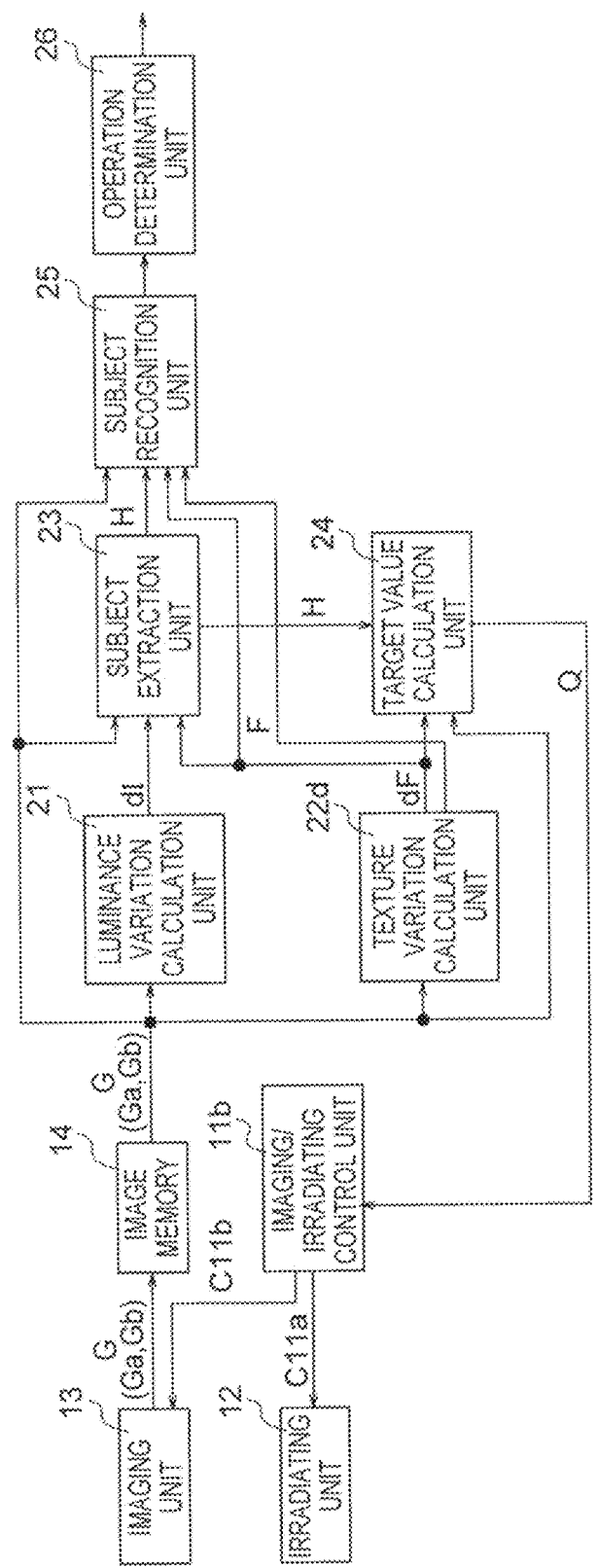
FIG. 30 is a block diagram showing the configuration of an operation apparatus of a fourth embodiment of the present invention.

FIG. 30 is a block diagram showing the configuration of an operation apparatus according to a fourth embodiment of the present invention. The operation apparatus shown in FIG. 30 is a combination of an imaging apparatus similar to the imaging apparatus shown in FIG. 21, and a subject recognition unit 25 and an operation determination unit 26. However, the texture variation calculation unit 22 in FIG. 21 is replaced with a texture variation calculation unit 22d. Reference characters identical to those in FIG. 21 denote identical or corresponding components, and their description is omitted.

Also, in the present embodiment, the subject is assumed to be a hand of a person.

The texture variation calculation unit 22d successively reads a plurality of images stored in the image memory 14, determines a texture feature F for each of the pixels constituting each image, calculates a texture variation dF between two images captured at two different time points, supplies the calculated texture variation dF to the subject extraction unit 23, the target value calculation unit 24 and the subject recognition unit 25, and also supplies the texture feature F to the subject recognition unit 25.

Figure 31:
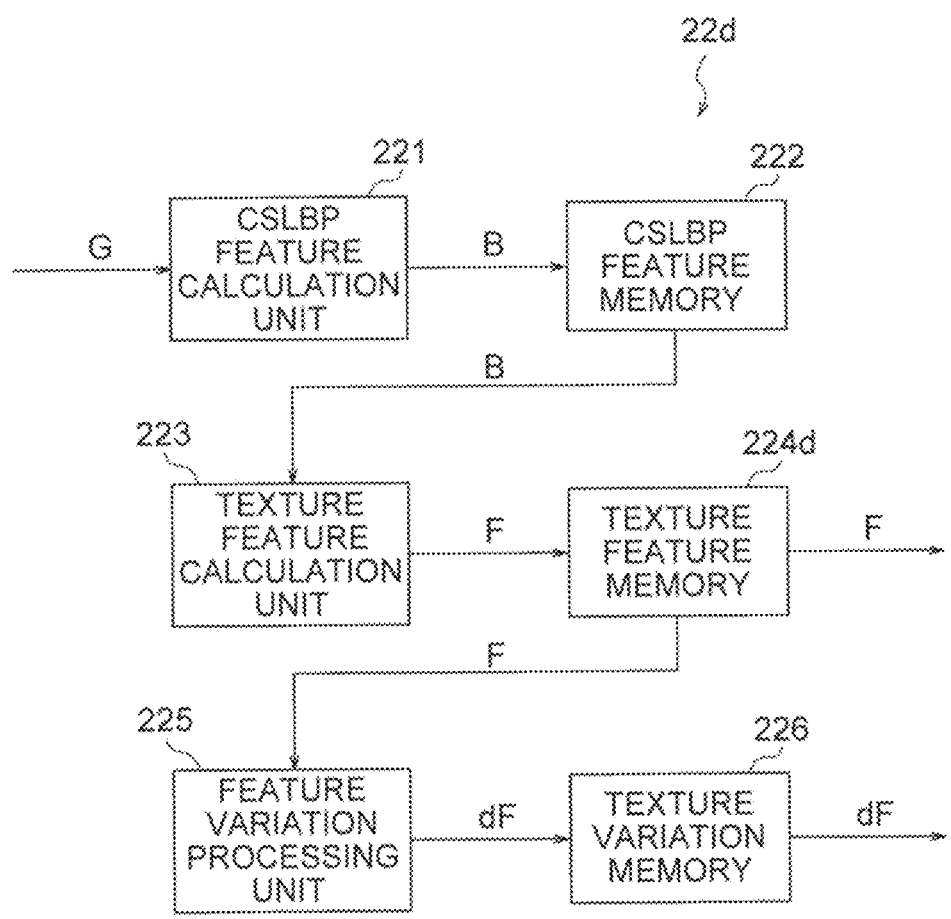
FIG. 31 is a block diagram showing the configuration of the texture variation calculation unit in FIG. 30.

As shown in FIG. 31, the texture variation calculation unit 22d includes a CSLBP feature calculation unit 221, a CSLBP feature memory 222, a texture feature calculation unit 223, a texture feature memory 224d, a feature variation processing unit 225 and a texture variation memory 226.

Among the components shown in FIG. 31, the CSLBP feature calculation unit 221, the CSLBP feature memory 222, and the feature variation processing unit 225 are identical to those shown in FIG. 4.

The texture feature memory 224d has functions similar to those of the texture feature memory 224 in FIG. 4, but differs from the texture feature memory 224 in FIG. 4, in that the data stored in it can also be read by a component other than the feature variation processing unit 225, in particular by the subject recognition unit 25.

The subject recognition unit 25 receives the extraction result H of the subject region H supplied from the subject extraction unit 23, the texture variations dF and the texture features F supplied from the texture variation calculation unit 22d, and the images G read from the image memory 14, recognizes at least one of the shape and the motion of the subject based on these inputs, and outputs the result of the recognition to the operation determination unit 26.

The subject recognition unit 25 recognizes a gesture performed, for example, by a person. The gesture, may be a shape gesture by the shape of the hand ('rock', 'scissors', 'paper' etc.), or a motion gesture by the motion of the hand (lateral movement, longitudinal movement, twisting movement).

Figure 32:
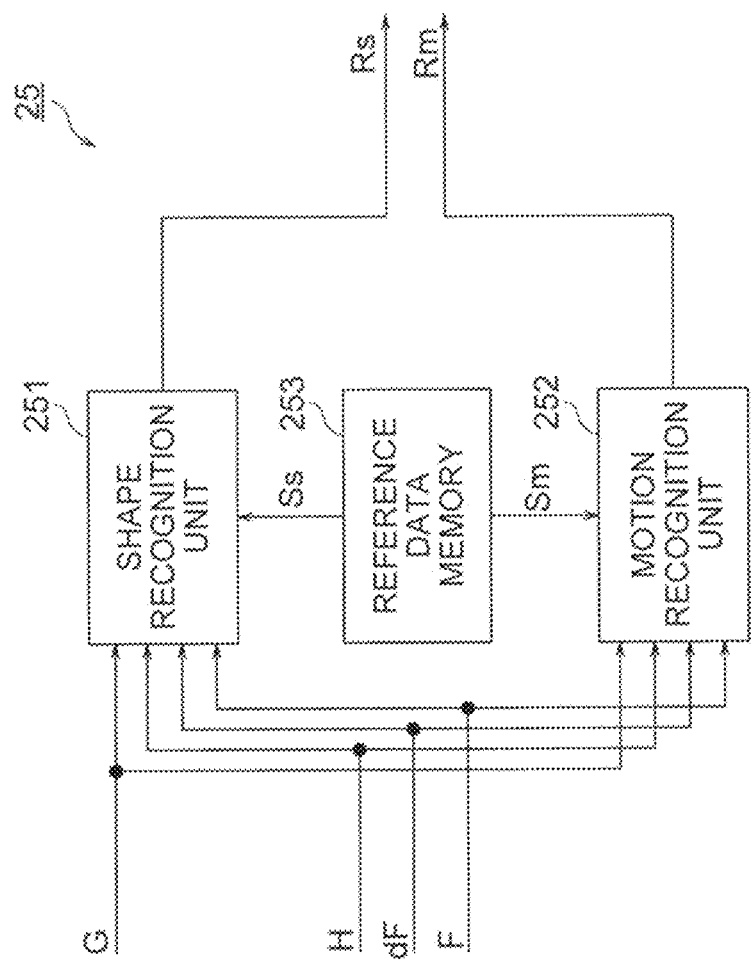
FIG. 32 is a block diagram showing the configuration of the subject recognition unit in FIG. 30.

As shown in FIG. 32, the subject recognition unit 25 includes a shape recognition unit 251, a motion recognition unit 252, and a reference data memory 253.

With regard to the shape gesture, reference data Ss representing a predetermined feature quantity of the shape is registered in advance in the reference data memory 253, and the shape recognition unit 251 recognizes the shape gesture by comparing the shape of the subject captured by the imaging unit 13, with the reference data Ss.

The reference data Ss represents the conditions to be satisfied in order for the shape of the hand to be recognized as intended for a particular gesture. The determination as to whether the conditions are satisfied includes a threshold processing on the feature quantity of the shape of the hand (determination as to whether the feature quantity of the shape of the hand has a predetermined relation with the threshold value).

For instance, the determination is made based on whether the difference from the data which represents the shape of the hand intended for a particular gesture and which is acquired in advance is not larger than a predetermined threshold value, and in such a case, the data having been acquired and the data representing the threshold value in combination constitute the reference data Ss.

The reference data Ss can be modified by learning. Known methods of the learning include, for example, a method called AdaBoost, and a method called Support Vector Machine.

As the feature quantity of the shape of the hand, the feature (quantity of the boundary lines between the hand and the background (edge of the hand) may be used. Alternatively, the texture features of the hand region (subject region) may be used.

As the boundary line between the hand and the background, the data representing the countour of the subject region extracted by the subject extraction unit 23 may be used. In this case, the shape recognition unit 251 identifies the shape of the hand based on the data representing the extraction result of the subject region H from the subject extraction unit 23.

It is also possible to extract the boundary line between the hand and the background using the texture features F.

For instance, by analyzing the boundary line between the hand and the background, it is possible to determine the shape of the hand, e.g., whether the hand is in the clenched state (rock) or open state (paper). For the extraction of the boundary line between the hand and the background, the difference in the texture feature corresponding to differences in the patterns, the unevenness, or the reflectivity, between the hand and the background may be used. In this case, the shape recognition unit 251 identifies the shape of the hand based on the texture features F stored in the texture feature memory 224d.

Also, within the hand region, a difference in the unevenness of the surface may appear depending on the shape of the fingers or the like. For instance, there is a difference in the unevenness of the surface between a situation in which the hand is clenched (rock state) and the palm is hidden by fingers, and a situation in which the hand is opened (paper state) and the palm is visible. It is possible to make distinction based on such a difference using the texture feature. Accordingly, by using the texture features, it is possible to extract the feature representing the particular shape of the hand (rock, paper, or the like). In this case, the shape recognition unit 251 identifies the shape of the hand based on the texture features F pertaining to the pixels in the subject region H extracted by the subject extraction unit 23, among the texture features F stored in the texture feature memory 224d.

With regard to the motion gesture, reference data Sm representing a predetermined feature quantity of the motion is registered in advance in the reference data memory 253, and the motion recognition unit 252 recognizes the motion gesture by comparing the motion of the subject captured by the imaging unit 13 with the reference data Sm.

The reference data Sm represents the conditions to be satisfied in order for the motion of the hand to be recognized as intended for a particular gesture. The determination as to whether the conditions are satisfied includes a threshold processing on the feature quantity of the motion of the hand (determination as to whether the feature quantity of the motion of the hand has a predetermined relation with the threshold value).

For instance, the determination is made based on whether the difference from the data which represents the motion of the hand intended for a particular gesture and which is acquired in advance is not larger than a predetermined threshold value, and in such a case, the data having been acquired and the data representing the threshold value in combination constitute the reference data Sm.

As was also described in connection with the gesture by the shape of the hand, the reference data Sm for the gesture by the motion of the hand can also be modified by learning.

As the feature quantity of the motion, the change in the position, the velocity, and the acceleration of the center of the subject may be used. The texture variations dF may also be used.

With regard to the lateral movement and the longitudinal movement, it is possible to observe the change in the position, the velocity, the acceleration or the like by tracking the center position of the subject, and they may be used as the feature quantity. For the identification of the central position, it is necessary to identify the shape of the hand, in particular the boundary line between the hand and the background.

For the identification of the shape of the hand, data representing the extraction result of the subject region H from the subject extraction unit 23 may be used. In this case, the motion recognition unit 252 identifies the shape of the hand based on the texture features F stored in the texture feature memory 224d.

For the identification of the shape of the hand, it is possible to use the texture features F stored in the texture feature memory 224d, as was also described in connection the shape recognition unit 251. In this case, the motion recognition unit 252 identifies the shape of the hand based on the texture features F stored in the texture feature memory 224d.

For the identification of the twisting movement or the like with Which the change in the boundary line between the hand and the background is small, a time series of the texture variations dF or the texture features F output from the texture variation calculation unit 22d may be used as the feature quantity. In this case, the motion recognition unit 252 identifies the motion of the hand based on the texture variations dF pertaining to the pixels in the subject region H extracted by the subject extraction unit 23, among the texture variations dF stored in the texture variation memory 226, or the texture features F pertaining to the pixels in the subject region H extracted by the subject extraction unit 23, among the texture features F stored in the texture feature memory 224d.

It is also possible to use the luminance variations dI calculated by the luminance variation calculation unit 21, for the purpose of the calculation of the feature quantity of the motion. For instance, it is possible to identify the motion of the hand toward or away from the camera, by using the time series of the mean values of the luminance variations dI in the subject region H, as the feature quantity of the motion. For instance, if the mean value of the luminance variations dI in the subject region H is increased with time, the hand can be determined to be moving toward the camera. If the mean value of the luminance variations dI is decreased with time, the hand is determined to be moving away from the camera.

Because the images suitable for the calculation of the texture features F are obtained by adjusting the illumination conditions using the target values calculated by the target value calculation unit 24, the texture features F can be calculated stably regardless of the ambient light, and because the texture features F are used for the calculation of the feature quantity of the shape or motion, the gesture recognition can be performed with a high accuracy.

The operation determination unit 26 generates a command for operating a device, based on the recognition result Rs output from the shape recognition unit 251 in the subject recognition unit 25, and the recognition result Rm, output from the motion recognition unit 252, and outputs the command. For instance, device operation commands are preset for the types of gestures to be recognized by the subject recognition unit 25, and the command is generated based on the recognition results, and output.

For a case in which the operated device is a vehicle-mounted device, FIG. 33 shows an exemplary correspondence between the types of the gestures and the operation commands for operating the vehicle-mounted device. For example, when a gesture of "rock" is recognized, a command is generated and output to switch the display screen to a map guidance screen. When a gesture of "scissors" is recognized, a command is generated and output to switch the display screen to an audio screen. When a gesture of "paper" is recognized, a command is generated and output to switch the display screen to an air conditioner adjustment screen.

The processes for the extraction of the subject in the subject extraction unit 23 in the operation apparatus of the fourth embodiment are identical to those shown in FIG. 23 and FIG. 24.

The operation apparatus of the fourth embodiment performs the processes of the gesture determination, and the device operation based on the gesture determination, using the result of the calculation of the texture features F in the step ST6 in FIG. 23, and the result of the subject extraction in the step ST10 in FIG. 24.

Figure 34:
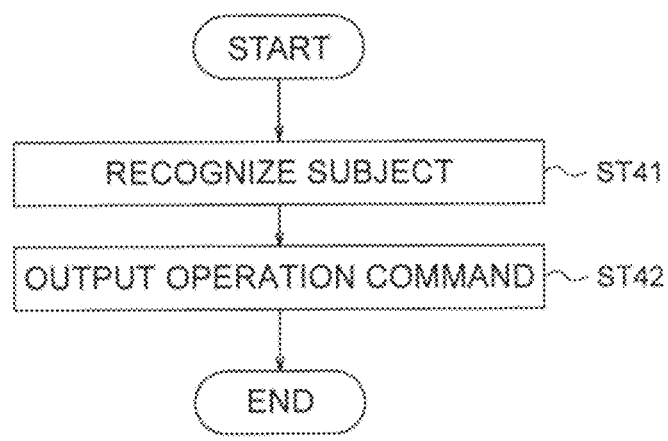
FIG. 34 is a flowchart showing a processing procedure in the operation apparatus of the fourth embodiment.

The processes of the gesture determination and the device operation based on the determination result will now be described with reference to FIG. 34.

In a step ST41, the subject recognition unit 25 receives the result of the subject region extraction supplied from the subject extraction unit 23, the texture variations dF and the texture features F supplied from the texture variation calculation unit 22d, and the images G read from the image memory 14, calculates the feature quantity of at least one of the shape and motion of the subject, compares the calculated feature quantity with the reference data (representing the feature quantity of the standard shape or the standard motion of the subject) registered in advance in the reference data memory 253, and outputs at least one of the shape and motion of the subject as the recognition result to the operation determination unit 26.

In a step ST42, a command for operating the device is generated and output based on the recognition result from the subject recognition unit 25.

As has been described, according to the operation apparatus of the present embodiment, the extraction result of the subject region which is stable against the changes in the ambient light is used, so that it is possible to obtain the subject recognition result which is stable against the ambient light.

Also, since the recognition of the shape of the subject is performed based on the texture features used for the subject region extraction, it is possible to obtain the subject recognition result which is stable against the ambient light.

Furthermore, since the recognition of the motion of the subject is performed based on the texture features used for the subject region extraction, it is possible to obtain the subject recognition result which is stable against the ambient light.

Furthermore, since the subject recognition result which is stable against the changes in the ambient light is used, it is possible to perform the device operation using at least one of the shape and motion of the subject, even in a situation in which the ambient light is changed.

In the present embodiment, description was made of a case in which the operated device is a vehicle-mounted device, as an example of the device operation by means of the operation determination unit. However, the present invention is not limited to this. The present invention is applicable to cases in which a video device such as a television set, a signage or the like, or a wearable device of a glass type, a bracelet type, a finger ring type, a garment type, or the like is operated.

Furthermore, in the present embodiment, description was made on a case in which the gesture of the subject is recognized, and the operation is performed based on the result of the recognition. The present invention however is not limited to this scheme. That is, the present invention is applicable to a case in which any action or state, other than the gesture, of a person is recognized, and the operation is performed based on the result of the recognition. For instance, the present invention is applicable to a case in which the orientation of the face or the opening/closing of an eye or mouth, or a looking-off state, a dozing state, a state in which the person is talking, a state in which the person is dozy, a state in which the person is tired, or a state in which the attentiveness is lowered, accompanied with any of the orientation of the face or the opening/closing of an eye or mouth, is recognized, and the operation is performed based on the result of the recognition. The operation based on the result of the recognition may be a process of switching the operation of the device, an operation of braking a vehicle, generation of an alarming sound.

Description has been made of an operation apparatus provided with the imaging apparatus of the second embodiment. It is also possible to configure an operation apparatus provided with the imaging apparatus of the first embodiment or the imaging apparatus of the third embodiment, in place of the imaging apparatus of the second embodiment.

So far the present invention has been described as the imaging apparatus and the operation apparatus. However, an imaging method implemented by using the above-mentioned imaging apparatus and an operating method implemented by using the above-mentioned operation apparatus are also part of the present invention.

Part of the processes performed in the above imaging apparatus or the operation apparatus, or part of the processes performed in the above imaging method or the operating method may be executed by a computer including a processor. Accordingly, a program for causing a computer to execute the processes performed in the above imaging apparatus or the operation apparatus, or the processes performed in the above imaging method or the operation method, and a computer-readable recording medium in which such a program is recorded are also part of the present invention.

Figure 35:
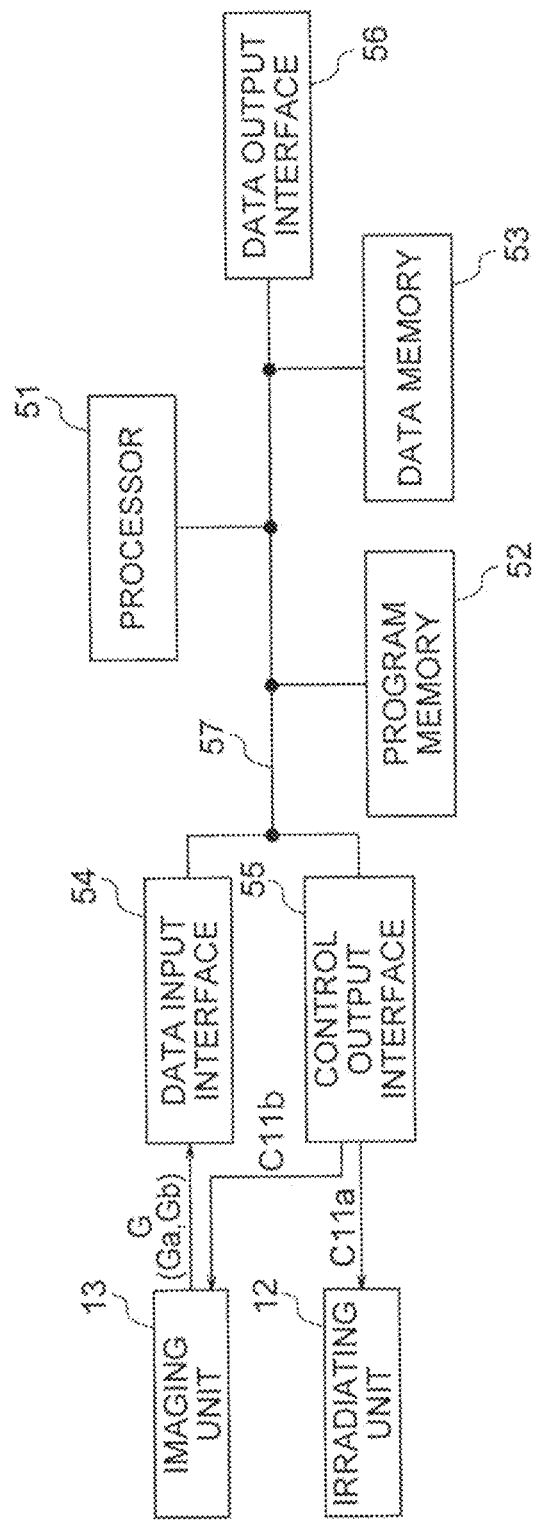
FIG. 35 is a block diagram showing a computer used for implementing the imaging apparatus in the first embodiment by software, together with an irradiating unit and an imaging unit.

FIG. 35 shows an example of the computer together with the irradiating unit 12 and the imaging unit 13. The irradiating unit 12 and the imaging unit 13 have functions similar to the irradiating unit 12 and the imaging unit 13 in, for example, of FIG. 1.

The computer in FIG. 35 includes a processor 51, a program memory 52, a data memory 53, a data input interface 54, a control output interface 55, and a data output interface 56, which are interconnected by a data bus 57.

The processor 51 operates in accordance with the program stored in the program memory 52, and performs the processes similar to the processes performed by the imaging/irradiating control unit 11, the luminance variation calculation unit 21, the texture variation calculation unit 22, and the subject extraction unit 23 in FIG. 1.

The control output interface 55 is connected to the irradiating unit 12 and the imaging unit 13, and supplies the control signal C11a from the processor 51 to the irradiating unit 12, and supplies the control signal C11b to the imaging unit 13.

The data input interface 54 is connected to the imaging unit 13, and receives the captured image output from the imaging unit 13.

The processor 51 performs, for example, the processes similar to the processes performed by the luminance variation calculation unit 21, the texture variation calculation unit 22, and the subject extraction unit 23 in the first embodiment, on the captured image input via the data input interface 54, and outputs the result of the subject extraction via the data output interface 56.

The data memory 53 has a role similar to that of the image memory 14 in FIG. 1.

The data memory 53 may also have the roles of the luminance feature quantity memory 212 and the luminance variation memory 216 (FIG. 3) in the luminance variation calculation unit 21 in FIG. 1, and the texture feature memory 224 and the texture variation memory 226 (FIG. 4) in the texture variation calculation unit 22.

A processing procedure by the processor 51 is similar to that described with reference to FIG. 13 and FIG. 14 in connection with the first embodiment.

A plurality of computers, each as shown in FIG. 35, may be provided and may be made to perform the processes of the respective parts of the imaging apparatus. This also applies when the processes in the imaging method is performed by computers.

Description has been made of a case in which the processes in the imaging apparatus of the first embodiment are performed by a computer. Similar description applies when the processes in the imaging apparatus of the second or third embodiment, or the processes in the imaging method implemented by the imaging apparatus, or the processes in the operation apparatus of the fourth embodiment, or the operation method implemented in the operation apparatus are performed by a computer.

DESCRIPTION OF THE REFERENCE CHARACTERS 11,11b,11c: imaging/irradiating control unit; 12: irradiating unit; 13: imaging unit; 14: image memory; 21, 21c: luminance variation calculation unit; 22,22c,22d: texture variation calculation unit; 23,23c: subject extraction unit; 24,24c: target value calculation unit; 25: subject recognition unit; 26: operation determination unit; 51: processor; 52: program memory; 53: data memory; 54: data input interface; 55: control output interface; 56: data output interface; 121: LED; 122: light emission control unit; 211 luminance feature quantity calculation unit; 212: luminance feature quantity memory; 213,213c: illumination condition determination unit; 215: difference calculation unit; 216: luminance variation memory; 221 CSLBP feature calculation unit; 222: CSLBP feature memory; 223, 223a: texture feature calculation unit; 224, 224d: texture feature memory; 225, 225a, 225c: feature variation processing unit; 226: texture variation memory; 231: luminance variation comparison unit; 232: texture variation comparison unit; 233: region determination unit; 234: gate unit; 241: in-subject variation region extraction unit; 242: area determination unit; 243: target value adjusting unit; 244: target value memory; 251: shape recognition unit; 252: motion recognition unit; 253: reference data memory; 2211: region dividing unit; 2212-1 to 2212-16: CSLBP feature reading unit; 2213-1 to 2213-16: histogram generating unit; 2214: concatenating unit; 2215: normalizing unit; 2216: clipping unit; H: subject; B1: background element; B2: background part.

What is claimed is:

1. An imaging apparatus comprising:
one or more processors;
a memory storing a program that when executed by the one or more processors causes one or more processors to function as
an imaging/irradiating control unit for generating an illumination condition control signal for controlling an illumination condition, and an imaging condition control signal for controlling an imaging condition;
said illumination condition control signal causing a subject to be illuminated with a plurality of mutually different illumination conditions;

said imaging condition control signal causing a subject image to be captured with an imaging condition to generate captured images;

a luminance variation calculation unit for calculating, using a plurality of captured images obtained by capturing images under different illumination conditions, a luminance variation pertaining to each pixel between the plurality of captured images;

a texture variation calculation unit for calculating, using a plurality of captured images obtained by capturing images at different time points, a texture variation pertaining to each pixel between the plurality of captured images; and a subject extraction unit for extracting a subject region based on the luminance variation and the texture variation, wherein said texture variation calculation unit calculates, as the texture variation, a first texture variation using a plurality of captured images obtained by capturing images under identical illumination conditions at different time points, and a second texture variation using the plurality of captured images which are used for the calculation of the luminance variation.

2. The imaging apparatus as set forth in claim 1, wherein said texture variation calculation unit calculates the second texture variation using a plurality of captured images obtained by the image capturing under mutually different illumination conditions at different time points.

3. The imaging apparatus as set forth in claim 1, wherein said texture variation calculation unit calculates texture features for each of the plurality of captured images, and calculates a variation in the texture feature between the plurality of captured images as the texture variation.

4. The imaging apparatus as set forth in claim 3, wherein said subject extraction unit extracts, from a captured image used for at least one of the calculation of the luminance variation and the calculation of the texture variation, or a luminance difference image constituted of the luminance variations of the respective pixels, a region in which the luminance variation is larger than a first threshold value, and the texture variation is not larger than a second threshold value, as the subject region.

5. An operation apparatus comprising:
the imaging apparatus as set forth in claim 3; and
wherein the one or more processors are further caused to function as
a subject recognition unit for calculating at least one of a feature quantity of a shape or a feature quantity of motion of the subject based on the result of the extraction of the subject region by said subject extraction unit, and comparing the calculated feature quantity with reference data representing a predetermined feature quantity of the shape or motion, to recognize the shape or the motion of the subject, wherein
said subject recognition unit calculates the feature quantity of the shape based on the texture feature calculated by said texture variation calculation unit.

6. The imaging apparatus as set forth in claim 1, wherein the plurality of illumination conditions differ in at least one of an irradiation distribution of the illuminating light and a light emitting intensity of the illuminating light.

7. The imaging apparatus as set forth in claim 1, wherein the plurality of illumination conditions include
a first illumination condition in which the illuminating light is irradiated with a first light emitting intensity, and a second illumination condition in which the illuminating light is irradiated with a second light emitting intensity which is smaller than the first light emitting intensity.

8. The imaging apparatus as set forth in claim 1, wherein the one or more processors are further caused to function as:
a target value calculation unit for determining a target value of the imaging condition, based on at least one of a luminance feature quantity and the texture variation of the captured image in the extracted subject region,
wherein said imaging/irradiating control unit generates the imaging condition control signal based on the target value of the imaging condition.

9. The imaging apparatus as set forth in claim 1, wherein the one or more processors are further caused to function as:
a target value calculation unit for determining a target value of the illumination condition based on at least one of a luminance feature quantity and the texture variation of the captured image in the extracted subject region,
wherein said imaging/irradiating control unit generates the illumination condition control signal based on the target value of the illumination condition.

10. The imaging apparatus as set forth in claim 9, wherein
when the luminance feature quantity of the extracted subject region, in the captured image obtained by the image capturing under the illumination condition with the smallest light emitting intensity, among the plurality of captured images used f©r the calculation of the luminance variation, is not larger than a fifth threshold value, said target value calculation unit enlarges the target value of the light emitting intensity used for the illumination condition with the smallest light emitting intensity, and
when the luminance feature quantity of the extracted subject region, in the captured image obtained by the image capturing under the illumination condition with the largest light emitting intensity, among the plurality of captured images used for the calculation of the luminance variation, is larger than a sixth threshold value, said target value calculation unit reduces the target value of the light emitting intensity used for the illumination condition with the largest light emitting intensity.

11. The imaging apparatus as set forth in claim 9, wherein the target value of the illumination condition is a target value of at least one of an irradiation distribution of the illuminating light, and a light emitting intensity of the illuminating light.

12. The imaging apparatus as set forth in claim 9, wherein
said subject extraction unit performs the extraction of the subject region based on the luminance variation and the first texture variation;
when an area of a part of the extracted subject region in which the second texture variation is larger than a third threshold value is not smaller than a fourth threshold value, said target value calculation unit adjusts the target value of the illumination condition such that a difference in the light emitting intensity between the plurality of illumination conditions is reduced, and
when the second texture variation is not larger than the third threshold value throughout the extracted subject region, said target value calculation unit adjusts the target value of the illumination condition such that the difference in the light emitting intensity between the plurality of illumination conditions is enlarged.

13. An operation apparatus comprising:
the imaging apparatus as set forth in claim 1; and wherein the one or more processors are further caused to function as
a subject recognition unit for calculating at least one of the feature quantity of a shape and a feature quantity of motion of the subject based on the result of the extraction of the subject region by said subject extraction unit, and comparing the calculated feature quantity with reference data representing a predetermined feature quantity of the shape or motion, to recognize the shape or the motion of the subject.

14. The operation apparatus as set forth in claim 13, wherein said subject recognition unit calculates the feature quantity of the motion based on at least one of the luminance variation and the texture variation.

15. The operation apparatus as set forth in claim 13, wherein the one or more processors are further caused to function as:
an operation determination unit for determining a content of the operation based on the result of the recognition of the shape or motion of the subject, and generating and outputting a command indicating the determined content of the operation.

16. An imaging method comprising:
generating an illumination condition control signal for controlling an illumination condition, and an imaging condition control signal for controlling an imaging condition;
illuminating a subject with a plurality of mutually different illumination conditions based on the illumination condition control signal;
capturing a subject image with an imaging condition controlled by the imaging condition control signal to generate captured images;
calculating, using a plurality of captured images obtained by capturing images under the different illumination conditions a luminance variation pertaining to each pixel between the plurality of captured images;
calculating, using a plurality of captured images obtained by capturing images at different time points, a texture variation pertaining to each pixel between the plurality of captured images; and
extracting a subject region based on the luminance variation and the texture variation, wherein
calculating said texture variation calculates, as the texture variation, a first texture variation using a plurality of captured images obtained by capturing images under mutually identical illumination conditions at different time points, and a second texture variation using the plurality of captured images which are used for the calculation of the luminance variation.

17. A non-transitory computer-readable recording medium having stored thereon a program for causing a computer to execute the processes of the steps in the method as set forth in claim 16.

* * * * *